United States Patent
Tardi et al.

(10) Patent No.: US 12,447,163 B2
(45) Date of Patent: *Oct. 21, 2025

(54) LIPOSOMAL FORMULATIONS OF BCL INHIBITORS

(71) Applicant: Jazz Pharmaceuticals Therapeutics, Inc., Palo Alto, CA (US)

(72) Inventors: Paul Tardi, Surrey (CA); Leon Wan, Vancouver (CA); Shyam Madhusudan Garg, Richmond (CA); Jun Gao, Coquitlam (CA); Philippe Legros, Burnaby (CA)

(73) Assignee: Jazz Pharmaceuticals Therapeutics, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,001

(22) Filed: Jul. 15, 2022

(65) Prior Publication Data
US 2023/0059528 A1   Feb. 23, 2023

Related U.S. Application Data

(60) Provisional application No. 63/222,887, filed on Jul. 16, 2021.

(51) Int. Cl.
*A61K 31/635* (2006.01)
*A61K 9/127* (2025.01)
(Continued)

(52) U.S. Cl.
CPC ............ *A61K 31/635* (2013.01); *A61K 9/127* (2013.01); *A61K 9/1271* (2013.01); *A61K 9/1272* (2013.01); *A61K 9/1277* (2013.01); *A61K 45/06* (2013.01); *A61K 47/186* (2013.01); *A61K 47/20* (2013.01); *A61K 47/26* (2013.01); *A61K 47/28* (2013.01); *A61P 7/04* (2018.01)

(58) Field of Classification Search
None
See application file for complete search history.

(56) References Cited

U.S. PATENT DOCUMENTS 3,993,754 A   11/1976  Rahman et al.
4,145,410 A   3/1979   Sears et al.
(Continued)

FOREIGN PATENT DOCUMENTS

WO   WO 1990/014105 A1   11/1990
WO   WO 2014/121211      8/2014
(Continued)

OTHER PUBLICATIONS

Griffin Pauli, Wei-Lun Tang and Shyh-Dar Li. "Development and Characterization of the Solvent-Assisted Active Loading Technology (SALT) for Liposomal Loading of Poorly Water-Soluble Compounds." Pharmaceutics, vol. 11, No. 465, 2019, pp. 1-12. (Year: 2019).*

(Continued)

*Primary Examiner* — Isaac Shomer
(74) *Attorney, Agent, or Firm* — Morgan, Lewis & Bockius LLP

(57) ABSTRACT

Provided herein are liposomes comprising B-cell lymphoma (Bcl) protein inhibitors, compositions comprising such liposomes, and methods using such formulations for treating hyperproliferative disorders.

18 Claims, 19 Drawing Sheets

(51) Int. Cl.
    *A61K 9/1271* (2025.01)
    *A61K 9/1272* (2025.01)
    *A61K 9/1277* (2025.01)
    *A61K 45/06* (2006.01)
    *A61K 47/18* (2017.01)
    *A61K 47/20* (2006.01)
    *A61K 47/26* (2006.01)
    *A61K 47/28* (2006.01)
    *A61P 7/04* (2006.01)

(56) References Cited

U.S. PATENT DOCUMENTS

| | | | |
|---|---|---|---|
| 4,224,179 | A | 9/1980 | Schneider et al. |
| 4,235,871 | A | 11/1980 | Papahadjopoulos et al. |
| 4,522,803 | A | 6/1985 | Lenk et al. |
| 4,588,578 | A | 5/1986 | Foutain et al. |
| 5,616,341 | A | 4/1997 | Mayer et al. |
| 5,736,155 | A | 4/1998 | Bally et al. |
| 5,785,987 | A | 7/1998 | Hope et al. |
| 5,837,282 | A | 11/1998 | Fenske et al. |
| 5,939,096 | A * | 8/1999 | Clerc .................. A61K 9/1278 424/450 |
| 8,147,867 | B2 * | 4/2012 | Hong .................. A61K 47/24 424/450 |
| 9,737,485 | B2 | 8/2017 | Hayes et al. |
| 10,507,182 | B2 | 12/2019 | Hayes et al. |
| 10,722,467 | B2 | 7/2020 | Hayes et al. |
| 2007/0116753 | A1* | 5/2007 | Hong .................. A61K 31/4375 424/450 |
| 2007/0123494 | A1* | 5/2007 | Seipelt .............. A61K 31/4985 544/125 |
| 2008/0213183 | A1* | 9/2008 | Bally .................. A61K 31/704 424/9.2 |
| 2009/0028931 | A1 | 1/2009 | Wasan et al. |
| 2010/0075947 | A1* | 3/2010 | Aftab .................. C07D 417/12 514/249 |
| 2011/0098255 | A1* | 4/2011 | Gallyas .............. A61K 31/05 514/266.3 |
| 2013/0089626 | A1* | 4/2013 | Pollard .............. A61K 31/555 514/255.06 |
| 2013/0295185 | A1* | 11/2013 | Sebti .................. A61K 31/4035 435/375 |
| 2014/0148483 | A1* | 5/2014 | Semba ............... A61K 31/4025 514/312 |
| 2014/0220110 | A1* | 8/2014 | Hayes ................ A61K 38/07 514/383 |
| 2015/0272980 | A1 | 10/2015 | Rodrigueza et al. |
| 2015/0320755 | A1* | 11/2015 | Kutok .................. A61P 35/00 514/263.21 |
| 2015/0328232 | A1 | 11/2015 | Malinin et al. |
| 2017/0056421 | A1 | 3/2017 | Gray et al. |
| 2017/0136014 | A1* | 5/2017 | Hamdy ............... A61P 35/00 |
| 2018/0028495 | A1 | 2/2018 | Lannutti et al. |
| 2018/0036336 | A1* | 2/2018 | Huang ............... A61K 31/7125 |
| 2020/0360386 | A1* | 11/2020 | Hudson .............. A61K 38/07 |
| 2023/0059528 | A1* | 2/2023 | Tardi ................. A61K 47/20 |

FOREIGN PATENT DOCUMENTS

| | | | |
|---|---|---|---|
| WO | WO 2017/123616 | 7/2017 | |
| WO | WO-2017123616 A1 * | 7/2017 | ........... A61K 31/496 |

OTHER PUBLICATIONS

Erik Oude Blenke, Enrico Mastrobattista & Raymond M. Schiffelers. "Strategies for triggered drug release from tumor targeted liposomes." Expert Opinion in Drug Delivery, vol. 10(10), 2013, pp. 1399-1410. (Year: 2013).*
Ankit Jain, Arvind Gulbake, Ashish Jain, Satish Shilpi, Pooja Hurkat, Sanjay K. Jain. "Dual drug delivery using "smart" liposomes for triggered release of anticancer agents." Journal of Nanoparticle Research, vol. 15:1772, 2013, pp. 1-12. (Year: 2013).*
Nancy Kapila. "Unlocking the Potential of Liposome Drug Delivery." Roots Analysis Business Research and Consulting, https://www.rootsanalysis.com/blog/liposome-a-novel-drug-delivery-system/ accessed Jul. 26, 2024, pp. 1-8. (Year: 2024).*
Wei-Lun Tang. "Development of a Fast and Efficient Liposomal Drug Loading Technology for Poorly Water Soluble Drugs: Formulation, Characterization, and Potential Applications." PhD Thesis, The University of British Columbia, Oct. 2018, pp. i-xx and 1-130. (Year: 2018).*
Daniel Zucker, David Marcus, Yechezkel Barenholz, and Amiram Goldblum. "Liposome drugs' loading efficiency: A working model based on loading conditions and drug's physicochemical properties." Journal of Controlled Release, vol. 139 (2009), pp. 73-80. (Year: 2009).*
Yechezkel (Chezy) Barenholz. "Doxil®—The first FDA-approved nano-drug: Lessons learned." Journal of Controlled Release 160 (2012), pp. 117-134. (Year: 2012).*
CAS Registry Record for Irinotecan (CAS# 97682-44-5). Entered STN Aug. 18, 1985, Downloaded by examiner on Feb. 3, 2025, pp. 1-15. (Year: 2025).*
CAS Registry Record for ABT 737 (CAS # 852808-04-9). Entered STN Jun. 23, 2005, Downloaded by examiner on Feb. 3, 2025, pp. 1-13. (Year: 2025).*
Bangham et al. "Diffusion of univalent ions across the lamellae of swollen phospholipids." *Journal of molecular biology* 13.1 (1965): 238-IN27.
Berge et al. "Pharmaceutical salts." *Journal of pharmaceutical sciences* 66.1 (1977): 1-19. Only pp. 1-5 provided.
Cullis et al. "Influence of pH gradients on the transbilayer transport of drugs, lipids, peptides and metal ions into large unilamellar vesicles." *Biochimica et Biophysica Acta (BBA)—Reviews on Biomembranes* 1331.2 (1997): 187-211.
Deamer et al. "Large volume liposomes by an ether injection procedure." *Biochim. Biophys. Acta* 443 (1976): 629-634.
Szoka et al. "Procedure for preparation of liposomes with large internal aqueous space and high capture by reverse-phase evaporation." Proc Natl Acad Sci U S A. Sep. 1978;75(9):4194-8.
Zucker et al. "Liposome drugs' loading efficiency: a working model based on loading conditions and drug's physicochemical properties." *Journal of controlled release* 139.1 (2009): 73-80.
Danial, N. et al., "Cell Death: Critical Control Points," Cell, Jan. 23, 2004, 116:205-219.
International Search Report and Written Opinion received for International Application No. PCT/US22/37374, mailed Jan. 19, 2023.
Jin, L. et al., "Preparation, Purification, and Use of Fatty Acid-containing Liposomes," Journal of Visualized Experiments, Feb. 9, 2018, 132(e57324), pp. 1-7.
Liu, X. et al., "Irinotecan Delivery by Lipid-Coated Mesoporous Silica Nanoparticles Shows Improved Efficacy and Safety over Liposomes for Pancreatic Cancer," ACS Nano, Feb. 23, 2016, 10(2):2702-2715.

* cited by examiner

LIPOSOMAL FORMULATIONS OF BCL INHIBITORS

CROSS REFERENCE TO RELATED APPLICATIONS

This application claims the priority benefit of U.S. Provisional Patent Application No. 63/222,887, filed Jul. 16, 2021, the disclosure of which is hereby incorporated herein by reference in its entirety.

FIELD

Provided herein are liposomes comprising B-cell lymphoma (Bcl) protein inhibitors, compositions comprising such liposomes, and methods using such formulations for treating hyperproliferative disorders.

BACKGROUND

Apoptosis is recognized as an essential biological process for tissue homeostasis of all living species. In mammals in particular, it has been shown to regulate early embryonic development. Later in life, cell death is a default mechanism by which potentially dangerous cells (e.g., cells carrying cancerous defects) are removed. Several apoptotic pathways have been uncovered, and one of the most important involves the B-cell lymphoma 2 (Bcl-2) family of proteins, which are key regulators of the mitochondrial (also called "intrinsic") pathway of apoptosis. See, Danial, N. N. and Korsmeyer, S. J. Cell (2004) 116, 205-219. Targeted cancer therapy research has been reported against members of the Bcl-2 protein family, which are central regulators of programmed cell death. For example, the interaction of pro-apoptosis proteins (Bax, Bad, Bid, Bim, Bik, Puma, Noxa, etc.) with anti-apoptosis proteins (Bcl-2 family: Bcl-2, Bcl-$X_L$, Mcl-1, etc.) is believed to play a role in cell survival and death.

It has been believed that Bcl-2 is an excellent target for hematological cancers while Bcl-$X_L$ is a target for solid tumors. It was also speculated that observed thrombocytopenia was caused by inhibiting Bcl-$X_L$ (Cell, 2007, 128, 1173-1186). The Bcl-2 family members that inhibit apoptosis are over-expressed in cancers and contribute to tumorigenesis. Bcl-2 expression has been strongly correlated with resistance to cancer therapy and decreased survival. The Bcl-2 family of proteins can be further classified into three subfamilies depending on how many of the homology domains each protein contains and on its biological activity (i.e., whether it has pro- or anti-apoptotic function). The first subgroup contains proteins having all 4 homology domains, i.e., BH1, BH2, BH3 and BH4. Their general effect is anti-apoptotic, that is to preserve a cell from starting a cell death process. Proteins such as, for example, Bcl-2, Bcl-$X_L$, and Mcl-1 are members of this first subgroup.

There remains a need for the development of therapies to deliver Bcl-2 family inhibitor compounds (e.g., inhibitors of both Bcl-2 and Bcl-$X_L$) for the treatment of cancer, either as single agents or as part of combination therapies (e.g., in combination with chemotherapy and/or radiation therapy). In particular, there remains a need for therapeutically effective Bcl-2 family inhibitor compositions without dose-limiting thrombocytopenia (e.g., acceptably high platelet counts after administration to a subject), without inducing tumor lysis syndrome or other unacceptable side effects.

Liposomes are closed vesicles having at least one lipid bilayer surrounding an aqueous core. The intra-liposomal space and lipid layer(s) can entrap a wide variety of substances including drugs, cosmetics, diagnostic reagents, genetic material and bioactive compounds. Since non-toxic lipids act as the basis for liposomes, they generally exhibit low toxicity. The low toxicity coupled with the ability of liposomes to increase the plasma circulation lifetime of agents gives rise to liposomes as vehicles particularly useful for delivering pharmaceutically active agents. In many cases, liposome-delivered drugs result in superior clinical efficacy paired with reduced toxicity.

Passive loading of lipophilic and to a lesser extent amphiphilic functional compounds is somewhat more efficient than hydrophilic functional compounds because they partition in both the lipid bilayer and the intraliposomal (internal) aqueous medium. However, using passive loading, the final functional-compound-to-lipid ratio as well as the encapsulation efficiency are generally low. The concentration of drug in the liposome equals that of the surrounding fluid and drug not entrapped in the internal aqueous medium is washed away after encapsulation. Moreover drugs loaded into the bilayer are released from the liposome very rapidly when the liposome is injected into a subject. For sustained release of the drug in a patient it is preferable that the drug is encapsulated within the interior of the liposome.

Certain hydrophilic or amphiphilic compounds can be loaded into preformed liposomes using transmembrane pH- or ion-gradients (D. Zucker et al., Journal of Controlled Release (2009) 139:73-80). This technique is called active or remote loading. Compounds amenable to active loading should be able to change from an uncharged form, which can diffuse across the liposomal membrane, to a charged form that is not capable thereof. Typically, the functional compound is loaded by adding it to a suspension of liposomes prepared to have a lower inside/higher outside pH- or ion-gradient. Via active loading, a high functional-compound-to-lipid mass ratio and a high loading efficiency (up to 100%) can be achieved. Examples are active loading of anticancer drugs doxorubicin, daunorubicin, and vincristine (P. R. Cullis et al., Biochimica et Biophysica Acta, (1997) 1331:187-211, and references therein).

Hydrophobic drugs are mainly considered capable of loading into liposomes through membrane intercalation via passive loading/assembly mechanism. Wasan et al. states "Agents that have hydrophobic attributes can intercalate into the lipid bilayer and this can be achieved by adding the agent to the preformed liposomes." in a description of the use of micelles to transfer sparingly soluble agents to a liposome bilayer (US 2009/0028931). However, such loading relies on the hydrophobic drug being associated with or trapped in the lipid bilayer and the drug may easily leak out of the liposome, resulting in poor retention in vivo and less than desirable pharmacokinetics.

Remote loading of a sparingly soluble drug into a liposome under conditions where the drug is above its solubility limit and is in the form of a precipitate is an unexpected event. D. Zucker et al., Journal of Controlled Release (2009) 139:73-80 states "Hydrophobic molecules may aggregate, and these aggregates have low permeability across the liposomal membrane. Thus, when the non-polar/polar surface area ratio is >2.31 (see FIG. 4 in Zucker et al. Journal of Controlled Release (2009) 139:73-80), it is necessary that the drug would have a reasonable solubility, >1.9 mM, in order to achieve high loading because only soluble uncharged molecules can enter the liposome." (D. Zucker et al., Journal of Controlled Release (2009) 139:73-80).

Only recently have methods for the active loading of the aqueous core of a liposome with a sparingly water-soluble agent from a precipitate been developed. See for example Szoka et al. WO2014121211, and Li et al., Pharmaceutics (2019), 11, 465.

SUMMARY

The present disclosure relates to compositions and methods for administering effective amounts of a Bcl inhibitor using liposomes encapsulating said Bcl inhibitor.

In one aspect, provided is a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposome; and a therapeutic agent external to the liposomes.

In another aspect, provided is a method for delivering a therapeutically effective amount of a Bcl inhibitor comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a method for treating a hyperproliferative disorder, the method comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a method for reducing thrombocytopenia associated with administration of a therapeutically effective amount of a Bcl inhibitor in non-liposomal form, the method comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes; and wherein the total amount of the Bcl inhibitor in the liposomal composition is equal to the therapeutically effective amount of the Bcl inhibitor when administered in non-liposomal form.

In some embodiments, the first lipid is a polymer-conjugated lipid. For example, in some embodiments, the first lipid is selected from the group consisting of 1,2-distearoyl-rac-glycero-3-methoxypoly(ethylene glycol) (such as DSG-PEG2000), 1,2-dimyristoyl-rac-glycero-3-methoxypoly(ethylene glycol) (such as DMG-PEG2000), 1,2-dipalmitoyl-rac-glycero-3-methoxypoly(ethylene glycol) (such as DPG-PEG2000), and 1,2-distearoyl-sn-glycero-3-phosphoethanolamine-poly(ethylene glycol) (such as DSPE-PEG2000). In some embodiments, the first lipid is DSG-PEG2000.

In some embodiments, the lipid bilayer further comprises a second lipid. In some embodiments, the second lipid is a phospholipid. In some embodiments, the second lipid is distearoyl phosphatidyl choline (DSPC), hydrogenated sphingomyelin (dihydrosphingomyelin), or egg sphingomyelin. In some embodiments, the second lipid is distearoyl phosphatidyl choline (DSPC) or hydrogenated sphingomyelin (dihydrosphingomyelin). In some embodiments, the second lipid is distearoyl phosphatidyl choline (DSPC). In some embodiments, the second lipid is hydrogenated sphingomyelin (dihydrosphingomyelin). In some embodiments, the second lipid is egg sphingomyelin.

In some embodiments, the internal medium is an aqueous internal medium. In some embodiments, the aqueous internal medium is an acidic aqueous internal medium. In some embodiments, the internal medium further comprises an additional solvent. In some embodiments, the additional solvent is an organic solvent. In some embodiments, the additional solvent is dimethylsulfoxide (DMSO).

In some embodiments, the first loading aid is an ionic loading aid. In some embodiments, the first loading aid is selected from the group consisting of ammonium sulfate (AS), ammonium sucrose octasulfate (NH4SOS), potassium sucrose octasulfate (KSOS), triethanolammonium sucrose octasulfate (TEA(OH)SOS), triethylammonium sucrose octasulfate (TEASOS), ammonium citrate, and sodium citrate. In some embodiments, the first loading aid is selected from the group consisting of ammonium sulfate (AS), ammonium sucrose octasulfate (NH4SOS), potassium sucrose octasulfate (KSOS), triethylammonium sucrose octasulfate (TEASOS), and sodium citrate. In some embodiments, the first loading aid is ammonium sulfate (AS). In some embodiments, the first loading aid is triethylammonium sucrose octasulfate (TEASOS).

In some embodiments, the internal medium further comprises a second loading aid. In some embodiments, the second loading aid is an ionic loading aid. In some embodiments, the second loading aid is selected from the group consisting of ammonium sulfate (AS), ammonium sucrose octasulfate (NH4SOS), potassium sucrose octasulfate (KSOS), triethylammonium sucrose octasulfate (TEASOS), and sodium citrate.

In some embodiments, the first loading aid is potassium sucrose octasulfate (KSOS) and the second loading aid is sodium citrate.

In some embodiments, the first sterol is cholesterol or beta-sitosterol.

DETAILED DESCRIPTION

Figure 1A:
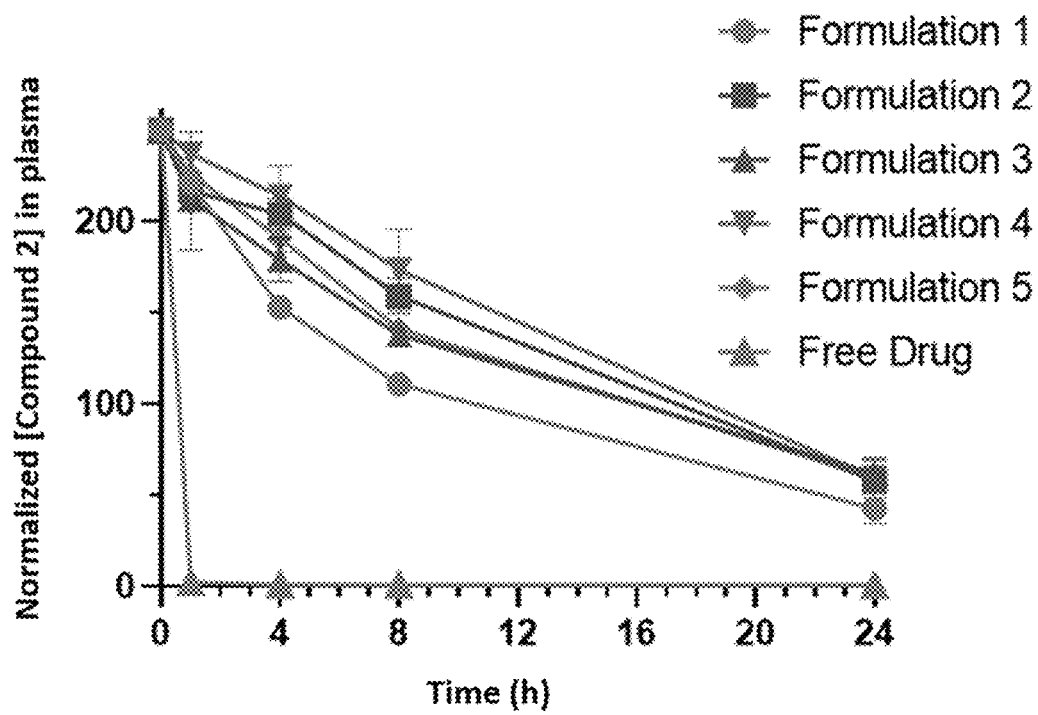
FIG. 1A shows the evolution of normalized plasma concentration of Compound 2 over time using various liposomal formulations compared to using the free drug.

Unless defined otherwise, all terms of art, notations and other scientific terms or terminology used herein have the same meaning as is commonly understood by one of ordinary skill in the art to which the present disclosure pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

Definitions

For use herein, unless clearly indicated otherwise, use of the terms "a", "an" and the like refers to one or more.

Reference to "about" a value or parameter herein includes (and describes) embodiments that are directed to that value or parameter per se. For example, description referring to "about X" includes description of "X".

The term "therapeutic agent" or "drug" as used herein refers to chemical moieties used in a variety of therapeutic, including pharmaceutical applications.

The term "pharmaceutically acceptable salt" refers to a salt of any of the compounds herein which are known to be non-toxic and are commonly used in the pharmaceutical literature. In some embodiments, the pharmaceutically acceptable salt of a compound retains the biological effectiveness of the compounds described herein and are not biologically or otherwise undesirable. Examples of pharmaceutically acceptable salts can be found in Berge et al., Pharmaceutical Salts, *J. Pharmaceutical Sciences*, January 1977, 66(1), 1-19. Pharmaceutically acceptable acid addition salts can be formed with inorganic acids and organic acids. Inorganic acids from which salts can be derived include, for example, hydrochloric acid, hydrobromic acid, sulfuric acid, nitric acid, and phosphoric acid. Organic acids from which salts can be derived include, for example, acetic acid, propionic acid, glycolic acid, pyruvic acid, lactic acid, oxalic acid, malic acid, maleic acid, malonic acid, succinic acid, fumaric acid, tartaric acid, citric acid, benzoic acid, cinnamic acid, mandelic acid, methanesulfonic acid, ethanesulfonic acid, 2-hydroxyethylsulfonic acid, p-toluenesulfonic acid, stearic acid and salicylic acid. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, and aluminum. Organic bases from which salts can be derived include, for example, primary, secondary, and tertiary amines; substituted amines including naturally occurring substituted amines; cyclic amines; and basic ion exchange resins. Examples of organic bases include isopropylamine, trimethylamine, diethylamine, triethylamine, tripropylamine, and ethanolamine. In some embodiments, the pharmaceutically acceptable base addition salt is selected from ammonium, potassium, sodium, calcium, and magnesium salts.

As used herein, the term "subject" refers to an animal, such as a mammal, bird, or fish. In some embodiments, the subject is a mammal. Mammals include, for example, mice, rats, dogs, cats, pigs, sheep, horses, cows, and humans. In some embodiments, the subject is a human, for example a human that has been or will be the object of treatment, observation or experiment.

The term "therapeutically effective amount" or "effective amount" refers to that amount of a compound disclosed and/or described herein that is sufficient to affect treatment, as defined herein, when administered to a subject in need of such treatment. The therapeutically effective amount will vary depending upon, for example, the subject and disease condition being treated, the weight and age of the subject, the severity of the disease condition, the particular compound, the dosing regimen to be followed, timing of administration, the manner of administration, all of which can readily be determined by one of ordinary skill in the art. The therapeutically effective amount may be ascertained experimentally, for example by assaying blood concentration of the chemical entity, or theoretically, by calculating bioavailability.

"Treatment" (and related terms, such as "treat", "treated", "treating") includes one or more of: preventing a disease or disorder (i.e., causing the clinical symptoms of the disease or disorder not to develop); inhibiting a disease or disorder; slowing or arresting the development of clinical symptoms of a disease or disorder; and/or relieving a disease or disorder (i.e., causing relief from or regression of clinical symptoms). The term encompasses situations where the disease or disorder is already being experienced by a subject, as well as situations where the disease or disorder is not currently being experienced but is expected to arise. The term covers both complete and partial reduction or prevention of the condition or disorder, and complete or partial reduction of clinical symptoms of a disease or disorder. Thus, compounds described and/or disclosed herein may prevent an existing disease or disorder from worsening, assist in the management of the disease or disorder, or reduce or eliminate the disease or disorder. When used in a prophylactic manner, the compounds disclosed and/or described herein may prevent a disease or disorder from developing or lessen the extent of a disease or disorder that may develop.

In one aspect, provided is a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposome; and a therapeutic agent external to the liposomes.

In another aspect, provided is a method for delivering a therapeutically effective amount of a Bcl inhibitor comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a method for treating a hyperproliferative disorder, the method comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes.

In another aspect, provided is a method for reducing thrombocytopenia associated with administration of a therapeutically effective amount of a Bcl inhibitor in non-liposomal form, the method comprising administering to a subject a liposomal composition comprising liposomes, wherein the liposomes comprise:
(a) a lipid bilayer comprising a first lipid and a first sterol;
(b) an internal medium comprising a first loading aid; and
(c) a Bcl inhibitor encapsulated in the internal medium of said liposomes; and
wherein the total amount of the Bcl inhibitor in the liposomal composition is equal to the therapeutically effective amount of the Bcl inhibitor when administered in non-liposomal form.

In another aspect, provided is a method for reducing the total dose of a Bcl inhibitor administered to a subject to achieve a therapeutic effect, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome; and
wherein the total amount of the Bcl inhibitor in the liposomal composition necessary to achieve the therapeutic effect is less than the total amount of the Bcl inhibitor necessary to achieve the same therapeutic effect when administered in non-liposomal form.

In another aspect, provided is a method for reducing the total dose of a Bcl inhibitor administered to a subject to achieve a therapeutic effect in treating a hyperproliferative disorder, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome; and
wherein the total amount of the Bcl inhibitor in the liposomal composition necessary to achieve the therapeutic effect is less than the total amount of the Bcl inhibitor necessary to achieve the same therapeutic effect when administered in non-liposomal form.

In another aspect, provided is a method for reducing inter-subject variability of exposure to a Bcl inhibitor administered to subjects in need thereof, the method comprising administering to said subjects a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome; and
wherein the inter-subject variability of exposure to the Bcl inhibitor administered in the liposomal composition is less than the inter-subject variability of exposure to the Bcl inhibitor when administered in non-liposomal form; and wherein the total amount of the Bcl inhibitor in the liposomal composition is equal to the therapeutically effective amount of the Bcl inhibitor when administered in non-liposomal form.

In another aspect, provided is a method for increasing the half-life of a Bcl inhibitor in a subject, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome; and
wherein the half-life of the Bcl inhibitor when administered in the liposomal composition is more than the half-life of the Bcl inhibitor when administered in non-liposomal form.

In another aspect, provided is a method for reducing dosing frequency of a Bcl inhibitor in a subject, the method comprising administering to the subject a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome; and
wherein the dosing frequency of the Bcl inhibitor administered in the liposomal composition is less than the dosing frequency of the Bcl inhibitor when administered in non-liposomal form; and wherein the total amount of the Bcl inhibitor in the liposomal composition is equal to the therapeutically effective amount of the Bcl inhibitor when administered in non-liposomal form.

In another aspect, provided is a method for reducing the incidence or severity of one or more adverse events associated with administration of a therapeutically effective amount of a Bcl inhibitor, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid; and
(c) a Bcl inhibitor encapsulated in the internal medium of said liposome;
wherein the incidence or severity of said one or more adverse events incurred by administering the Bcl inhibitor in the liposomal composition is less than the incidence or severity of said one or more adverse events incurred by administering the Bcl inhibitor in in non-liposomal form; and wherein the total amount of the Bcl inhibitor in the liposomal composition is equal to the therapeutically effective amount of the Bcl inhibitor when administered in non-liposomal form.

In one aspect, provided is a liposome comprising:
(a) a lipid bilayer comprising a first lipid and a first sterol;
(b) an internal medium comprising a first loading aid, a first solvent, and a second solvent; and
(c) a Bcl inhibitor encapsulated in the internal medium of said liposome.

In another aspect, provided is a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome.

In another aspect, provided is a pharmaceutical composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and a therapeutic agent external to the one or more liposomes.

In another aspect, provided is a method for delivering a therapeutically effective amount of a Bcl inhibitor to a subject comprising administering to the subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome.

In another aspect, provided is a method for treating a hyperproliferative disorder in a subject in need thereof, the method comprising administering to the subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome.

In another aspect, provided is a method for reducing the incidence or severity of thrombocytopenia associated with administration of a therapeutically effective amount of a Bcl inhibitor, the method comprising administering to a subject a liposomal composition comprising one or more liposomes, wherein each of the one or more liposomes comprises:
(a) a lipid bilayer comprising a first lipid and a first sterol;

(b) an internal medium comprising a first loading aid and a first solvent; and (c) a Bcl inhibitor encapsulated in the internal medium of said liposome;

wherein the incidence or severity of thrombocytopenia incurred by administering the Bcl inhibitor in the liposomal composition is less than the incidence or severity of thrombocytopenia incurred by administering the Bcl inhibitor in in non-liposomal form; and wherein the total amount of the Bcl inhibitor in the liposomal composition is equal to the therapeutically effective amount of the Bcl inhibitor when administered in non-liposomal form.

In another aspect, provided is a method for reducing the total dose of a Bcl inhibitor administered to a subject to achieve a therapeutic effect, the method comprising administering to a subject a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome; and wherein the total amount of the Bcl inhibitor in the liposomal composition necessary to achieve the therapeutic effect is less than the total amount of the Bcl inhibitor necessary to achieve the same therapeutic effect when administered in non-liposomal form.

In another aspect, provided is a method for reducing the total dose of a Bcl inhibitor administered to a subject to achieve a therapeutic effect in treating a hyperproliferative disorder, the method comprising administering to a subject a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome; and wherein the total amount of the Bcl inhibitor in the liposomal composition necessary to achieve the therapeutic effect is less than the total amount of the Bcl inhibitor necessary to achieve the same therapeutic effect when administered in non-liposomal form.

In another aspect, provided is a method for reducing inter-subject variability of exposure to a Bcl inhibitor administered to subjects in need thereof, the method comprising administering to said subjects a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome; and wherein the inter-subject variability of exposure to the Bcl inhibitor administered in the liposomal composition is less than the inter-subject variability of exposure to the Bcl inhibitor when administered in non-liposomal form; and wherein the total amount of the Bcl inhibitor in the liposomal composition is equal to the therapeutically effective amount of the Bcl inhibitor when administered in non-liposomal form.

In another aspect, provided is a method for increasing the half-life of a Bcl inhibitor in a subject, the method comprising administering to a subject a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome; and wherein the half-life of the Bcl inhibitor when administered in the liposomal composition is more than the half-life of the Bcl inhibitor when administered in non-liposomal form.

In another aspect, provided is a method for reducing dosing frequency of a Bcl inhibitor in a subject, the method comprising administering to the subject a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome; and wherein the dosing frequency of the Bcl inhibitor administered in the liposomal composition is less than the dosing frequency of the Bcl inhibitor when administered in non-liposomal form; and wherein the total amount of the Bcl inhibitor in the liposomal composition is equal to the therapeutically effective amount of the Bcl inhibitor when administered in non-liposomal form.

In another aspect, provided is a method for reducing the incidence or severity of one or more adverse events associated with administration of a therapeutically effective amount of a Bcl inhibitor, the method comprising administering to a subject a liposomal composition comprising one or more liposomes, wherein each of the one or more liposomes comprises:

(a) a lipid bilayer comprising a first lipid and a first sterol;

(b) an internal medium comprising a first loading aid and a first solvent; and (c) a Bcl inhibitor encapsulated in the internal medium of said liposome;

wherein the incidence or severity of said one or more adverse events incurred by administering the Bcl inhibitor in the liposomal composition is less than the incidence or severity of said one or more adverse events incurred by administering the Bcl inhibitor in in non-liposomal form; and wherein the total amount of the Bcl inhibitor in the liposomal composition is equal to the therapeutically effective amount of the Bcl inhibitor when administered in non-liposomal form.

In some embodiments of all the aforementioned aspects, the first lipid is a polymer-conjugated lipid. In some embodiments, the polymer-conjugated lipid is selected from the group consisting of 1,2-distearoyl-rac-glycero-3-methoxypoly(ethylene glycol) (such as DSG-PEG2000), 1,2-dimyristoyl-rac-glycero-3-methoxypoly(ethylene glycol) (such as DMG-PEG2000), 1,2-dipalmitoyl-rac-glycero-3-methoxypoly(ethylene glycol) (such as DPG-PEG2000), and 1,2-distearoyl-sn-glycero-3-phosphoethanolamine-poly(ethylene glycol) (such as DSPE-PEG2000). In some embodiments, the polymer-conjugated lipid is 1,2-distearoyl-rac-glycero-3-methoxypoly(ethylene glycol) or 1,2-dimyristoyl-rac-glycero-3-methoxypoly(ethylene glycol). In some embodiments, the polymer-conjugated lipid is 1,2-distearoyl-rac-glycero-3-methoxypoly(ethylene glycol). In some embodiments, the polymer-conjugated lipid is DSG- PEG2000. In some embodiments, the lipid bilayer further comprises a second lipid. In some embodiments, the second lipid is a phospholipid. In some embodiments, the phospholipid is selected from the group consisting of a phosphatidylcholine, a sphingolipid, and a hydrogenated sphingolipid. In some embodiments, the second lipid is sphingomyelin. In some embodiments, the second lipid is distearoyl phosphatidyl choline (DSPC), hydrogenated sphingomyelin (dihydrosphingomyelin), or egg sphingomyelin. In some embodiments, the second lipid is distearoyl phosphatidyl choline (DSPC) or hydrogenated sphingomyelin (dihydrosphingomyelin). In some embodiments, the second lipid is distearoyl phosphatidyl choline (DSPC). In some embodiments, the second lipid is hydrogenated sphingomyelin (dihydrosphingomyelin). In some embodiments, the second lipid is egg sphingomyelin.

In some embodiments of all the aforementioned aspects, the first lipid is a first phospholipid. In some embodiments, the phospholipid is selected from the group consisting of a phosphatidylcholine, a sphingolipid, and a hydrogenated sphingolipid. In some embodiments, the first lipid is distearoyl phosphatidyl choline (DSPC). In some embodiments, the first lipid is sphingomyelin. In some embodiments, the first lipid is hydrogenated sphingomyelin (dihydrosphingomyelin). In some embodiments, the lipid bilayer further comprises a second lipid. In some embodiments, the second lipid is a second phospholipid. In some embodiments, the second phospholipid is selected from the group consisting of a phosphatidylcholine, a sphingolipid, and a hydrogenated sphingolipid. In some embodiments, the second lipid is distearoyl phosphatidyl glycerol (DSPG). In some embodiments, the second lipid is sphingomyelin. In some embodiments, the second lipid is hydrogenated sphingomyelin (dihydrosphingomyelin).

In some embodiments, the lipid bilayer comprises dyhydrosphingomyelin (DHSM), cholesterol, and DSG-PEG2000. In some embodiments, the lipid bilayer comprises DHSM/cholesterol/DSG-PEG2000 at a molar ratio of about 53:45:2. In some embodiments, the lipid bilayer comprises distearoyl phosphatidyl choline (DSPC), cholesterol, and DSG-PEG2000. In some embodiments, the lipid bilayer comprises DSPC/cholesterol/DSG-PEG2000 at a molar ratio of about 57:38:5.6.

In some embodiments of all the aforementioned aspects, the first solvent is an aqueous solvent. In some embodiments, the aqueous solvent is an acidic aqueous solvent.

In some embodiments of all the aforementioned aspects, the internal medium further comprises a second solvent. In some embodiments, the second solvent is an organic solvent. In some embodiments, the organic solvent is an aprotic organic solvent. In some embodiments, the second solvent is dimethylsulfoxide (DMSO).

In some embodiments of all the aforementioned aspects, first loading aid is an ionic loading aid. In some embodiments, the first loading aid is a sulfate salt, a sucrose octasulfate salt, or a citrate salt. In some embodiments, the first loading aid is selected from the group consisting of ammonium sulfate (AS), ammonium sucrose octasulfate (NH4SOS), potassium sucrose octasulfate (KSOS), triethanolammonium sucrose octasulfate (TEA(OH)SOS), triethylammonium sucrose octasulfate (TEASOS), ammonium citrate, and sodium citrate. In some embodiments, the first loading aid is selected from the group consisting of ammonium sulfate (AS), ammonium sucrose octasulfate (NH4SOS), potassium sucrose octasulfate (KSOS), triethylammonium sucrose octasulfate (TEASOS), triethanolammonium sucrose octasulfate (TEA(OH)SOS), ammonium citrate, and sodium citrate. In some embodiments, the first loading aid is selected from the group consisting of ammonium sulfate (AS), ammonium sucrose octasulfate (NH4SOS), potassium sucrose octasulfate (KSOS), triethylammonium sucrose octasulfate (TEASOS), and sodium citrate. In some embodiments, the first loading aid is ammonium sulfate (AS). In some embodiments, the first loading aid is ammonium sucrose octasulfate (NH4SOS). In some embodiments, the first loading aid is potassium sucrose octasulfate (KSOS). In some embodiments, the first loading aid is triethylammonium sucrose octasulfate (TEASOS). In some embodiments, the first loading aid is sodium citrate. In some embodiments, the internal medium further comprises a second loading aid. In some embodiments, the second loading aid is an ionic loading aid. In some embodiments, the second loading aid is a sulfate salt, a sucrose octasulfate salt, or a citrate salt. In some embodiments, the second loading aid is selected from the group consisting of ammonium sulfate (AS), ammonium sucrose octasulfate (NH4SOS), potassium sucrose octasulfate (KSOS), triethylammonium sucrose octasulfate (TEASOS), triethanolammonium sucrose octasulfate (TEA(OH)SOS), ammonium citrate, and sodium citrate. In some embodiments, the second loading aid is ammonium sulfate (AS). In some embodiments, the second loading aid is ammonium sucrose octasulfate (NH4SOS). In some embodiments, the second loading aid is potassium sucrose octasulfate (KSOS). In some embodiments, the second loading aid is triethylammonium sucrose octasulfate (TEASOS). In some embodiments, the second loading aid is sodium citrate. In some embodiments, the first loading aid is potassium sucrose octasulfate (KSOS) and the second loading aid is sodium citrate.

In some embodiments of all the aforementioned aspects, the first sterol is cholesterol, a cholesterol derivative, or a phytosterol (such as beta-sitosterol). In some embodiments, the first sterol is cholesterol. In some embodiments, the first sterol is beta-sitosterol.

In some embodiments of all the aforementioned aspects, the Bcl inhibitor is selected from the group consisting of a Bcl-2 inhibitor, a Bcl-$X_L$ inhibitor, and a Bcl-2/Bcl-$X_L$ dual inhibitor. In some embodiments of all the aforementioned aspects, the Bcl inhibitor is a Bcl-2 inhibitor. In some embodiments, the Bcl inhibitor is a Bcl-$X_L$ inhibitor. In some embodiments, the Bcl inhibitor is a Bcl-2/Bcl-$X_L$ dual inhibitor. In some embodiments, the Bcl inhibitor is a compound of Formula (I):

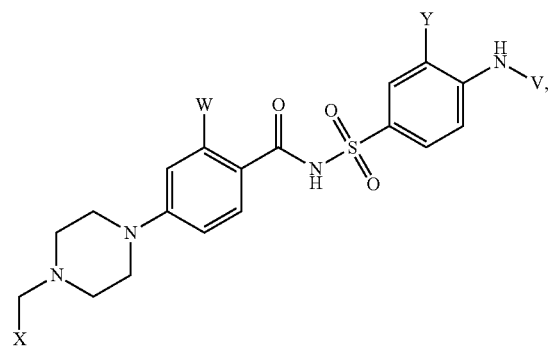

or a stereoisomer, tautomer, or pharmaceutically acceptable salt thereof, wherein:

V is
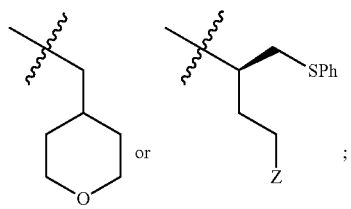
W is H or
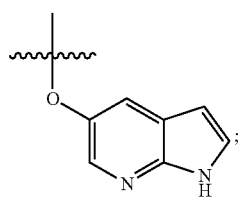
X is
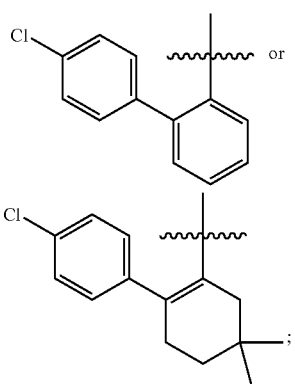
Y is —NO₂ or —SO₂CF₃;
Z is selected from the group consisting of
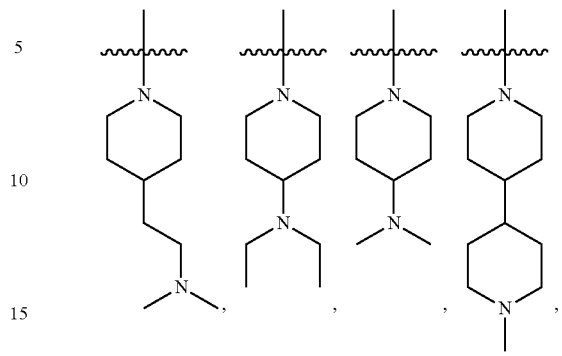
In some embodiments, the Bcl inhibitor is selected from the group consisting of
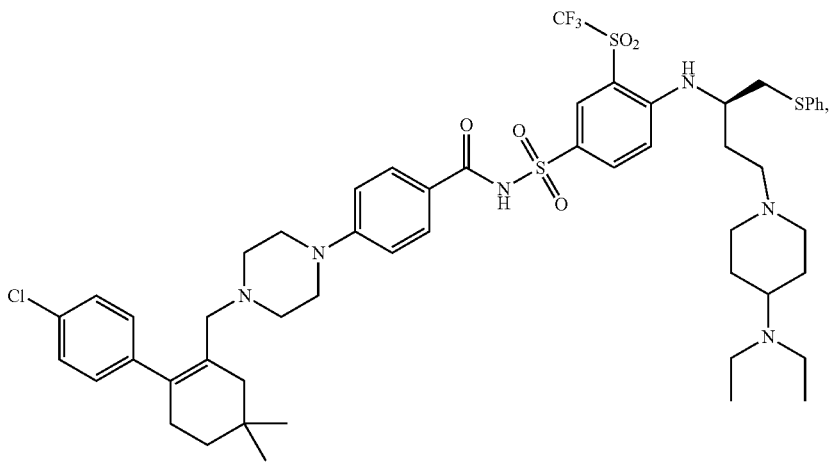

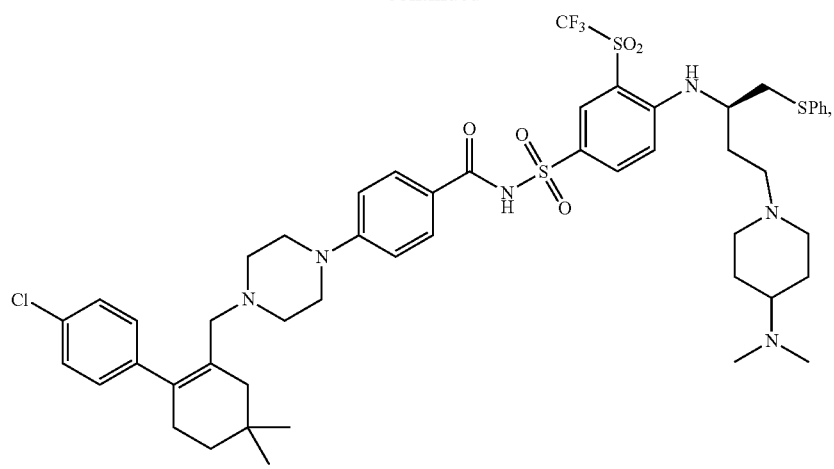
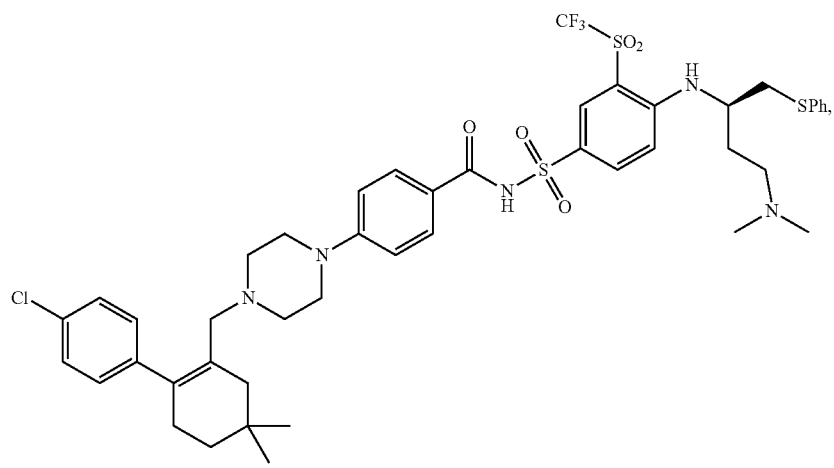
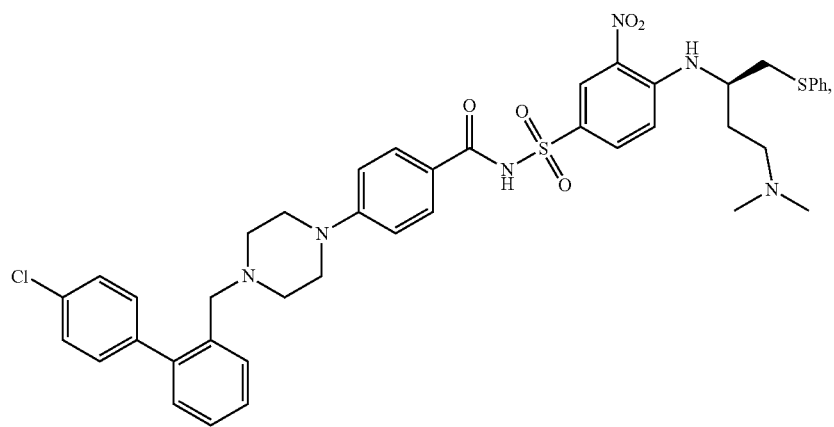

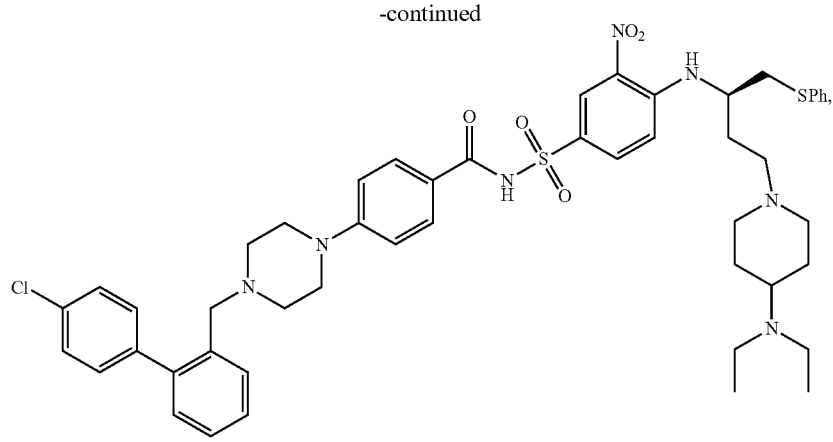
venetoclax (ABT-199), navitoclax (ABT-263), obatoclax mesylate (GX15-070), sabutoclax, TW-37, (R)-(−)-gossypol acetic acid, HA14-1, a BH3-mimetic, and oblimersen. In some embodiments, the Bcl inhibitor is selected from the group consisting of
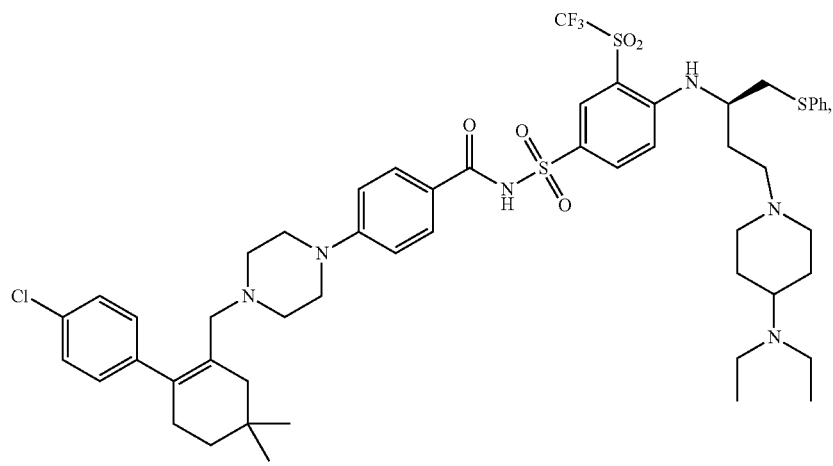
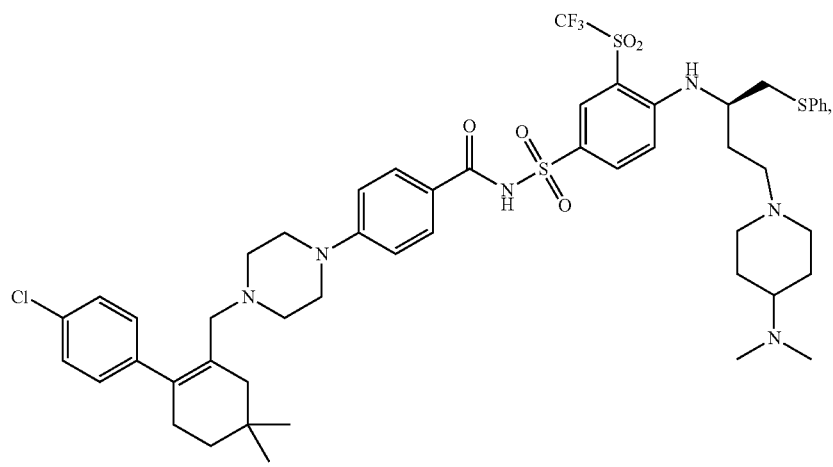

-continued
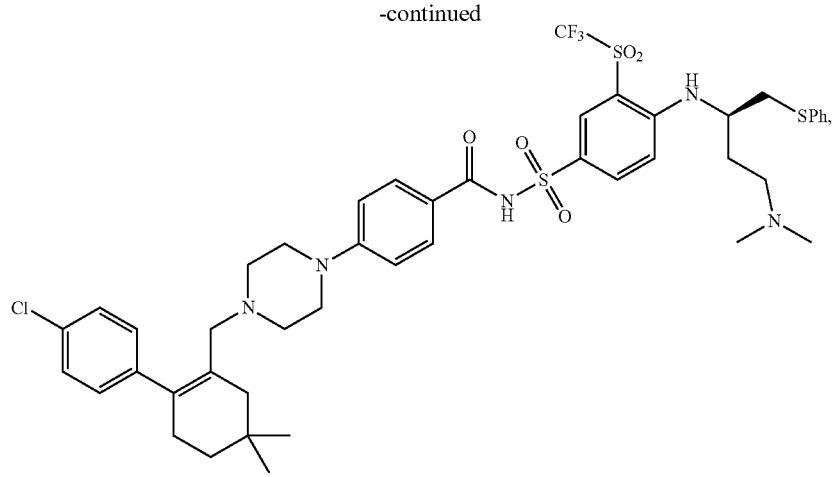
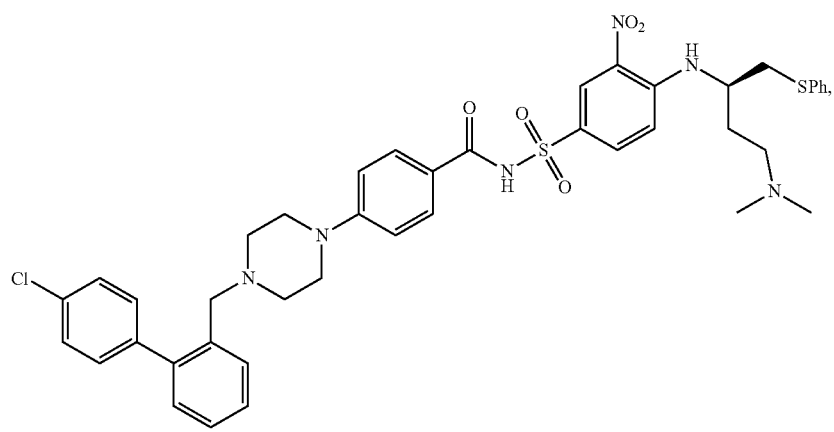
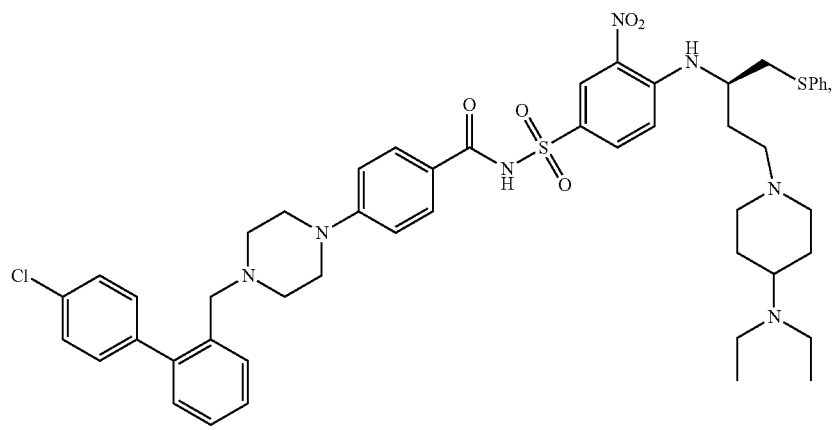
venetoclax (ABT-199), and navitoclax (ABT-263). In some embodiments, the Bcl inhibitor is selected from the group consisting of

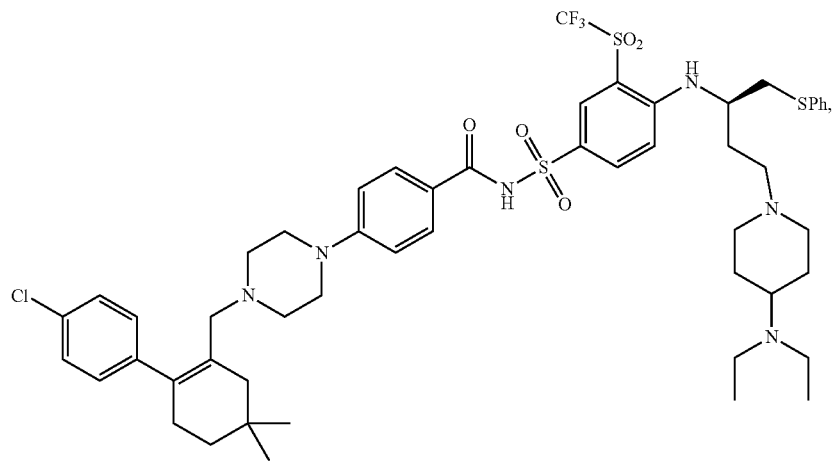
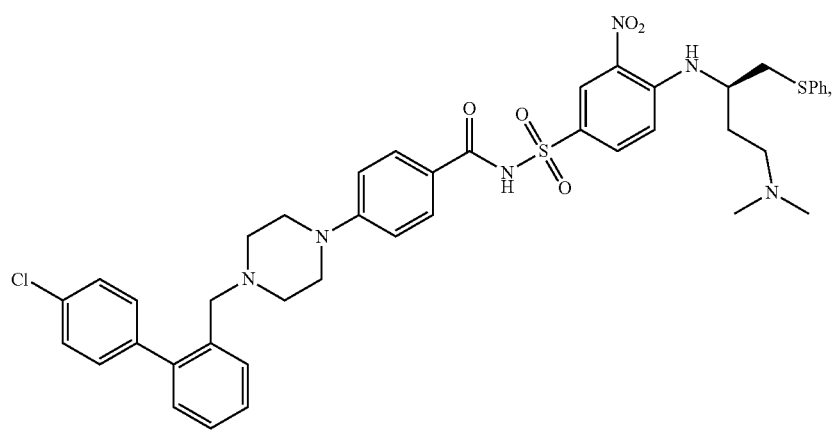
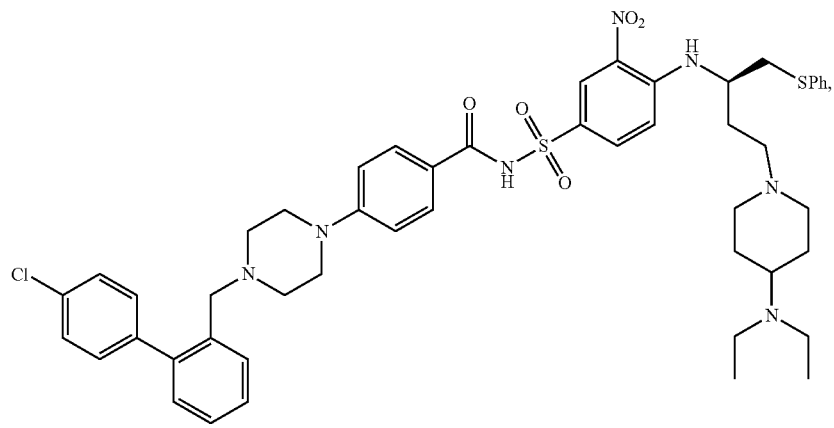
venetoclax (ABT-199), and navitoclax (ABT-263). In some embodiments, the Bcl inhibitor is

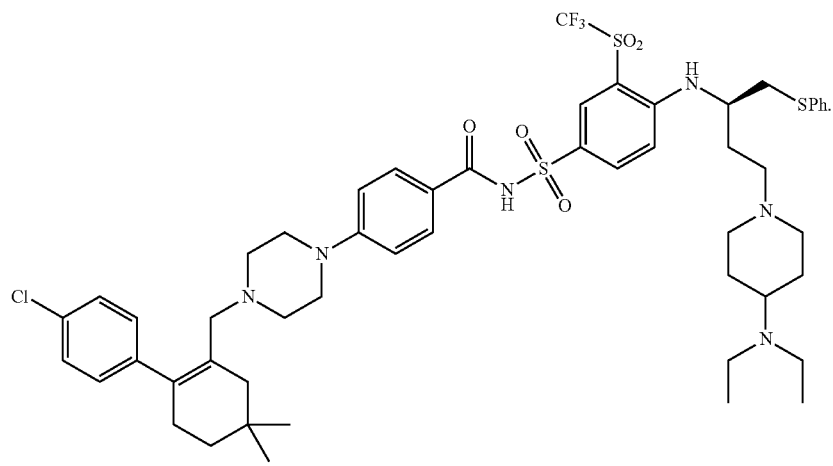
In some embodiments, the Bcl inhibitor is
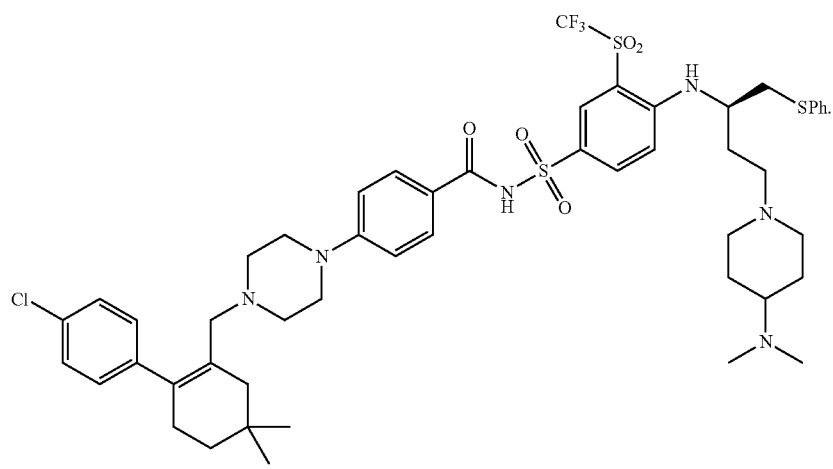
In some embodiments, the Bcl inhibitor is
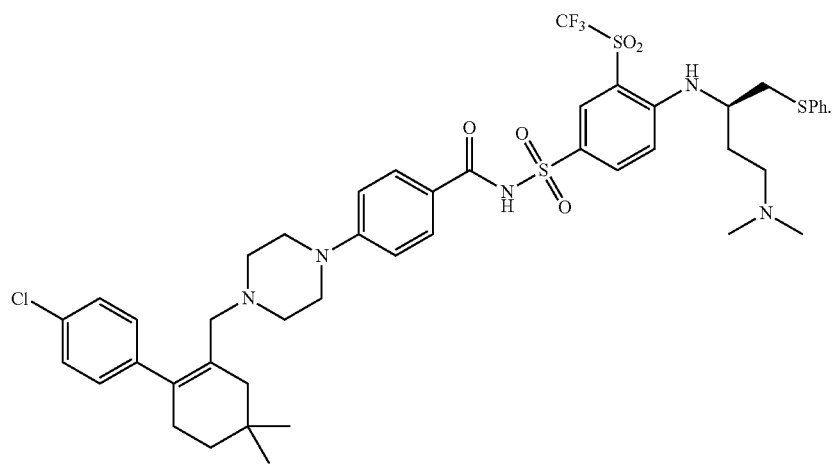

In some embodiments, the Bcl inhibitor is

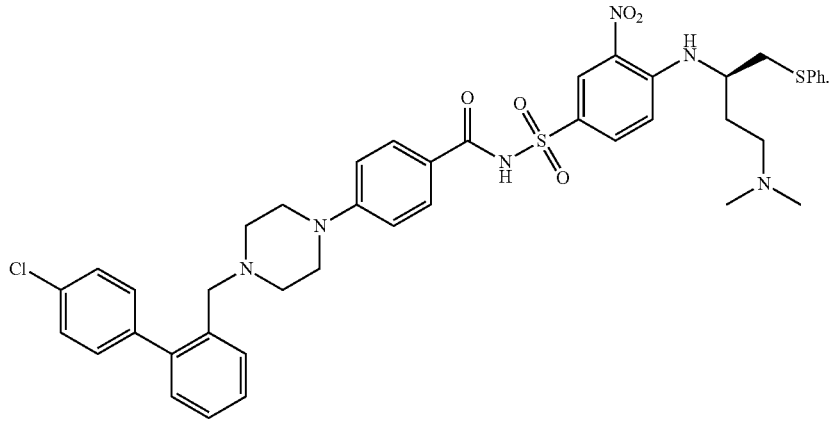

In some embodiments, the Bcl inhibitor is

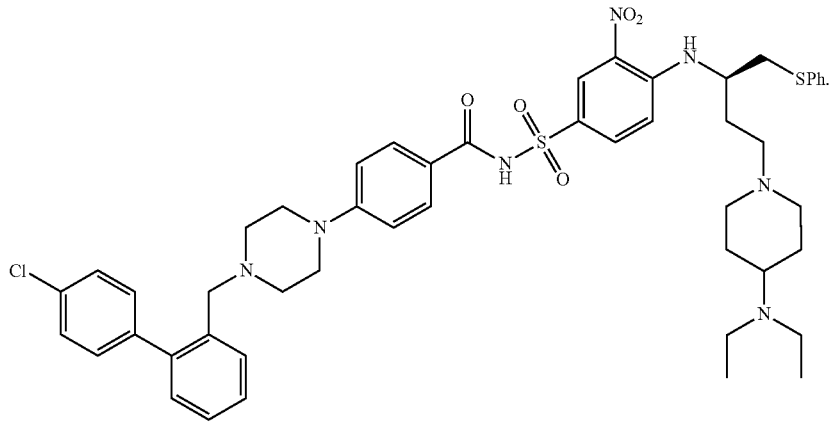

In some embodiments, the Bcl inhibitor is venetoclax. In some embodiments, the Bcl inhibitor is navitoclax.

In some embodiments of all the aforementioned aspects, the liposome further comprises an additional therapeutic agent. In some embodiments, the additional therapeutic agent is a hydrophobic therapeutic agent. In some embodiments, the additional therapeutic agent is a hydrophilic therapeutic agent. In some embodiments, the additional therapeutic agent is encapsulated in the liposome. In some embodiments, the additional therapeutic agent is external to the liposome. In some embodiments, the additional therapeutic agent has a c Log P of greater than about 2. In some embodiments, the additional therapeutic agent has a c Log P between about −6 and about 12. In some embodiments, the additional therapeutic agent has a c Log P between about −6 and about 0. In some embodiments, the additional therapeutic agent has a c Log P between about −3 and about 0. In some embodiments, the additional therapeutic agent has a c Log P between about 0 and about 2. In some embodiments, the additional therapeutic agent has a c Log P between about −1 and about 12. In some embodiments, the additional therapeutic agent has a c Log P between about 3 and about 12. In some embodiments, the additional therapeutic agent has a c Log P between about −6 and about −1. In some embodiments, the additional therapeutic agent has a c Log P between about −1 and about 3. In some embodiments, the additional therapeutic agent has a c Log P between about 2 and about 12. In some embodiments, the additional therapeutic agent has a c Log P between about 2 and about 4. In some embodiments, the additional therapeutic agent has a c Log P between about 2 and about 8. In some embodiments, the additional therapeutic agent has a c Log P between about 4 and about 12. In some embodiments, the additional therapeutic agent has a c Log P between about 4 and about 8. In some embodiments, the additional therapeutic agent has a c Log P between about 8 and about 12. In some embodiments, the additional therapeutic agent has a c Log P between about 10 and about 12. In some embodiments, the additional therapeutic agent can be protonated and its protonated form has a $pK_a$ of greater than about 2. In some embodiments, the additional therapeutic agent can be protonated and its protonated form has a $pK_a$ between about −6 and about 12. In some embodiments, the additional therapeutic agent can be protonated and its protonated form has a $pK_a$ between about −6 and about 11. In some embodiments, the additional therapeutic agent can be protonated and its protonated form has a $pK_a$ between about 3 and about 11. In some embodiments, the additional therapeutic agent can be protonated and its protonated form has a $pK_a$ between about 6 and about 11. In some embodiments, the additional therapeutic agent can be protonated and its protonated form has a $pK_a$ between about 8 and about 11. In some embodiments, the additional therapeutic agent can be protonated and its protonated form has a $pK_a$ between about −6 and about 3. In some embodiments, the additional therapeutic agent can be protonated and its protonated form has a $pK_a$ between about 3 and about 6. In some embodiments, the additional therapeutic agent can be protonated and its protonated form has a $pK_a$ between about 6 and about 8. In some embodiments, the additional therapeutic agent can be protonated and its protonated form has a $pK_a$ between about −6 and about 8. In some embodiments, the additional therapeutic agent can be protonated and its protonated form has a $pK_a$ between about 3 and about 8. In some embodiments, the additional therapeutic agent can be protonated and its protonated form has a $pK_a$ between about −6 and about 6. In some embodiments, the additional therapeutic agent can be protonated and its protonated form has a $pK_a$ between about 2 and about 12. In some embodiments, the additional therapeutic agent can be protonated and its protonated form has a $pK_a$ between about 2 and about 8. In some embodiments, the additional therapeutic agent can be protonated and its protonated form has a $pK_a$ between about 2 and about 4. In some embodiments, the additional therapeutic agent can be protonated and its protonated form has a $pK_a$ between about 4 and about 12. In some embodiments, the additional therapeutic agent can be protonated and its protonated form has a $pK_a$ between about 4 and about 8. In some embodiments, the additional therapeutic agent can be protonated and its protonated form has a $pK_a$ between about 8 and about 12. In some embodiments, the additional therapeutic agent can be protonated and its protonated form has a $pK_a$ between about 10 and about 12.

In some embodiments of all the aforementioned aspects, the additional therapeutic agent is an antineoplastic agent. In some embodiments, the additional therapeutic agent is selected from an alkylating agent, an anti-angiogenic agent, an antimetabolite, an apoptosis inducing agent, a cell cycle inhibitor, a cell cycle control inhibitor, a checkpoint inhibitor, a cyclin-dependent kinase inhibitor, a cytotoxic agent, a DNA damaging agent, a DNA repair inhibitor, a mitochondrial poison, a receptor tyrosine kinase inhibitor, a telomerase inhibitor, a signal transduction inhibitor, a transcription inhibitor, a Bcl inhibitor, a PARP inhibitor, a PI3K inhibitor, an HSP90 inhibitor, a JAK inhibitor, an ATR inhibitor, an HDAC inhibitor, a tyrosine kinase inhibitor, a receptor tyrosine kinase inhibitor, a BTK inhibitor, an alkylating agent, an SMO inhibitor, an antitubulin agent, an MEK inhibitor, a topoisomerase inhibitor, a RAF inhibitor, a BRAF inhibitor, or a proteasome inhibitor.

In some embodiments, the additional therapeutic agent is a second Bcl inhibitor such as those described above.

In some embodiments, the additional therapeutic agent is an HSP90 inhibitor. In some embodiments, the HSP90 inhibitor is Luminespib.

In some embodiments, the additional therapeutic agent is an alkylating agent. In some embodiments, the additional therapeutic agent is an alkylating agent selected from the group consisting of Bendamustine and Chlorambucil.

In some embodiments, the additional therapeutic agent is an antitubulin agent. In some embodiments, the additional therapeutic agent is an antitubulin agent selected from the group consisting of Vincristine, Vinorelbine, and docetaxel.

In some embodiments, the additional therapeutic agent is an ATR inhibitor.

In some embodiments, the additional therapeutic agent is a RAF inhibitor. In some embodiments, the RAF inhibitor is Dabrafenib. In some embodiments, the additional therapeutic agent is a BRAF inhibitor. In some embodiments, the BRAF inhibitor is Vemurafenib.

In some embodiments, the additional therapeutic agent is a BTK inhibitor. In some embodiments, the BTK inhibitor is Ibrutinib.

In some embodiments, the additional therapeutic agent is an HDAC inhibitor. In some embodiments, the HDAC inhibitor is Panobinostat.

In some embodiments, the additional therapeutic agent is a JAK inhibitor. In some embodiments, the JAK inhibitor is Ruxolitinib.

In some embodiments, the additional therapeutic agent is an MEK inhibitor. In some embodiments, the additional therapeutic agent is an MEK inhibitor selected from the group consisting of Selumetinib and Cobimetinib.

In some embodiments, the additional therapeutic agent is a PARP inhibitor. In some embodiments, the additional therapeutic agent is a PARP inhibitor selected from the group consisting of Talazoparib, Niraparib, and Rucaparib.

In some embodiments, the additional therapeutic agent is a PI3K inhibitor. In some embodiments, the PI3K inhibitor is Idelalisib.

In some embodiments, the additional therapeutic agent is a proteasome inhibitor. In some embodiments, the proteasome inhibitor is Carfilzomib.

In some embodiments, the additional therapeutic agent is an SMO inhibitor. In some embodiments, the additional therapeutic agent is an SMO inhibitor selected from the group consisting of Sonidegib and Vismodegib.

In some embodiments, the additional therapeutic agent is a tyrosine kinase inhibitor. In some embodiments, the additional therapeutic agent is a tyrosine kinase inhibitor selected from the group consisting of Brigatinib, Lenvatinib, Afatinib, Axitinib, Cabozantinib, Ponatinib, Sorafenib, Osimertinib, Regorafenib, Bosutinib, Crizotinib, Vandetanib, Nilotinib, Alectinib, Ceritinib, Dasatinib, Pazopanib, Sunitinib, Erlotinib, Imatinib, Gefitinib, Lapatinib.

In some embodiments, the additional therapeutic agent is a topoisomerase inhibitor. In some embodiments, the additional therapeutic agent is a topoisomerase I inhibitor. In some embodiments, the topoisomerase inhibitor is Irinotecan.

In some embodiments, the additional therapeutic agent is a Bcl inhibitor such as those described above.

In some embodiments of all the aforementioned aspects, the liposome has a mean diameter between about 50 nm and about 250 nm. In some embodiments, the liposome has a mean diameter between about 50 nm and about 150 nm. In some embodiments, the liposome has a mean diameter between about 50 nm and about 120 nm. In some embodiments, the liposome has a mean diameter between about 50 nm and about 100 nm. In some embodiments, the liposome has a mean diameter of about 80 nm. In some embodiments, the liposome has a mean diameter between about 80 nm and about 150 nm. In some embodiments, the liposome has a mean diameter of about 120 nm.

In some embodiments of all the aforementioned aspects, the liposomal composition further comprises a carrier medium. In some embodiments, the one or more liposomes are suspended in a carrier medium. In some embodiments, the carrier medium is a pharmaceutically acceptable solution. In some embodiments, the carrier medium is an aqueous dextrose solution. In some embodiments, the carrier medium is an aqueous sucrose solution. In some embodiments, the carrier medium is a saline solution. In some embodiments, the carrier medium further comprises a buffer. In some embodiments, the buffer is a HEPES buffer. In some embodiments, the buffer is a PBS buffer. In some embodiments, the buffer is a Tris buffer. In some embodiments, the buffer is a MES buffer.

In some embodiments of all the aforementioned aspects, the liposomal composition has a polydispersity index (PDI) between about 0.001 and about 0.5. In some embodiments, the liposomal composition has a polydispersity index (PDI) between about 0.001 and about 0.3. In some embodiments, the liposomal composition has a polydispersity index (PDI) between about 0.001 and about 0.1. In some embodiments, the liposomal composition has a polydispersity index (PDI) between about 0.1 and about 0.3. In some embodiments, the liposomal composition has a polydispersity index (PDI) between about 0.1 and about 0.5. In some embodiments, the liposomal composition has a polydispersity index (PDI) between about 0.3 and about 0.5.

In some embodiments of all the aforementioned aspects, the liposomal composition further comprises a therapeutic agent external to the one or more liposomes.

Liposomes and Liposomal Compositions

Liposomes comprise one or more lipid bilayers enclosing an internal compartment. These liposomes can be multilamellar, bilamellar, or unilamellar vesicles. Unilamellar liposomes (also known as unilamellar vesicles or "ULV") enclose a single internal aqueous compartment and are classified as either small unilamellar vesicles (SUV) or large unilamellar vesicles (LUV). LUV and SUV range in size from about 50 to 500 nm and 20 to 50 nm, respectively. Bilamellar liposomes have two lipid membranes wherein the inner membrane surrounds a single internal aqueous compartment and the second, larger outer membrane surrounds the inner membrane thus creating a second internal aqueous compartment.

In some embodiments, liposomes have a mean diameter between about 20 nm and about 500 nm. In some embodiments, liposomes have a mean diameter between about 50 nm and about 250 nm. In some embodiments, liposomes have a mean diameter between about 80 nm and about 250 nm. In some embodiments, liposomes have a mean diameter between about 50 nm and about 150 nm. In some embodiments, liposomes have a mean diameter between about 80 nm and about 150 nm. In some embodiments, liposomes have a mean diameter between about 50 nm and about 120 nm. In some embodiments, liposomes have a mean diameter between about 80 nm and about 120 nm. In some embodiments, liposomes have a mean diameter of about 50 nm, about 80 nm, about 100 nm, about 120 nm, about 150 nm, or about 250 nm. In some embodiments, liposomes have a mean diameter of about 80 nm.

Maintaining the size distribution of the liposomes in the liposomal composition may be assessed experimentally by obtaining particle size profiles. Size distribution determined by quasielastic light scattering is typically presented as a histogram showing the mean diameter of the liposomes. Significant size distribution measurements most commonly used in the art are D10, D90, D99 or a standard deviation or polydispersity index (PDI). "D99" values signify that 99% of the liposomes are less than a referenced size or more than a referenced size. This is particularly useful if, for example, it is important to exclude either an upper or lower size. For example, in certain embodiments it is desirable to ensure that no liposomes over 200 nm in mean diameter are present.

In some embodiments, the size distribution of the liposomes in the liposomal composition is quantified using the polydispersity index (PDI). In some embodiments, the liposomal composition has a polydispersity index (PDI) between about 0.001 and about 0.5. In some embodiments, the liposomal composition has a polydispersity index (PDI) between about 0.001 and about 0.4. In some embodiments, the liposomal composition has a polydispersity index (PDI) between about 0.001 and about 0.3. In some embodiments, the liposomal composition has a polydispersity index (PDI) between about 0.005 and about 0.5. In some embodiments, the liposomal composition has a polydispersity index (PDI) between about 0.005 and about 0.4. In some embodiments, the liposomal composition has a polydispersity index (PDI) between about 0.005 and about 0.3. In some embodiments, the liposomal composition has a polydispersity index (PDI) between about 0.001 and about 0.2. In some embodiments, the liposomal composition has a polydispersity index (PDI) between about 0.001 and about 0.1. In some embodiments, the liposomal composition has a polydispersity index (PDI) between about 0.005 and about 0.2. In some embodiments, the liposomal composition has a polydispersity index (PDI) between about 0.005 and about 0.1. In some embodiments, the liposomal composition has a polydispersity index (PDI) between about 0.01 and about 0.5. In some embodiments, the liposomal composition has a polydispersity index (PDI) between about 0.01 and about 0.4. In some embodiments, the liposomal composition has a polydispersity index (PDI) between about 0.01 and about 0.2. In some embodiments, the liposomal composition has a polydispersity index (PDI) between about 0.01 and about 0.1. In some embodiments, the liposomal composition has a polydispersity index (PDI) between about 0.1 and about 0.5. In some embodiments, the liposomal composition has a polydispersity index (PDI) between about 0.1 and about 0.3. In some embodiments, the liposomal composition has a polydispersity index (PDI) between about 0.3 and about 0.5.

In some embodiments, the liposomal compositions may further comprise a carrier medium. In some embodiments, the one or more liposomes are suspended in a carrier medium. In some embodiments, the carrier medium is a pharmaceutically acceptable solution. In some embodiments, the carrier medium is an aqueous dextrose solution. In some embodiments, the carrier medium is an aqueous sucrose solution. In some embodiments, the carrier medium is a saline solution. In some embodiments, the carrier medium further comprises a buffer. In some embodiments, the buffer is a HEPES buffer. In some embodiments, the buffer is a PBS buffer. In some embodiments, the buffer is a Tris buffer. In some embodiments, the buffer is a MES buffer.

Therapeutic Agents

In some embodiments, the liposomes and liposomal compositions provided therein comprise a therapeutic agent encapsulated in the liposomes. In some embodiments, the liposomes and liposomal compositions provided therein comprise a hydrophobic therapeutic agent encapsulated in the liposomes.

In some embodiments of all the aforementioned aspects, the Bcl inhibitor is a Bcl-2 inhibitor. In some embodiments, the Bcl inhibitor is a Bcl-$X_L$ inhibitor. In some embodiments, the Bcl inhibitor is a Bcl-2/Bcl-$X_L$ dual inhibitor. In some embodiments, the Bcl inhibitor is a compound of Formula (I):

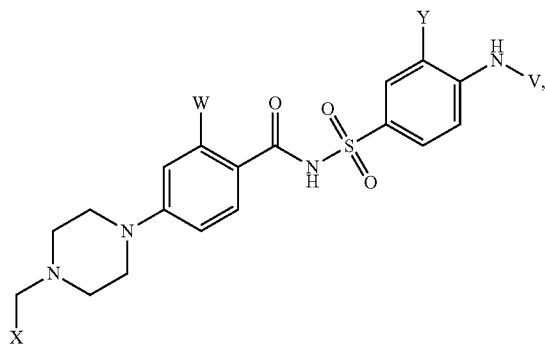
or a stereoisomer, tautomer, or pharmaceutically acceptable salt thereof, wherein:
V is
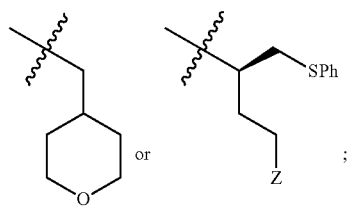
W is H or
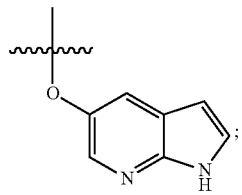 [SMILES: *Oc1cnc2[nH]ccc2c1]
X is
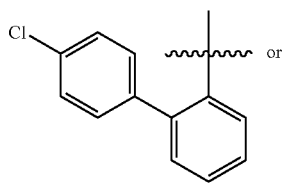
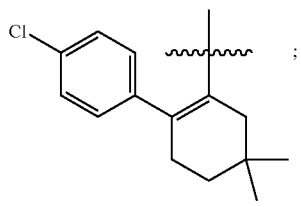
Y is —NO₂ or —SO₂CF₃;
Z is selected from the group consisting of
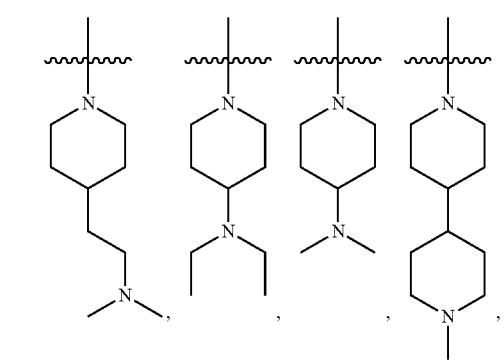
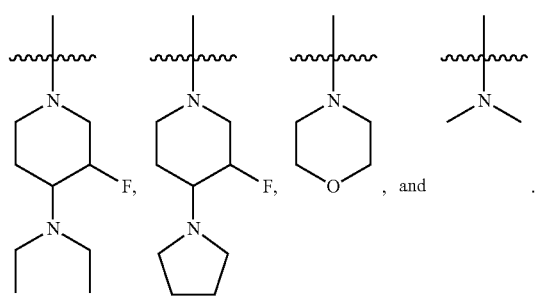
In some embodiments, V is
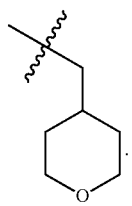
In some embodiments, V is
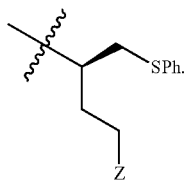
In some embodiments, W is H. In some embodiments, W is
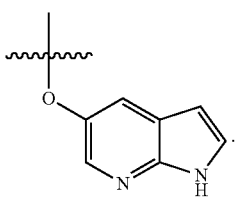 [SMILES: *Oc1cnc2[nH]ccc2c1]

In some embodiments, X is
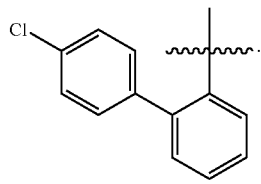 [SMILES: *c1ccccc1-c1ccc(Cl)cc1]
In some embodiments, X is
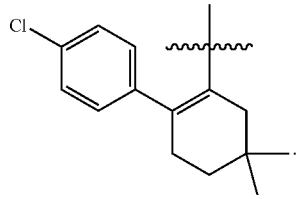 [SMILES: *C1=C(c2ccc(Cl)cc2)CCC(C)(C)C1]
In some embodiments, Y is —NO$_2$. In some embodiments, Y is —SO$_2$CF$_3$.
In some embodiments, Z is
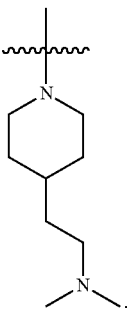 [SMILES: *N1CCC(CCN(C)C)CC1]
In some embodiments, Z is
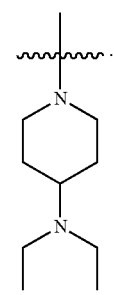
In some embodiments, Z is
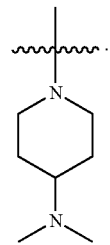
In some embodiments, Z is
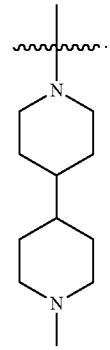
In some embodiments, Z is
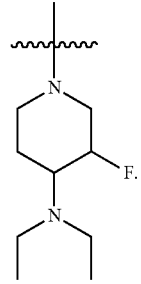 [SMILES: *N1CCC(N(CC)CC)C(F)C1]
In some embodiments, Z is
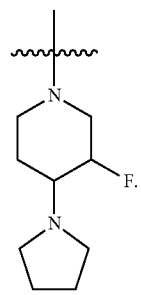 [SMILES: *N1CCC(N2CCCC2)C(F)C1]

In some embodiments, Z is
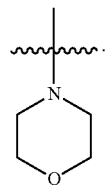
In some embodiments, Z is
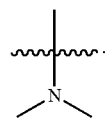
In some embodiments, the Bcl inhibitor is selected from the group consisting of
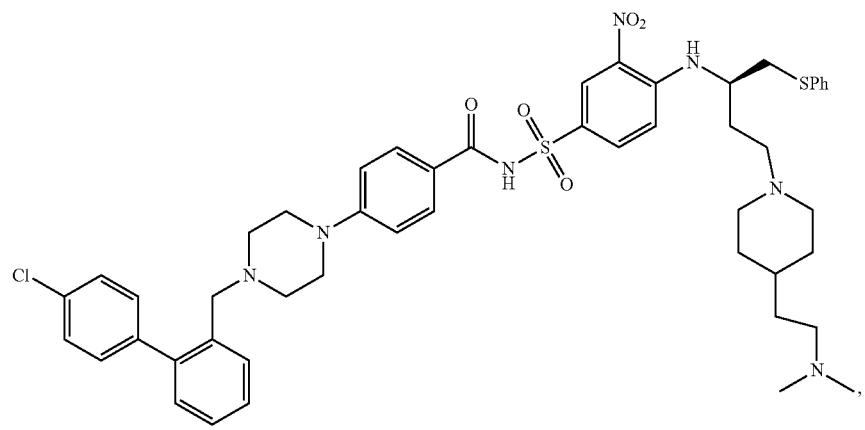
Compound 1
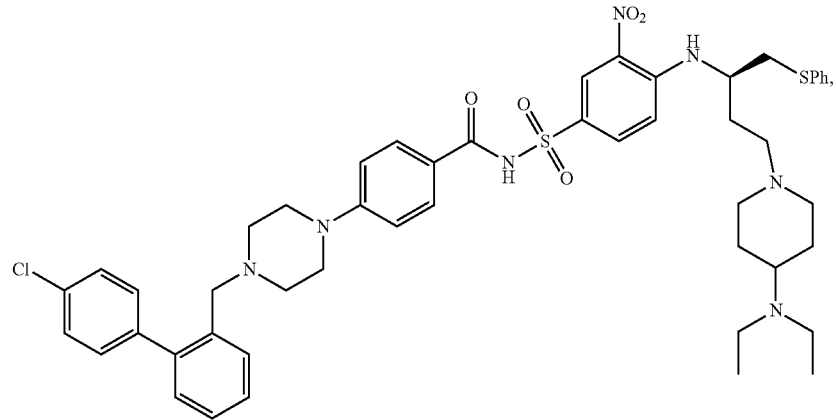
Compound 2
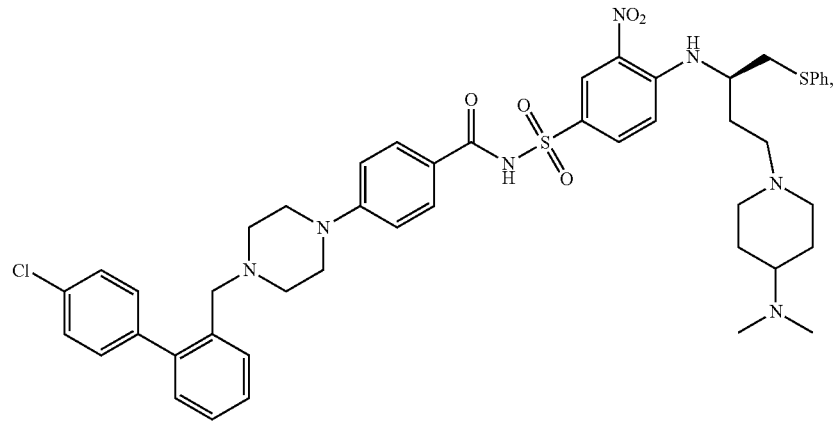
Compound 3

-continued
Compound 4
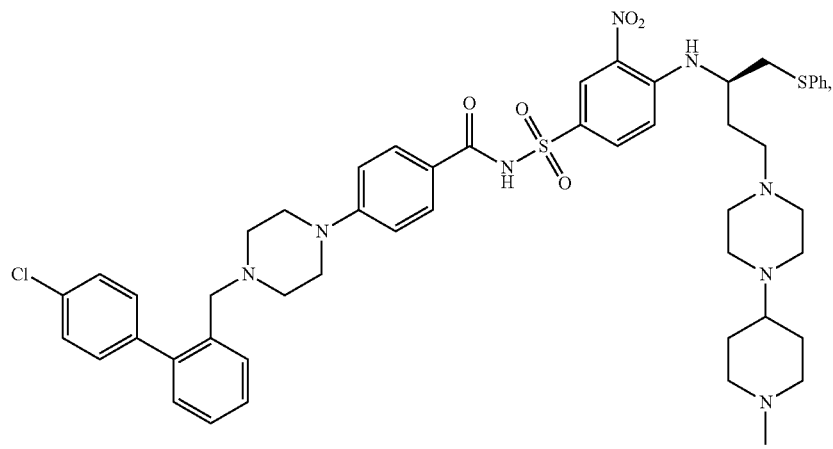
Compound 5
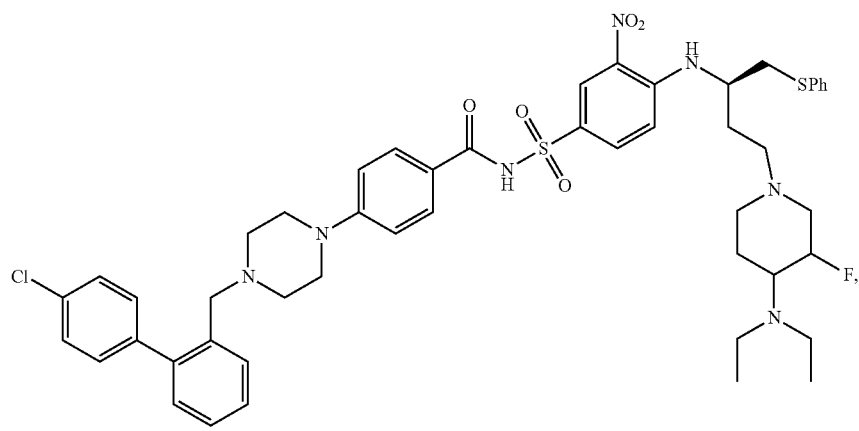
Compound 6
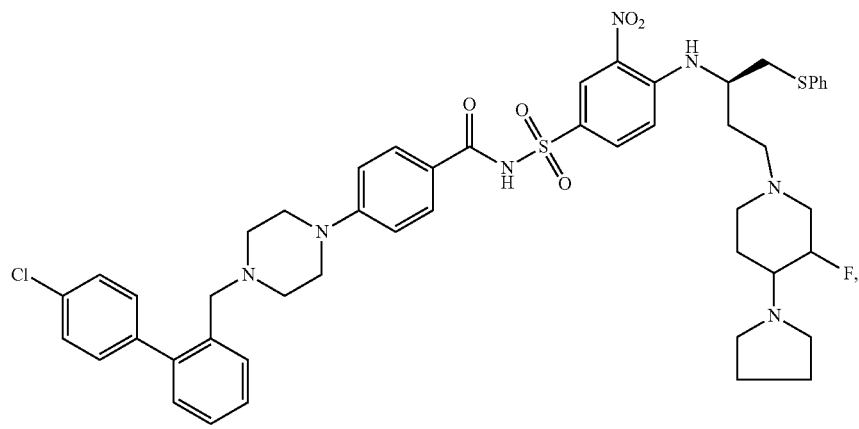

-continued
Compound 7
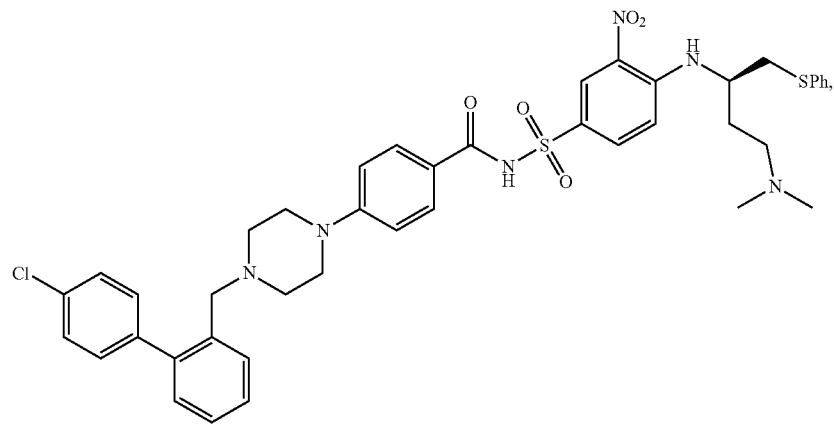
Compound 8
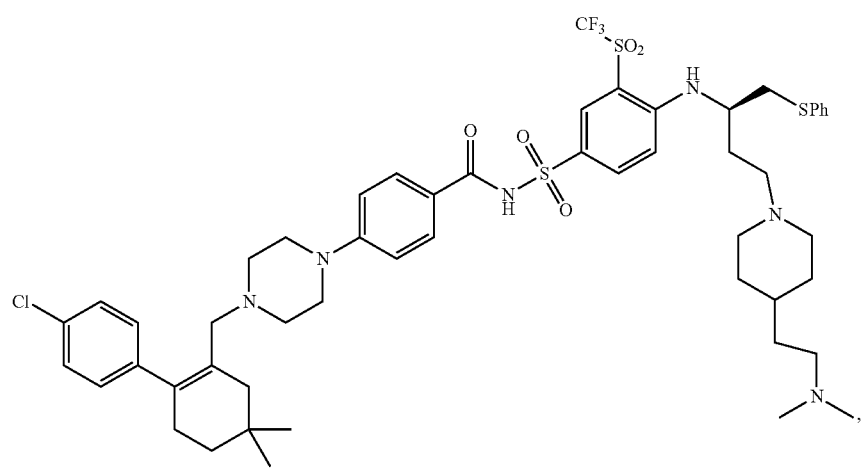
Compound 9
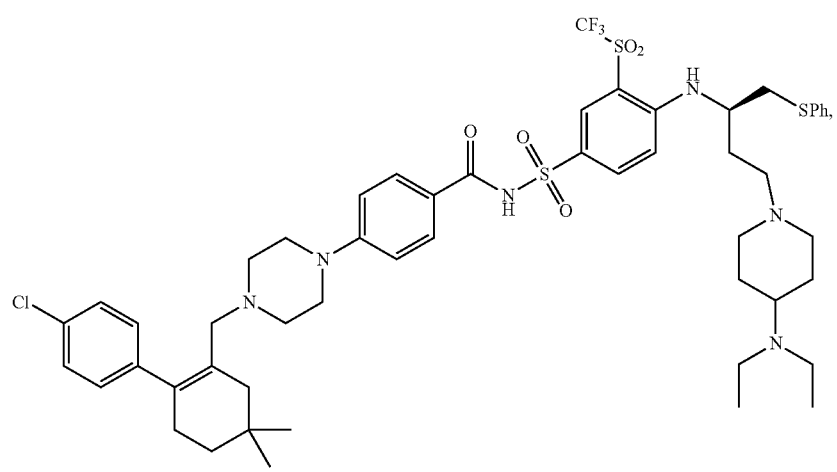

-continued
Compound 10
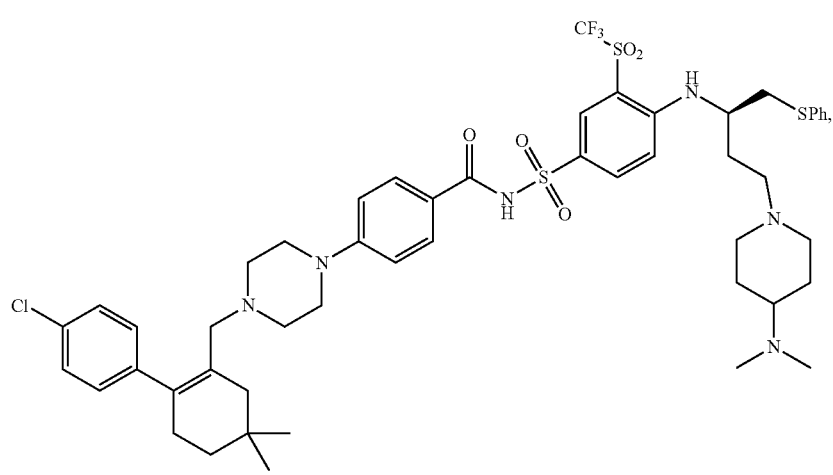
Compound 11
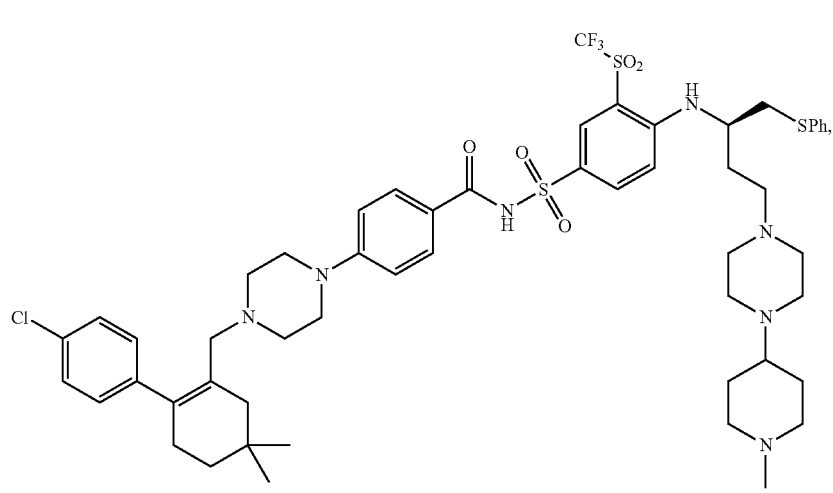
Compound 12
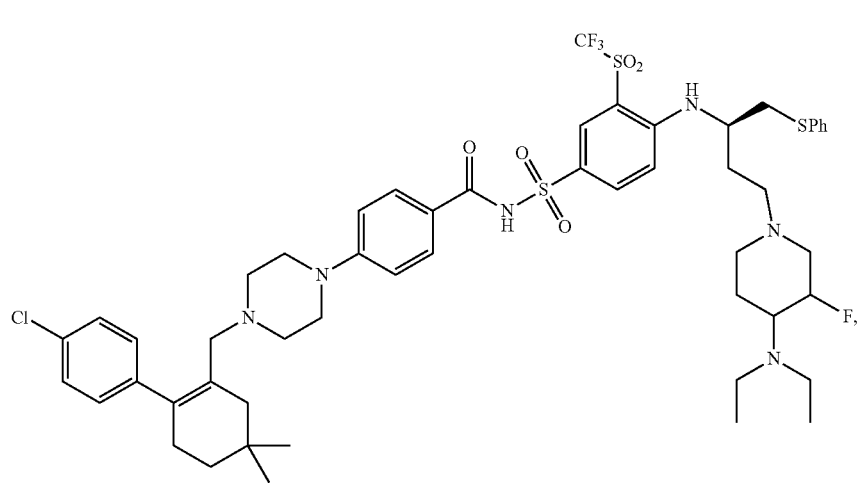

-continued
Compound 13
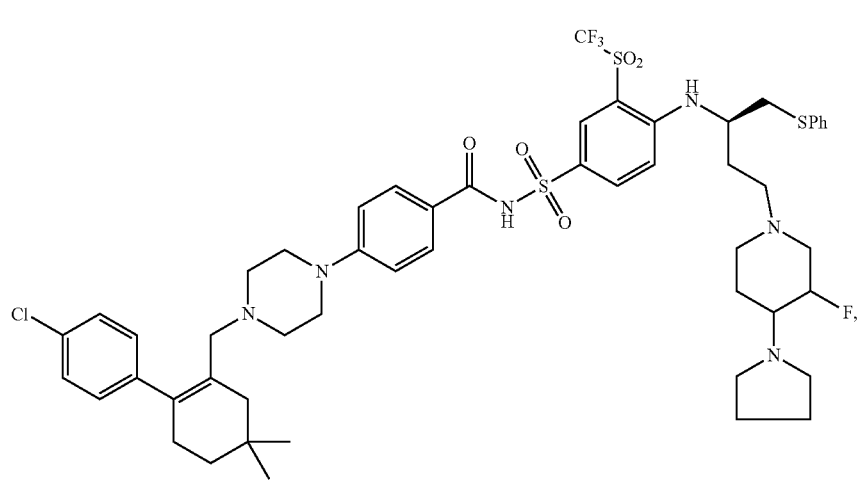
Compound 14
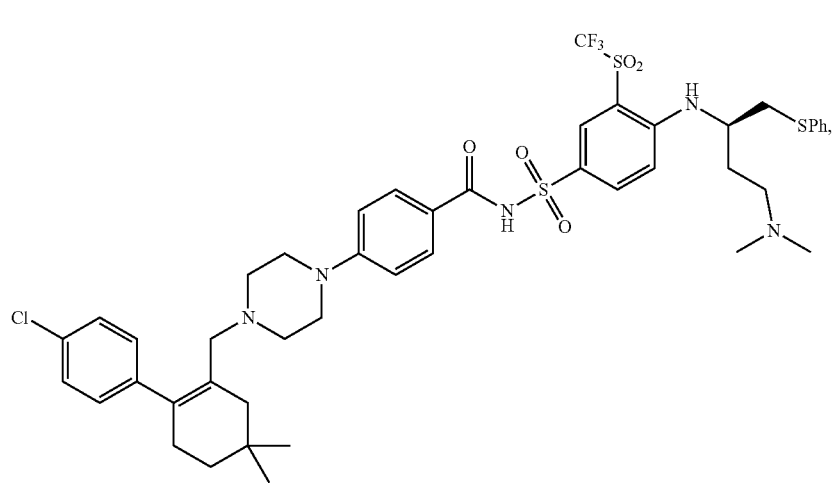
Compound 15
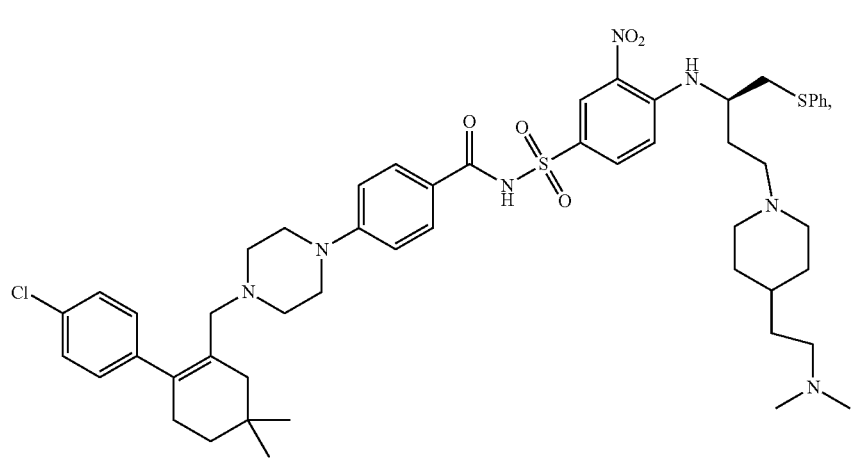

Compound 16
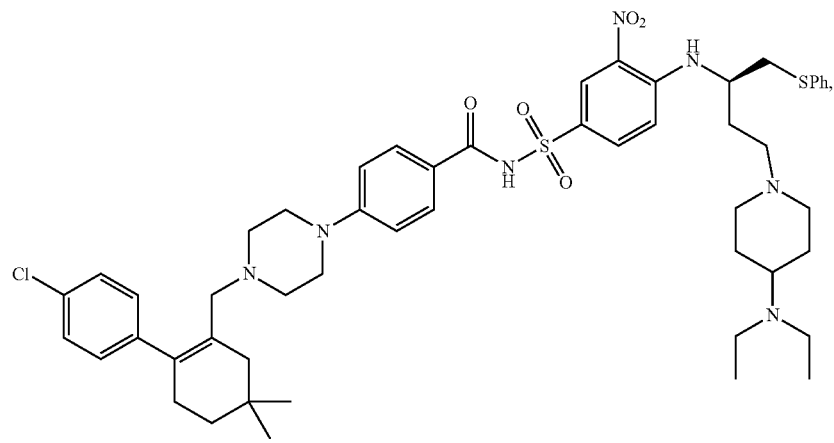
Compound 17
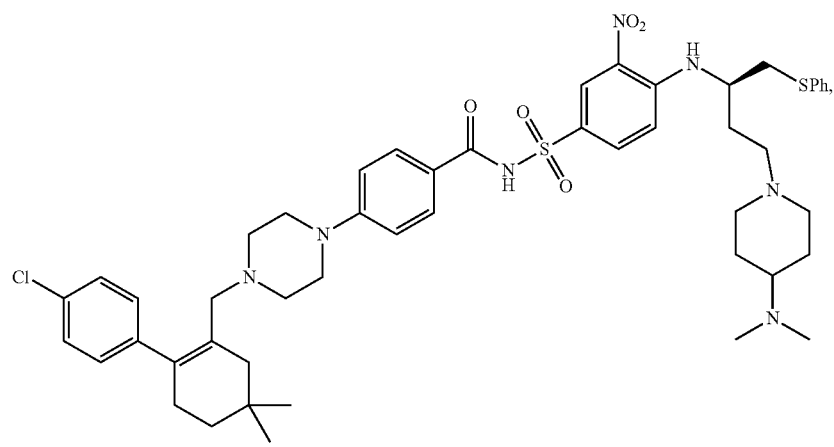
Compound 18
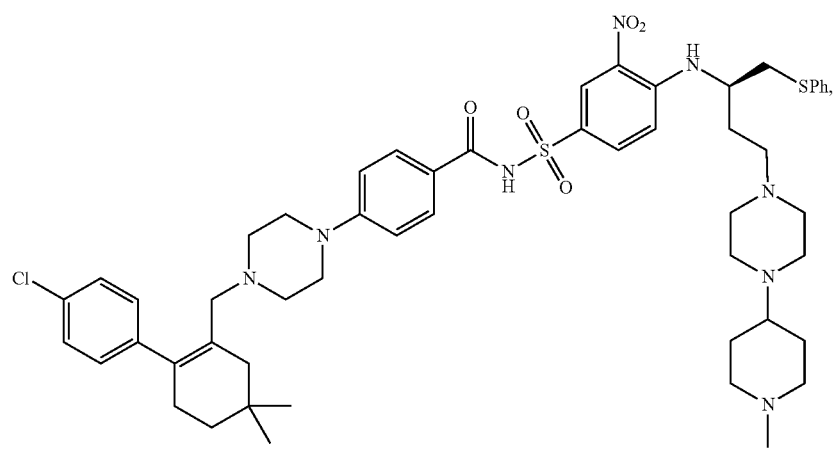

-continued
Compound 19
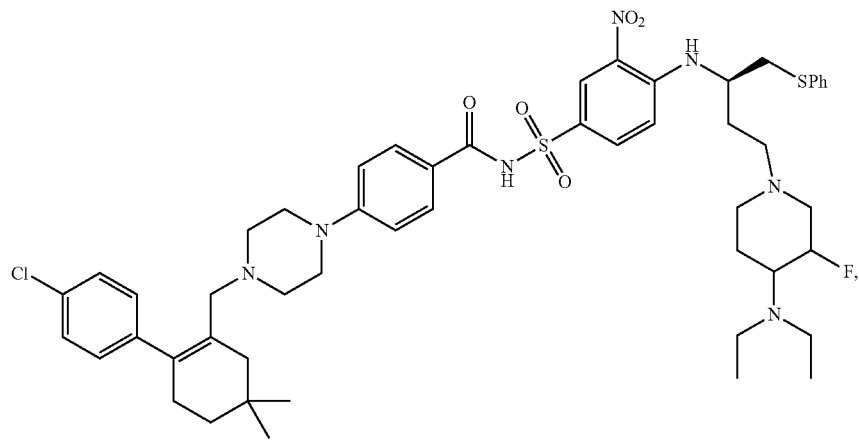
Compound 20
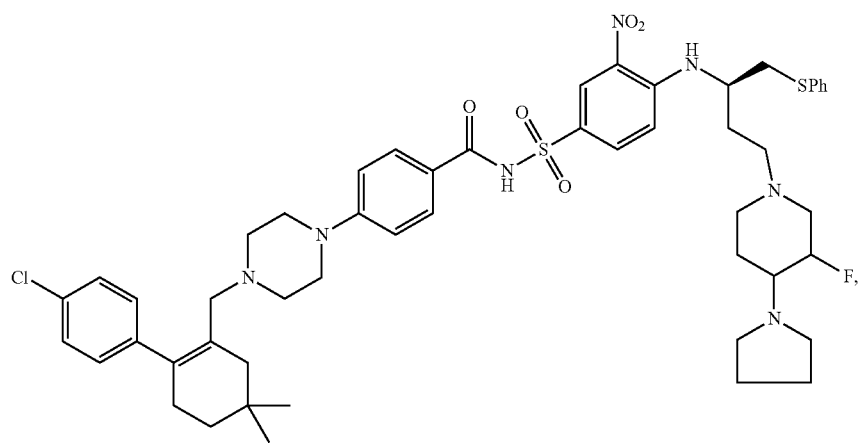
Compound 21
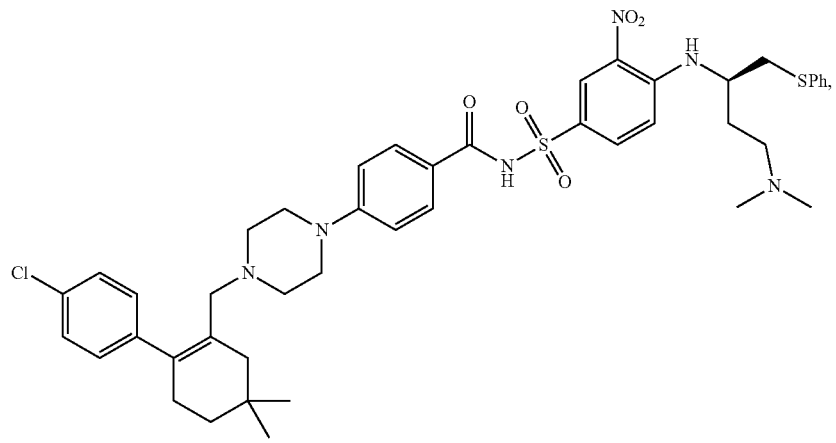

Compound 22
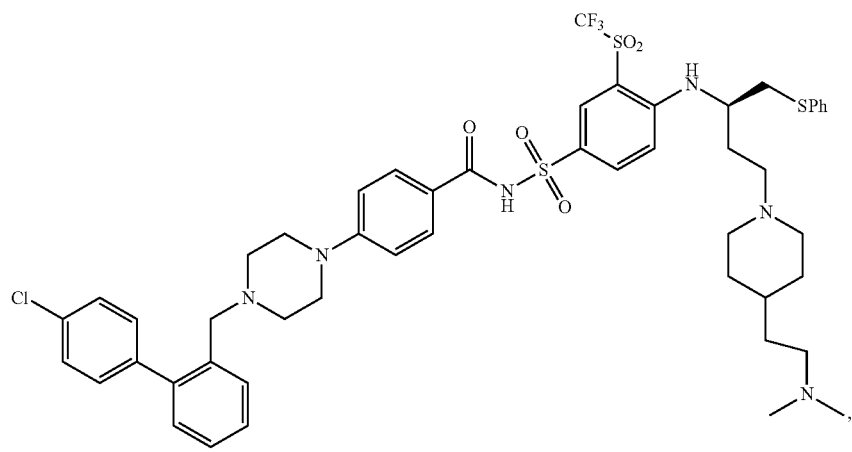
Compound 23
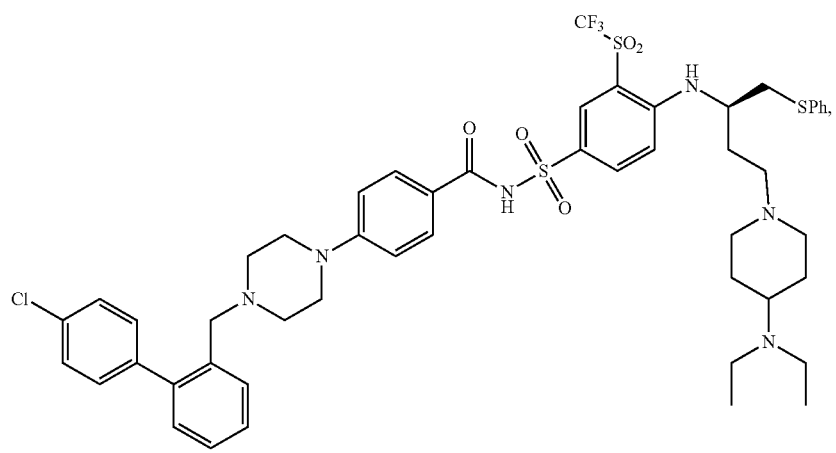
Compound 24
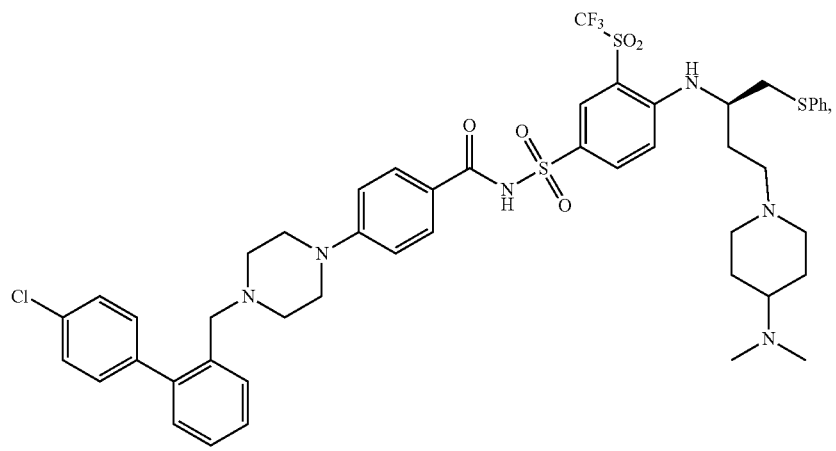

Compound 25
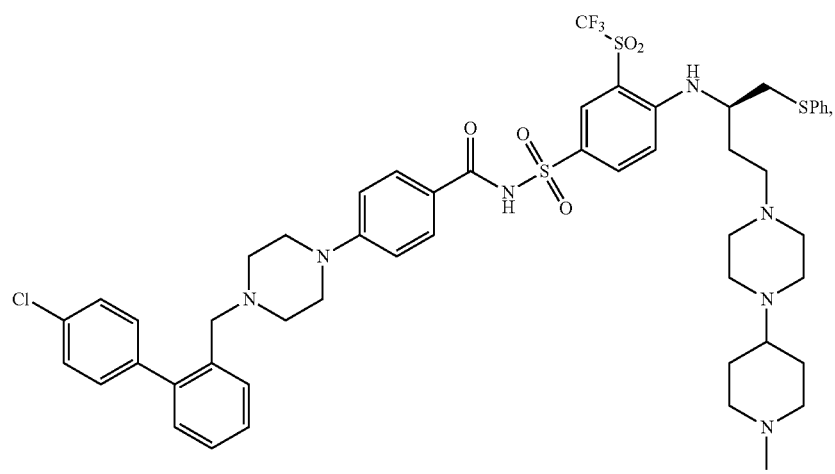
Compound 26
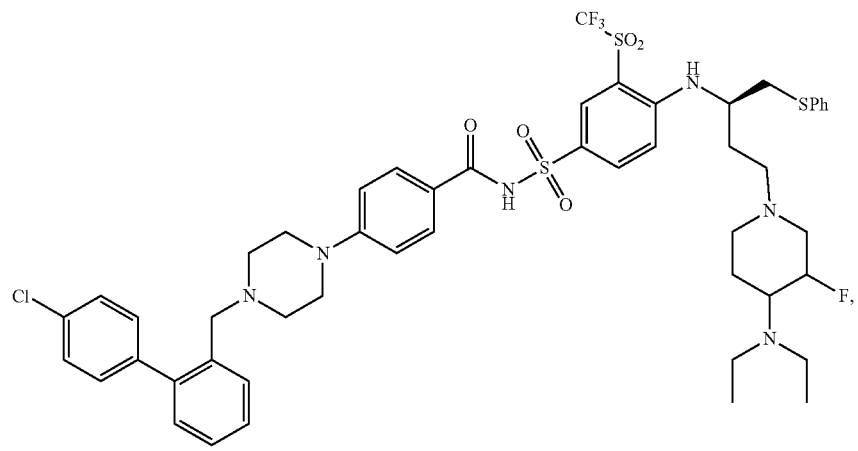
Compound 27
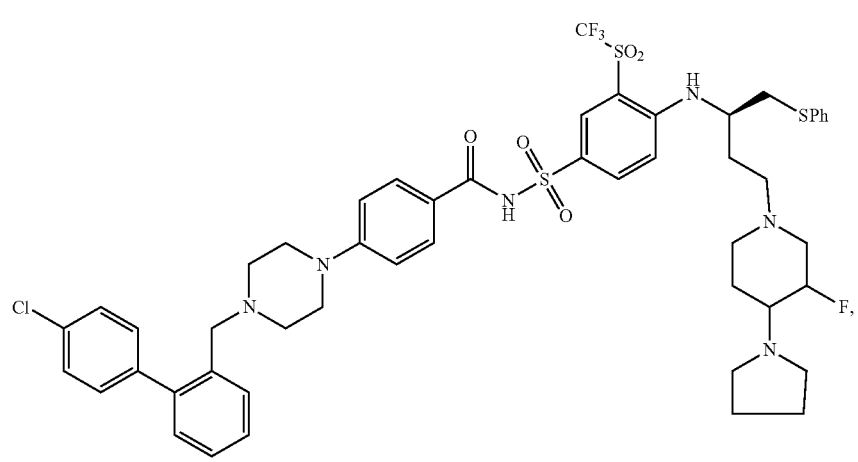

-continued
Compound 28
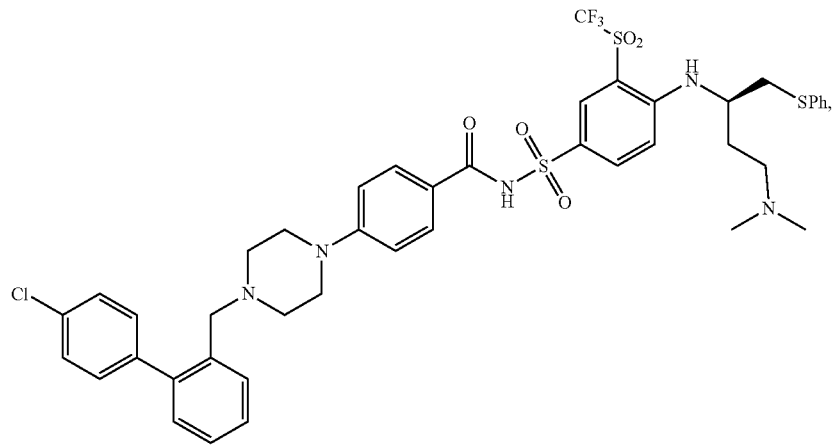
venetoclax (ABT-199), navitoclax (ABT-263), ABT-737, obatoclax mesylate (GX15-070), sabutoclax, TW-37, (R)-(−)-gossypol acetic acid, HA14-1, a BH3-mimetic, and oblimersen. In some embodiments, the Bcl inhibitor is selected from the group consisting of
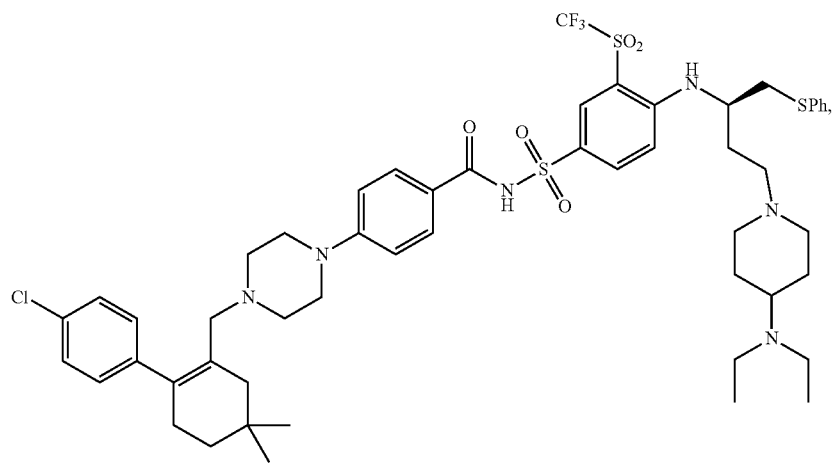
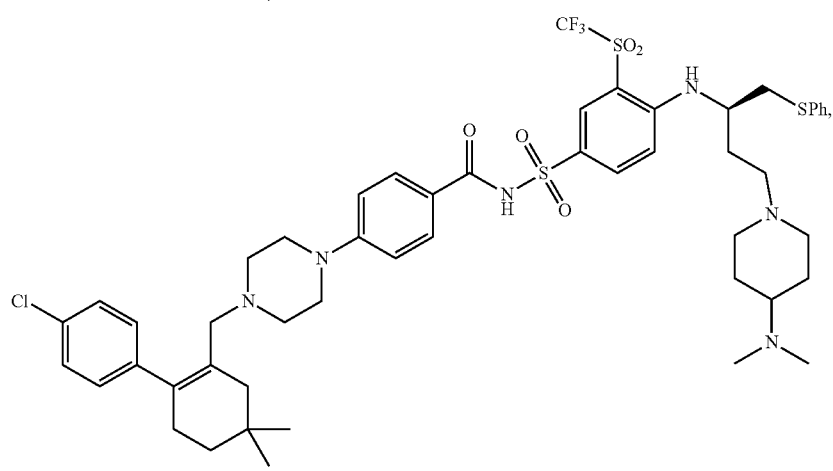

-continued
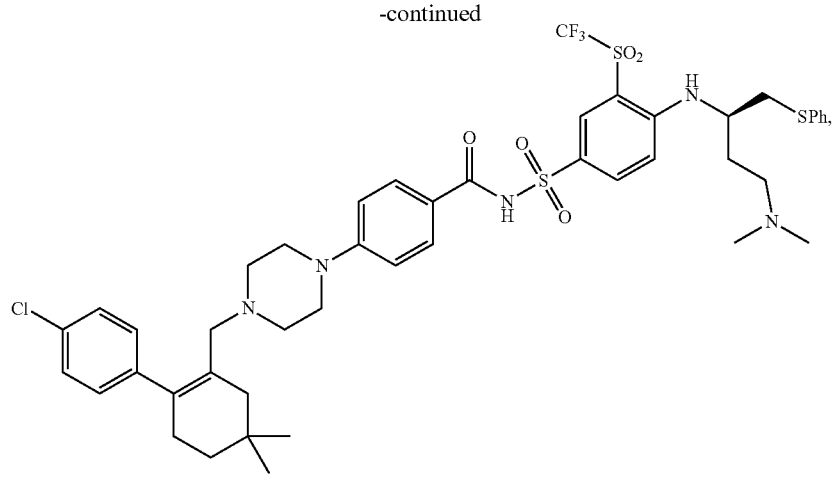
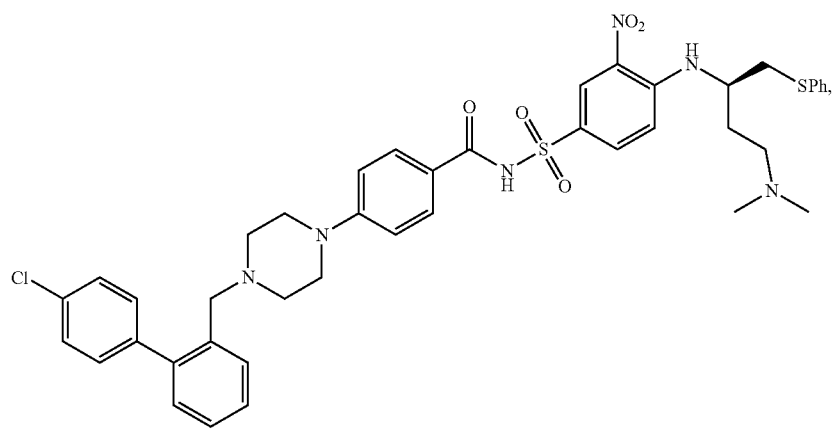
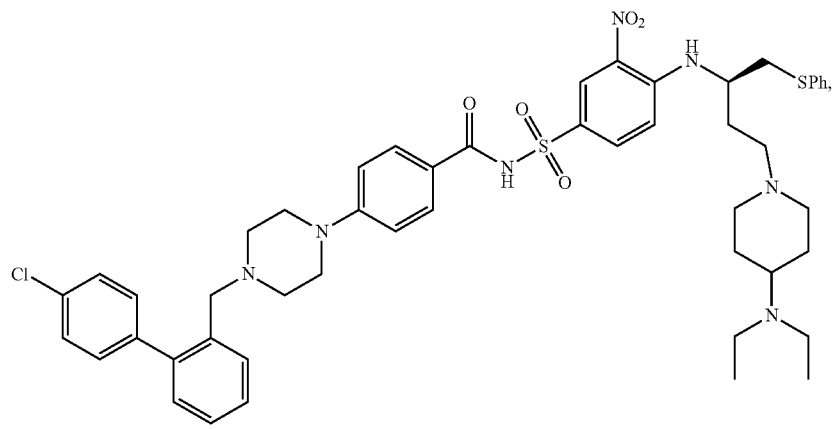
venetoclax (ABT-199), navitoclax (ABT-263), obatoclax mesylate (GX15-070), sabutoclax, TW-37, (R)-(−)-gossypol acetic acid, HA14-1, a BH3-mimetic, and oblimersen. In some embodiments, the Bcl inhibitor is selected from the group consisting of

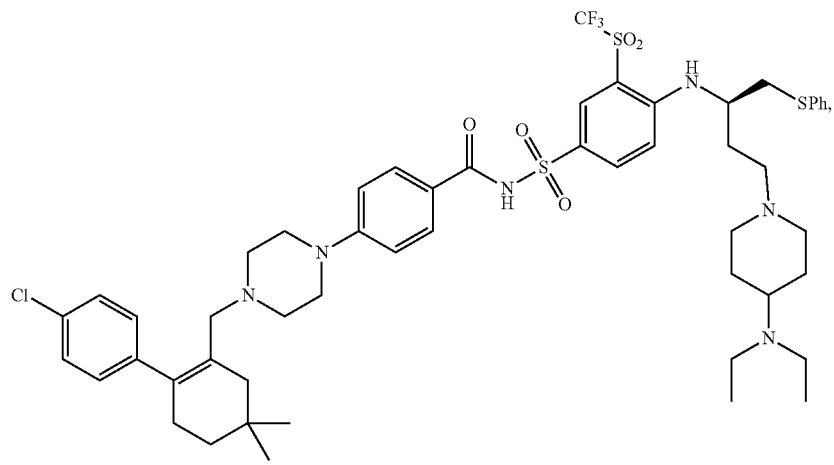
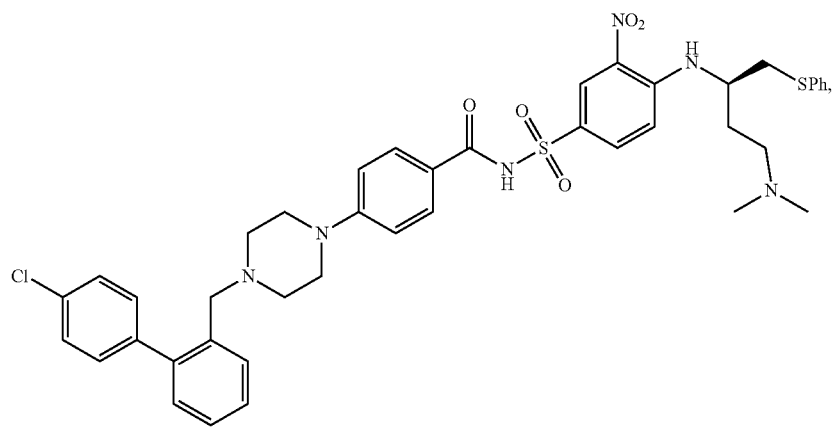
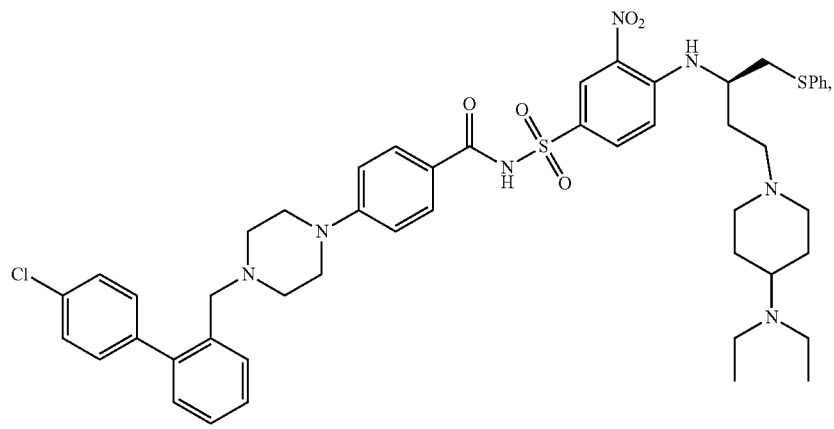
venetoclax (ABT-199), navitoclax (ABT-263), obatoclax mesylate (GX15-070), sabutoclax, TW-37, (R)-(–)-gossypol acetic acid, HA14-1, a BH3-mimetic, and oblimersen. In some embodiments, the Bcl inhibitor is selected from the group consisting of

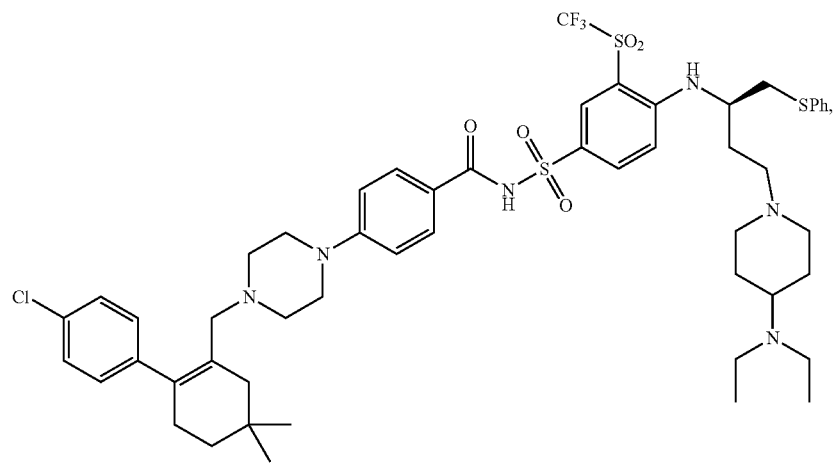
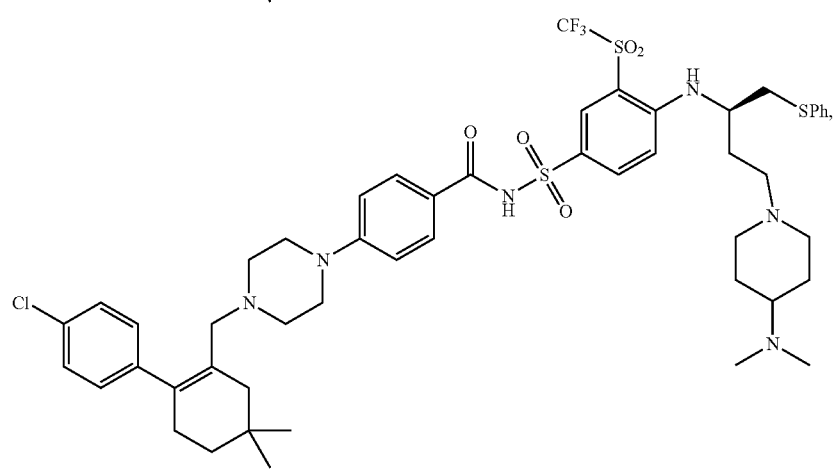
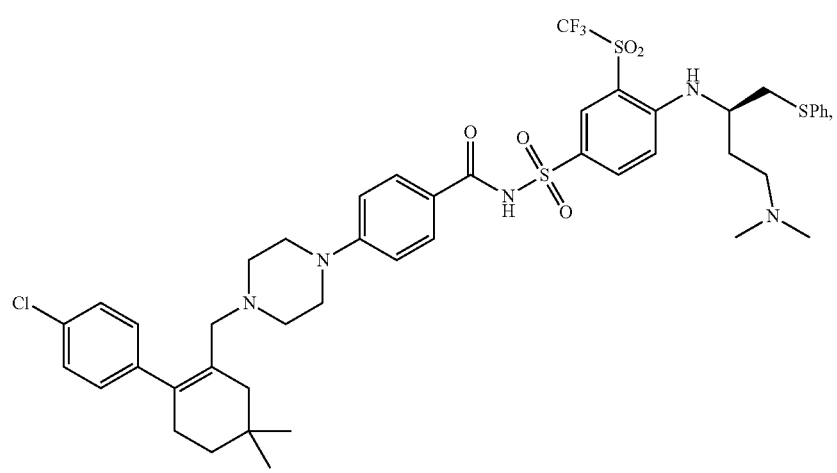

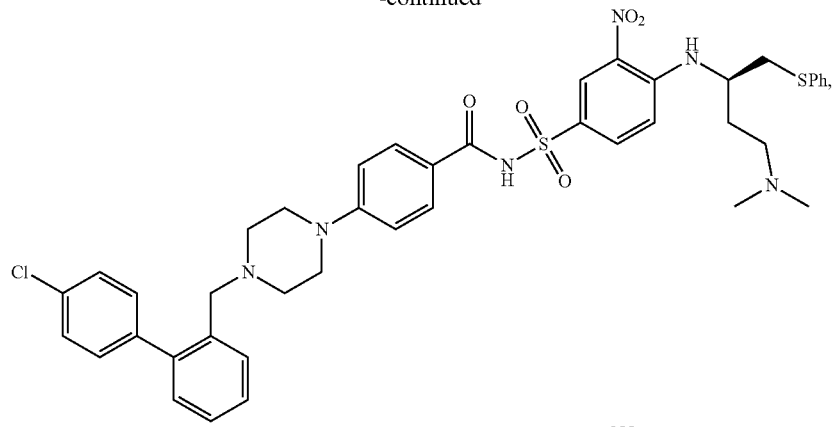
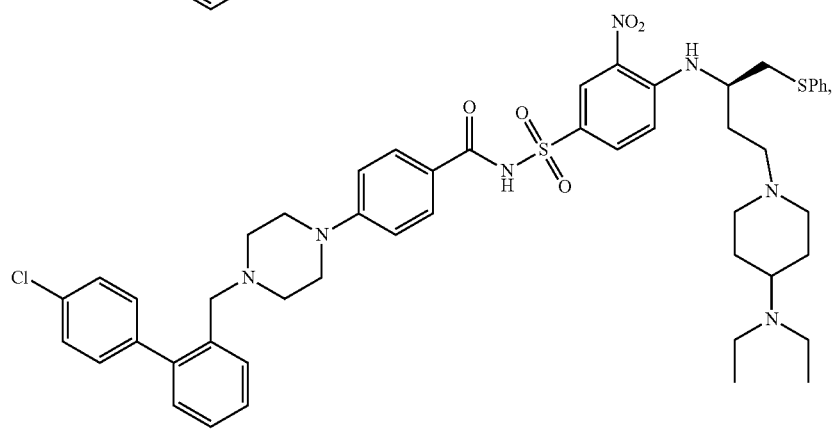
venetoclax (ABT-199), and navitoclax (ABT-263). In some embodiments, the Bcl inhibitor is selected from the group consisting of
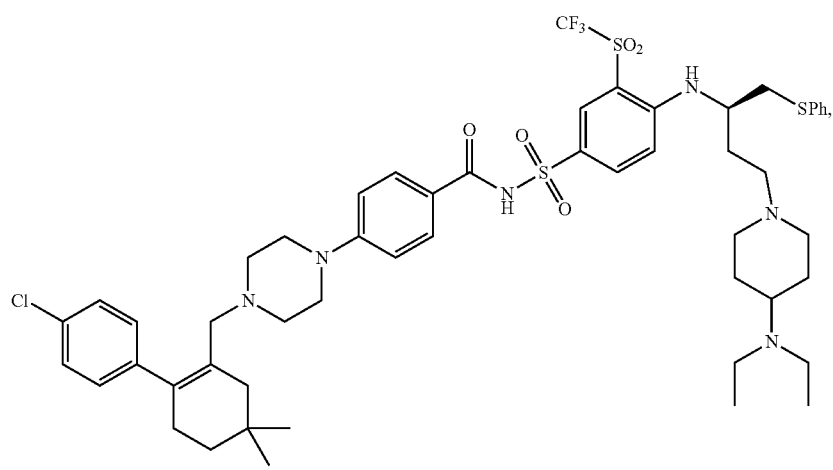

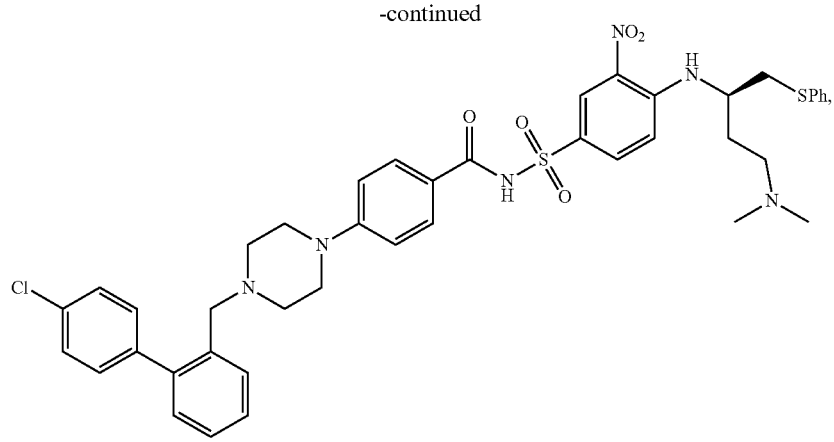
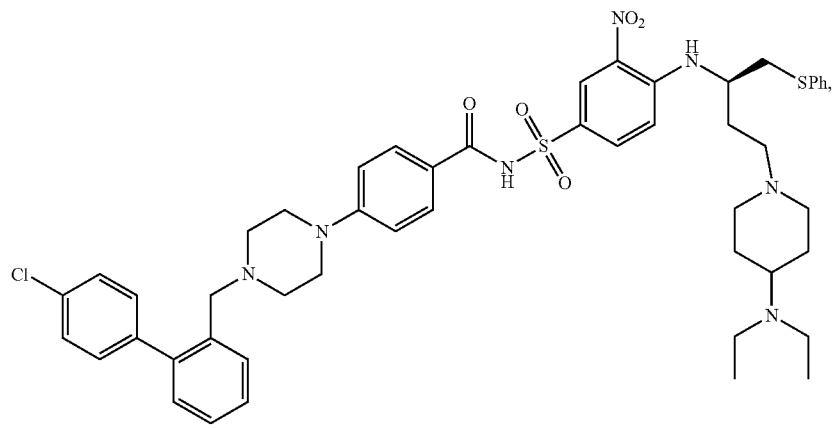
venetoclax (ABT-199), and navitoclax (ABT-263). In some embodiments, the Bcl inhibitor is
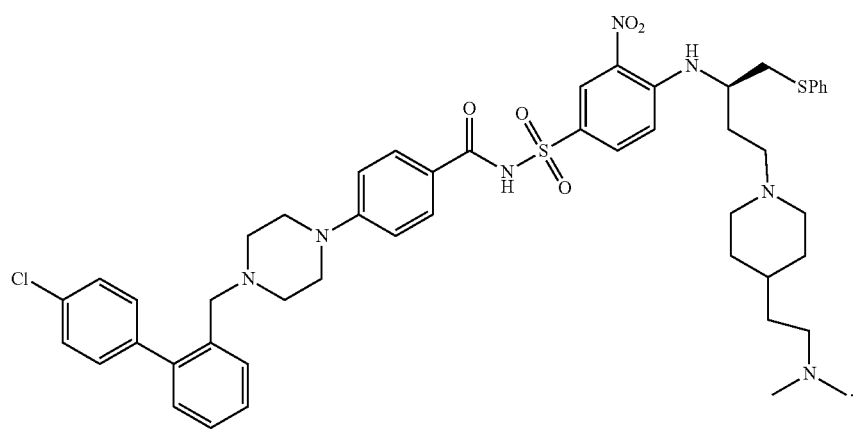

In some embodiments, the Bcl inhibitor is
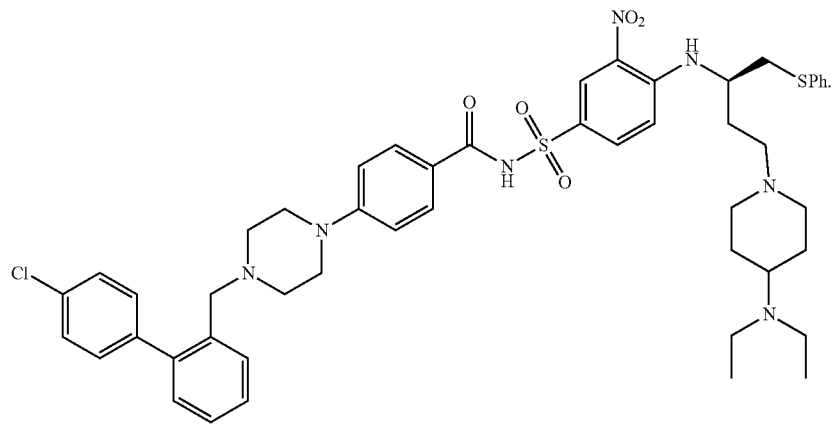
In some embodiments, the Bcl inhibitor is
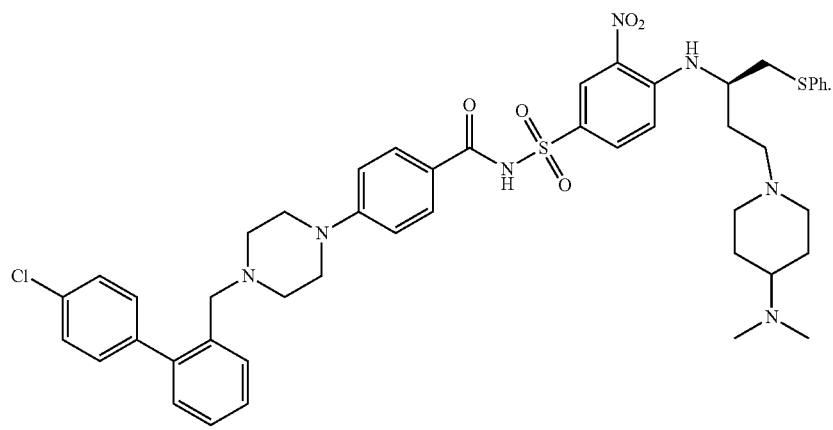
In some embodiments, the Bcl inhibitor is
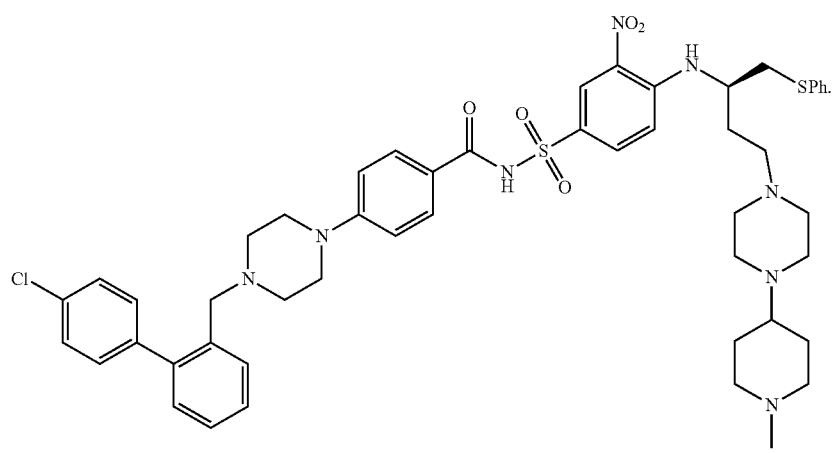

In some embodiments, the Bcl inhibitor is
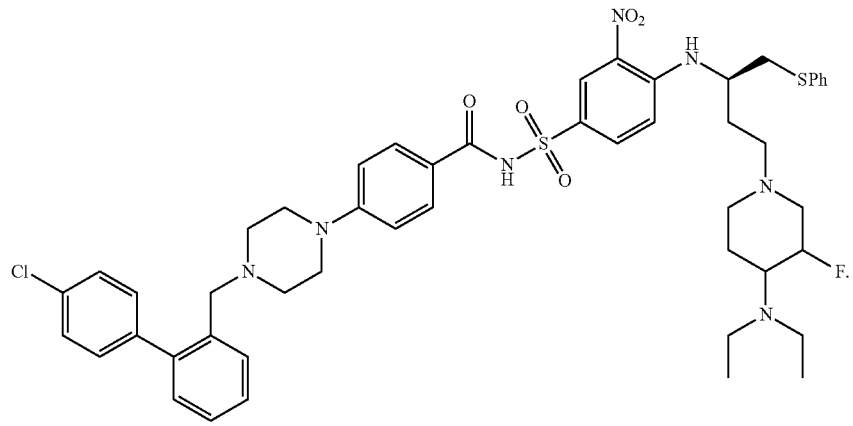
In some embodiments, the Bcl inhibitor is
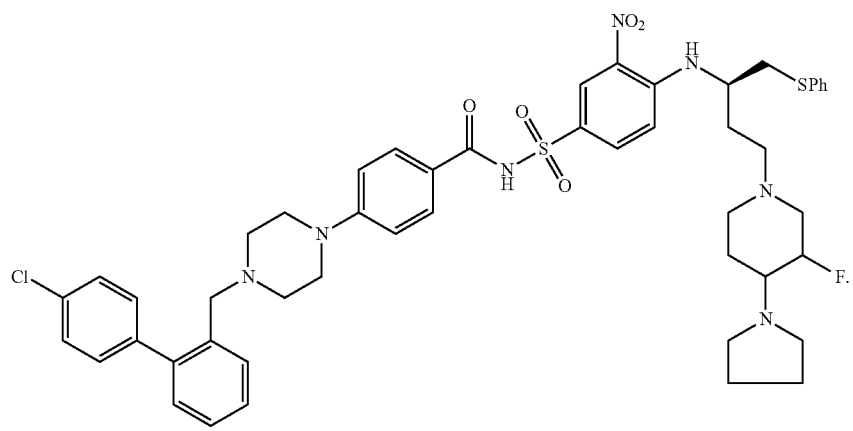
In some embodiments, the Bcl inhibitor is
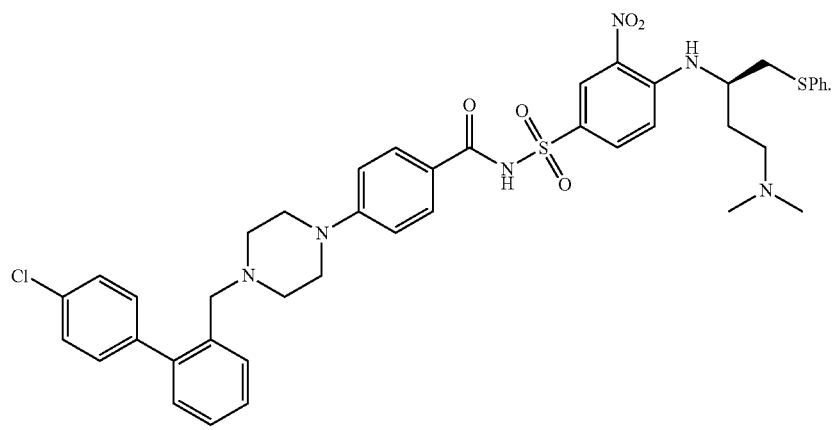

In some embodiments, the Bcl inhibitor is
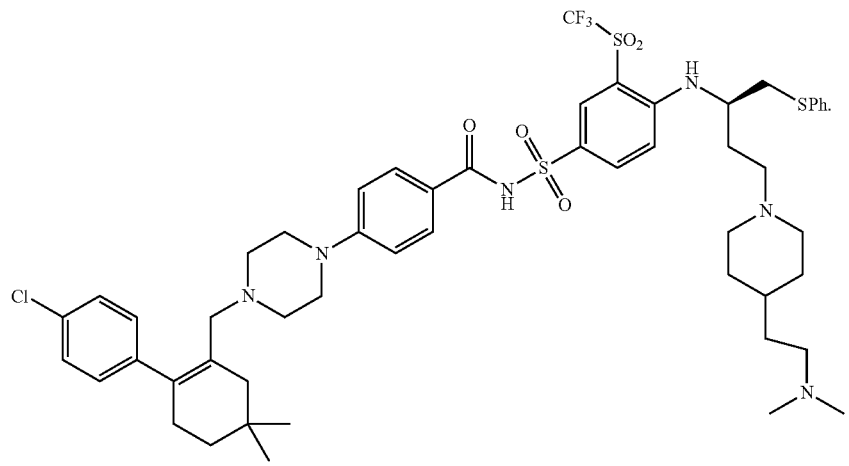
In some embodiments, the Bcl inhibitor is
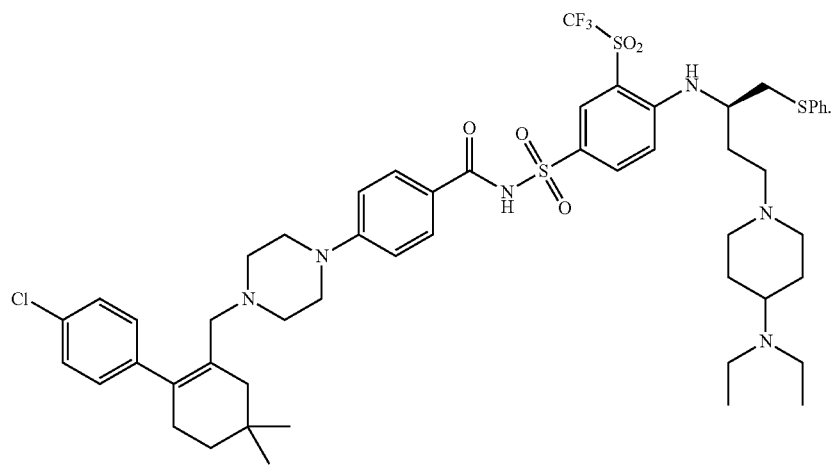
In some embodiments, the Bcl inhibitor is
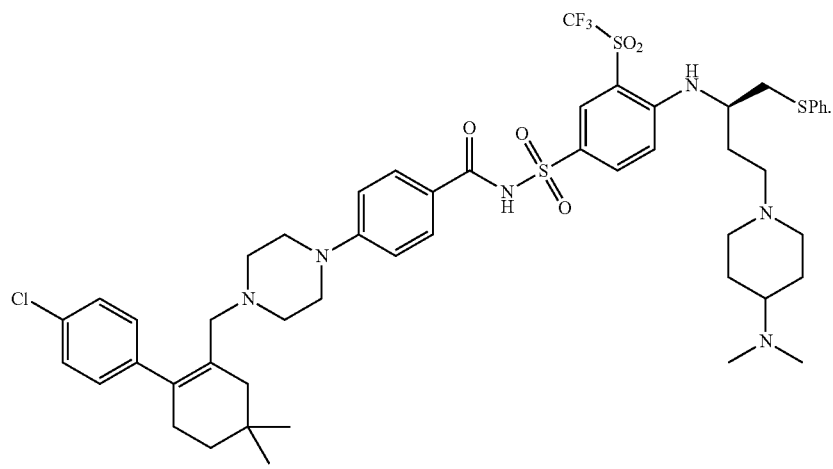

In some embodiments, the Bcl inhibitor is
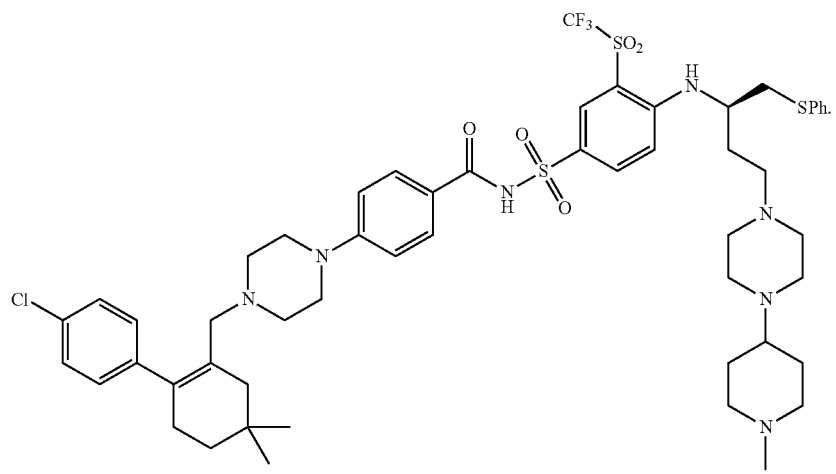
In some embodiments, the Bcl inhibitor is
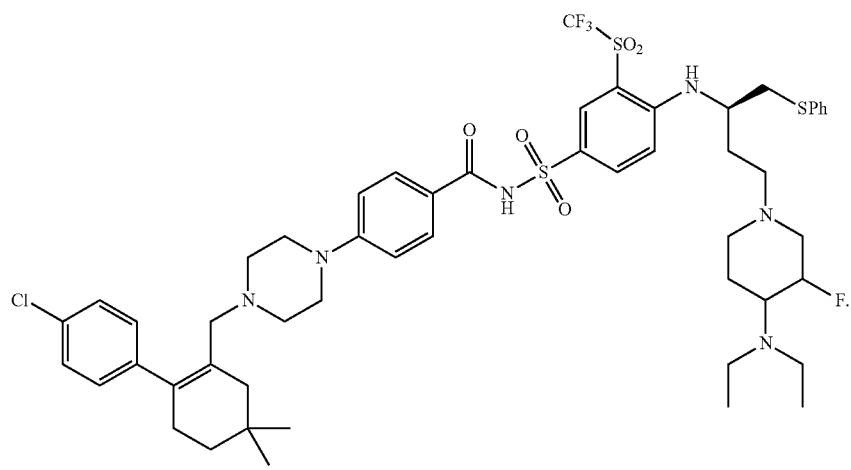
In some embodiments, the Bcl inhibitor is
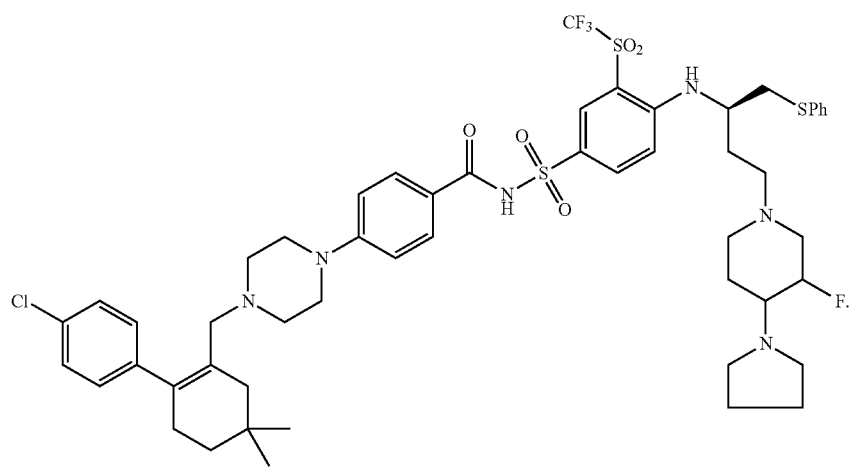

In some embodiments, the Bcl inhibitor is
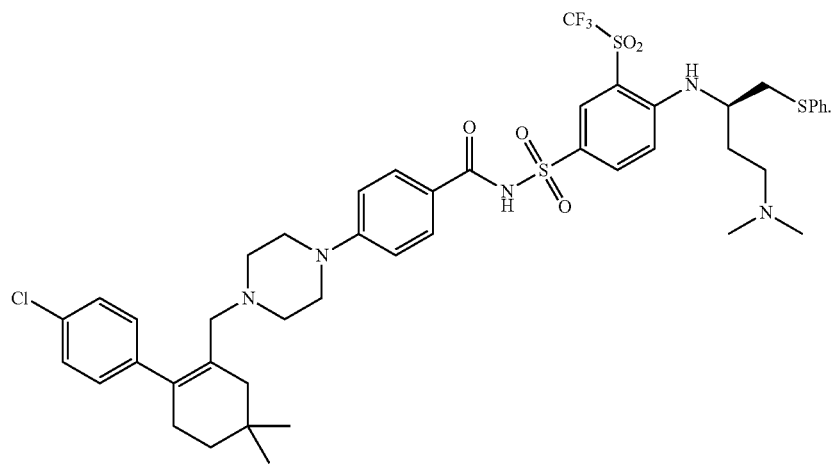
In some embodiments, the Bcl inhibitor is
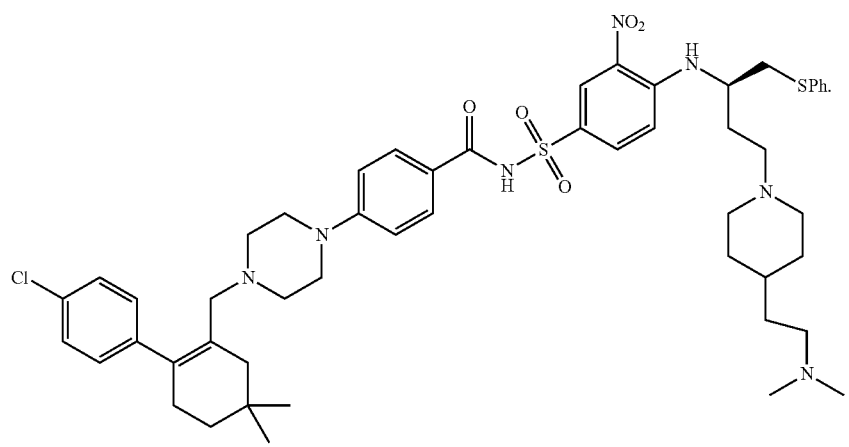
In some embodiments, the Bcl inhibitor is
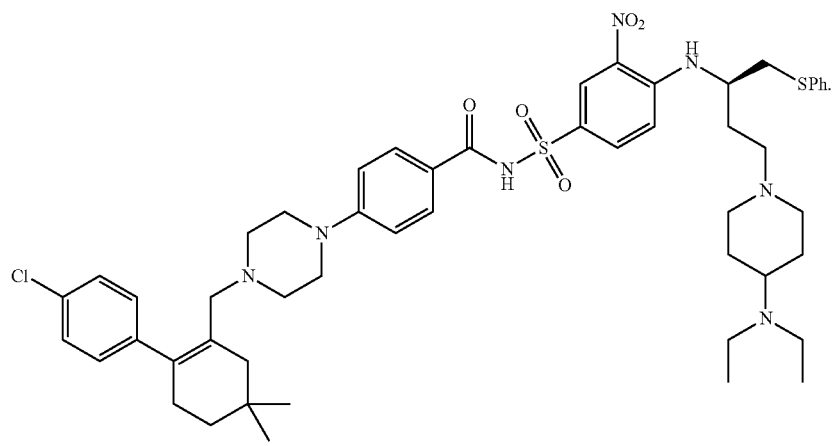

In some embodiments, the Bcl inhibitor is
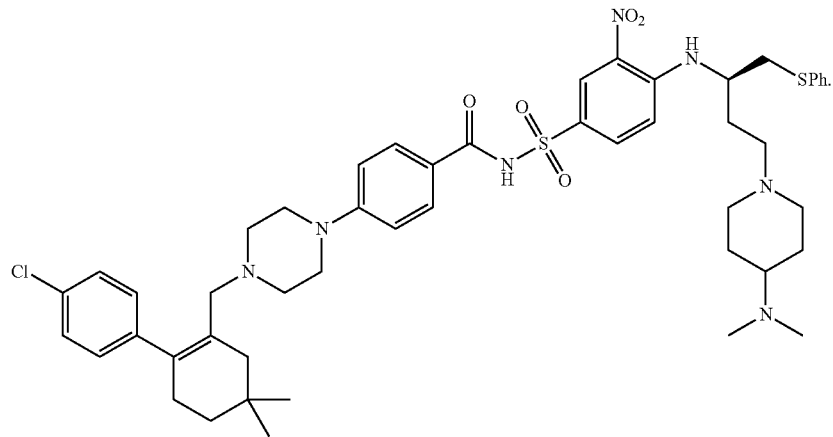
In some embodiments, the Bcl inhibitor is
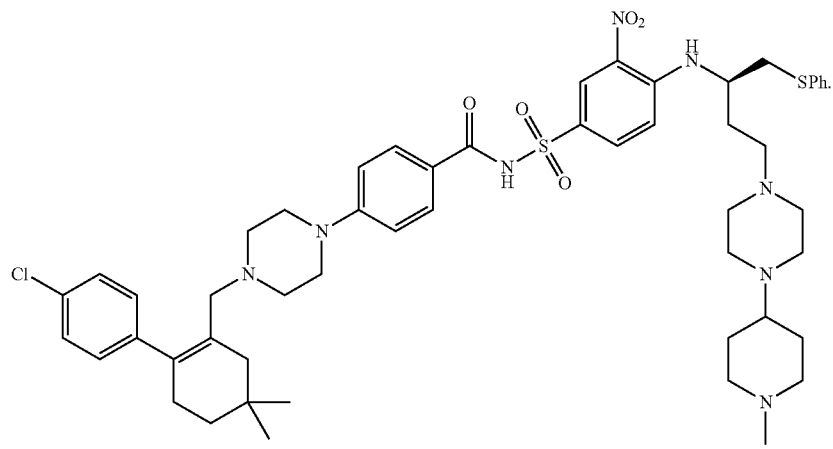
In some embodiments, the Bcl inhibitor is
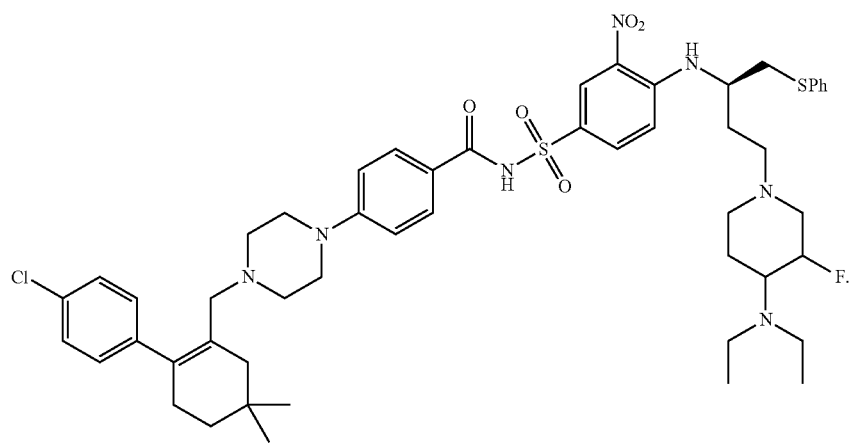

In some embodiments, the Bcl inhibitor is
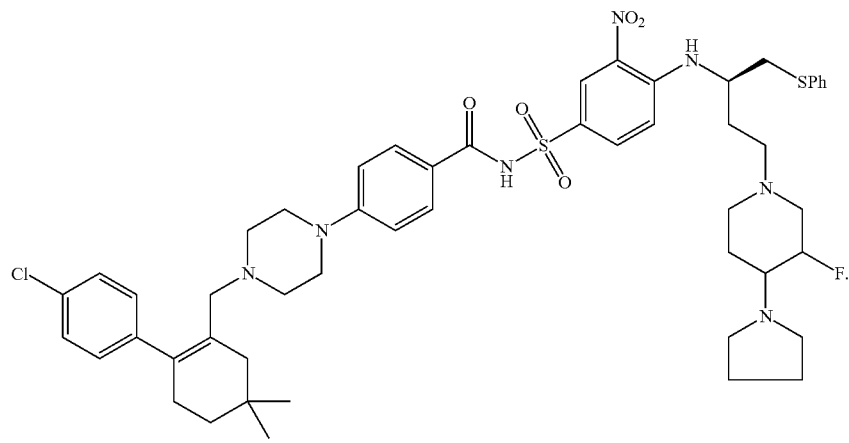
In some embodiments, the Bcl inhibitor is
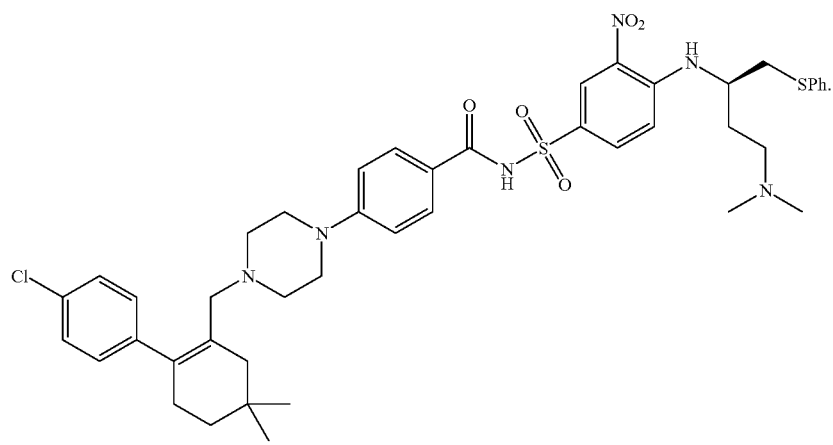
In some embodiments, the Bcl inhibitor is
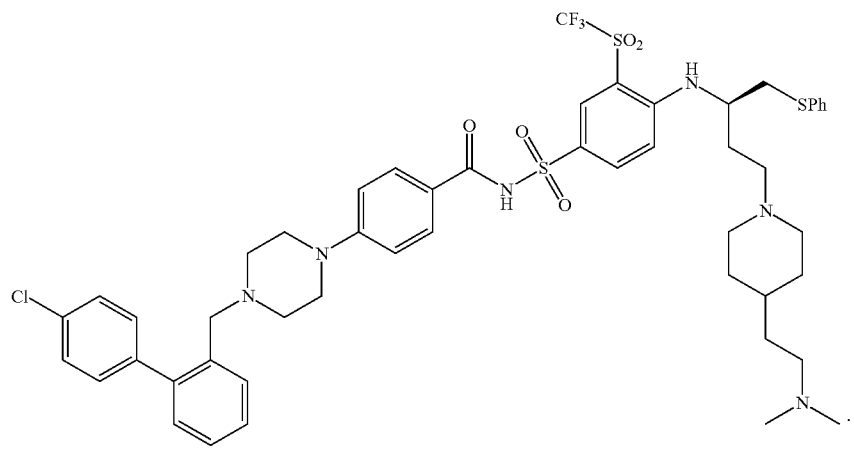

In some embodiments, the Bcl inhibitor is
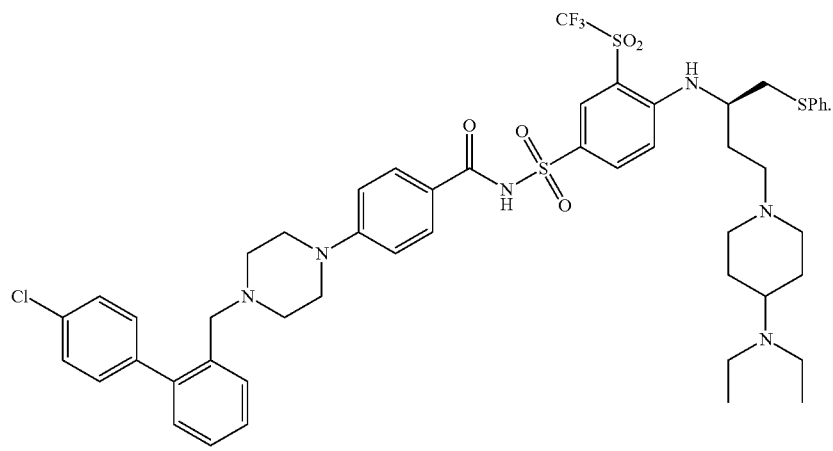
In some embodiments, the Bcl inhibitor is
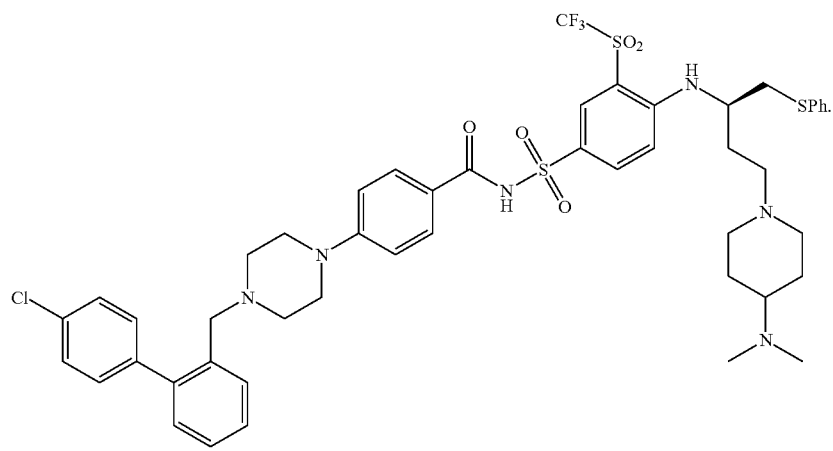
In some embodiments, the Bcl inhibitor is
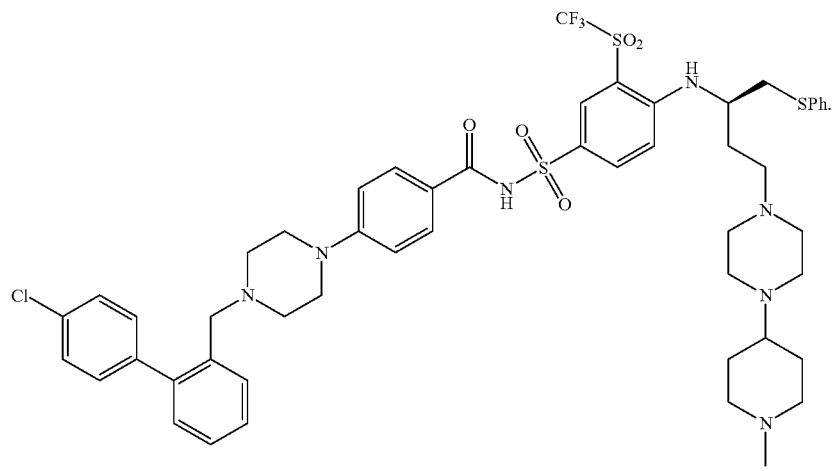

In some embodiments, the Bcl inhibitor is
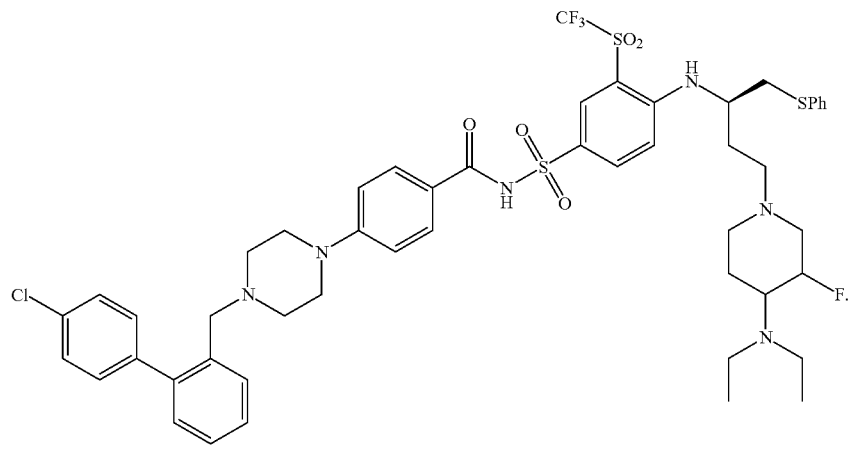
In some embodiments, the Bcl inhibitor is
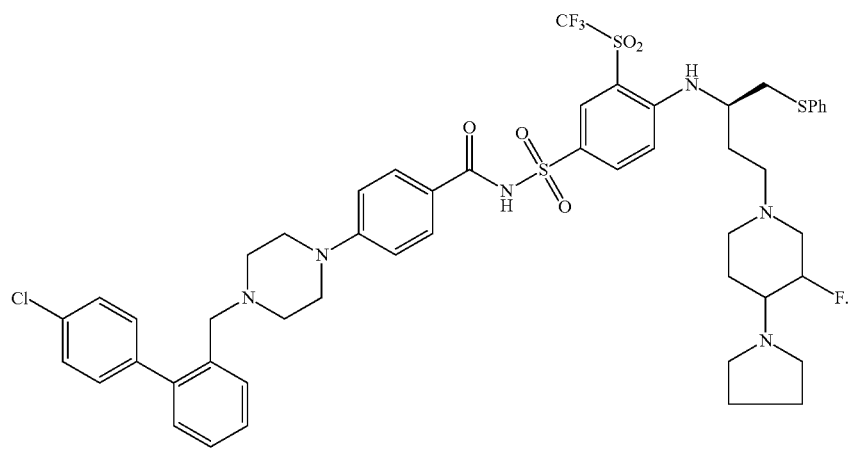
In some embodiments, the Bcl inhibitor is
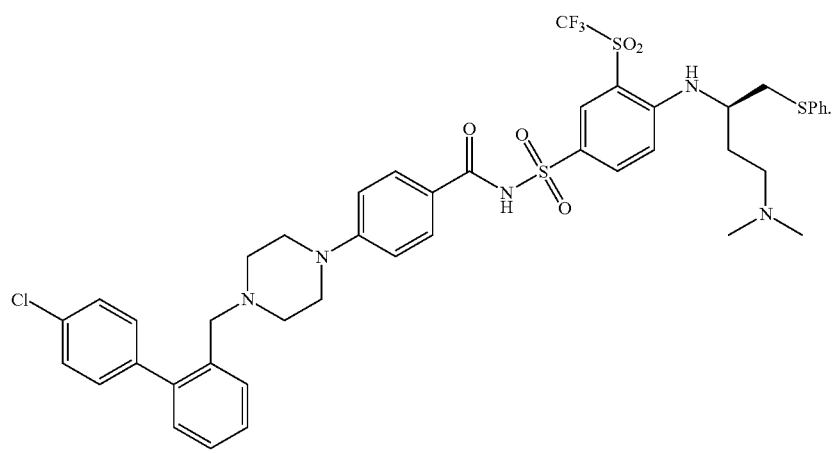
In some embodiments, the Bcl inhibitor is venetoclax. In some embodiments, the Bcl inhibitor is navitoclax.
In some embodiments, the liposomal compositions provided therein comprise an additional therapeutic agent. In some embodiments, the additional therapeutic agent is a hydrophobic therapeutic agent. In some embodiments, the additional therapeutic agent is a hydrophilic therapeutic agent. In some embodiments, the additional therapeutic agent is encapsulated in the liposomes. In some embodiments, the additional therapeutic agent is external to the liposomes. In some embodiments of all the aforementioned aspects, the liposome further comprises an additional therapeutic agent. In some embodiments, the additional therapeutic agent is encapsulated in the liposome. In some embodiments, the additional therapeutic agent is external to the liposome. In some embodiments, the additional therapeutic agent has a c Log P of greater than about 2. In some embodiments, the additional therapeutic agent has a c Log P between about −6 and about 12. In some embodiments, the additional therapeutic agent has a c Log P between about −6 and about 0. In some embodiments, the additional therapeutic agent has a c Log P between about −3 and about 0. In some embodiments, the additional therapeutic agent has a c Log P between about 0 and about 2. In some embodiments, the additional therapeutic agent has a c Log P between about −1 and about 12. In some embodiments, the additional therapeutic agent has a c Log P between about 3 and about 12. In some embodiments, the additional therapeutic agent has a c Log P between about −6 and about −1. In some embodiments, the additional therapeutic agent has a c Log P between about −1 and about 3. In some embodiments, the additional therapeutic agent has a c Log P between about 2 and about 12. In some embodiments, the additional therapeutic agent has a c Log P between about 2 and about 4. In some embodiments, the additional therapeutic agent has a c Log P between about 2 and about 8. In some embodiments, the additional therapeutic agent has a c Log P between about 4 and about 12. In some embodiments, the additional therapeutic agent has a c Log P between about 4 and about 8. In some embodiments, the additional therapeutic agent has a c Log P between about 8 and about 12. In some embodiments, the additional therapeutic agent has a c Log P between about 10 and about 12. In some embodiments, the additional therapeutic agent can be protonated and its protonated form has a $pK_a$ of greater than about 2. In some embodiments, the additional therapeutic agent can be protonated and its protonated form has a $pK_a$ between about −6 and about 12. In some embodiments, the additional therapeutic agent can be protonated and its protonated form has a $pK_a$ between about −6 and about 11. In some embodiments, the additional therapeutic agent can be protonated and its protonated form has a $pK_a$ between about 3 and about 11. In some embodiments, the additional therapeutic agent can be protonated and its protonated form has a $pK_a$ between about 6 and about 11. In some embodiments, the additional therapeutic agent can be protonated and its protonated form has a $pK_a$ between about 8 and about 11. In some embodiments, the additional therapeutic agent can be protonated and its protonated form has a $pK_a$ between about −6 and about 3. In some embodiments, the additional therapeutic agent can be protonated and its protonated form has a $pK_a$ between about 3 and about 6. In some embodiments, the additional therapeutic agent can be protonated and its protonated form has a $pK_a$ between about 6 and about 8. In some embodiments, the additional therapeutic agent can be protonated and its protonated form has a $pK_a$ between about −6 and about 8. In some embodiments, the additional therapeutic agent can be protonated and its protonated form has a $pK_a$ between about 3 and about 8. In some embodiments, the additional therapeutic agent can be protonated and its protonated form has a $pK_a$ between about −6 and about 6. In some embodiments, the additional therapeutic agent can be protonated and its protonated form has a $pK_a$ between about 2 and about 12. In some embodiments, the additional therapeutic agent can be protonated and its protonated form has a $pK_a$ between about 2 and about 8. In some embodiments, the additional therapeutic agent can be protonated and its protonated form has a $pK_a$ between about 2 and about 4. In some embodiments, the additional therapeutic agent can be protonated and its protonated form has a $pK_a$ between about 4 and about 12. In some embodiments, the additional therapeutic agent can be protonated and its protonated form has a $pK_a$ between about 4 and about 8. In some embodiments, the additional therapeutic agent can be protonated and its protonated form has a $pK_a$ between about 8 and about 12. In some embodiments, the additional therapeutic agent can be protonated and its protonated form has a $pK_a$ between about 10 and about 12.

In some embodiments of all the aforementioned aspects, the additional therapeutic agent is an antineoplastic agent. the additional therapeutic agent is selected from an alkylating agent, an anti-angiogenic agent, an antimetabolite, an apoptosis inducing agent, a cell cycle inhibitor, a cell cycle control inhibitor, a checkpoint inhibitor, a cyclin-dependent kinase inhibitor, a cytotoxic agent, a DNA damaging agent, a DNA repair inhibitor, a mitochondrial poison, a receptor tyrosine kinase inhibitor, a telomerase inhibitor, a signal transduction inhibitor, a transcription inhibitor, a Bcl inhibitor, a PARP inhibitor, a PI3K inhibitor, an HSP90 inhibitor, a JAK inhibitor, an ATR inhibitor, an HDAC inhibitor, a tyrosine kinase inhibitor, a receptor tyrosine kinase inhibitor, a BTK inhibitor, an alkylating agent, an SMO inhibitor, an antitubulin agent, an MEK inhibitor, a topoisomerase inhibitor, a RAF inhibitor, a BRAF inhibitor, or a proteasome inhibitor.

In some embodiments, the additional therapeutic agent is a second Bcl inhibitor such as those described above.

In some embodiments, the additional therapeutic agent is an HSP90 inhibitor. In some embodiments, the HSP90 inhibitor is Luminespib.

In some embodiments, the additional therapeutic agent is an alkylating agent. In some embodiments, the additional therapeutic agent is an alkylating agent selected from the group consisting of Bendamustine and Chlorambucil.

In some embodiments, the additional therapeutic agent is an antitubulin agent. In some embodiments, the additional therapeutic agent is an antitubulin agent selected from the group consisting of Vincristine, Vinorelbine, and docetaxel.

In some embodiments, the additional therapeutic agent is an ATR inhibitor.

In some embodiments, the additional therapeutic agent is a RAF inhibitor. In some embodiments, the RAF inhibitor is Dabrafenib. In some embodiments, the additional therapeutic agent is a BRAF inhibitor. In some embodiments, the BRAF inhibitor is Vemurafenib.

In some embodiments, the additional therapeutic agent is a BTK inhibitor. In some embodiments, the BTK inhibitor is Ibrutinib.

In some embodiments, the additional therapeutic agent is an HDAC inhibitor. In some embodiments, the HDAC inhibitor is Panobinostat.

In some embodiments, the additional therapeutic agent is a JAK inhibitor. In some embodiments, the JAK inhibitor is Ruxolitinib.

In some embodiments, the additional therapeutic agent is an MEK inhibitor. In some embodiments, the additional therapeutic agent is an MEK inhibitor selected from the group consisting of Selumetinib and Cobimetinib.

In some embodiments, the additional therapeutic agent is a PARP inhibitor. In some embodiments, the additional therapeutic agent is a PARP inhibitor selected from the group consisting of Talazoparib, Niraparib, and Rucaparib.

In some embodiments, the additional therapeutic agent is a PI3K inhibitor. In some embodiments, the PI3K inhibitor is Idelalisib.

In some embodiments, the additional therapeutic agent is a proteasome inhibitor. In some embodiments, the proteasome inhibitor is Carfilzomib.

In some embodiments, the additional therapeutic agent is an SMO inhibitor. In some embodiments, the additional therapeutic agent is an SMO inhibitor selected from the group consisting of Sonidegib and Vismodegib.

In some embodiments, the additional therapeutic agent is a tyrosine kinase inhibitor. In some embodiments, the additional therapeutic agent is a tyrosine kinase inhibitor selected from the group consisting of Brigatinib, Lenvatinib, Afatinib, Axitinib, Cabozantinib, Ponatinib, Sorafenib, Osimertinib, Regorafenib, Bosutinib, Crizotinib, Vandetanib, Nilotinib, Alectinib, Ceritinib, Dasatinib, Pazopanib, Sunitinib, Erlotinib, Imatinib, Gefitinib, Lapatinib.

In some embodiments, the additional therapeutic agent is a topoisomerase inhibitor. In some embodiments, the additional therapeutic agent is a topoisomerase I inhibitor. In some embodiments, the topoisomerase inhibitor is Irinotecan.

In some embodiments, the additional therapeutic agent is a second Bcl inhibitor such as those described above. In some embodiments, the additional therapeutic agent is an antineoplastic agent. Suitable antineoplastic agents are for non-limiting example:

"Signal transduction inhibitors" which interfere with or prevents signals that cause cancer cells to grow or divide;

"Cytotoxic agents";

"Cell cycle inhibitors" or "cell cycle control inhibitors" which interfere with the progress of a cell through its normal cell cycle, the life span of a cell, from the mitosis that gives it origin to the events following mitosis that divides it into daughter cells;

"Checkpoint inhibitors" which interfere with the normal function of cell cycle checkpoints, e.g., the S/G2 checkpoint, G2/M checkpoint and G1/S checkpoint, such as S/G2 or G2/M checkpoint inhibitors such as bleomycin, docetaxel, doxorubicin, etoposide, paclitaxel, vinblastine, vincristine, vindesine and vinorelbine; G1/early-S checkpoint inhibitors; and G2/M checkpoint inhibitors;

"Topoisomerase inhibitors", which interfere with topoisomerase I or II activity, enzymes necessary for DNA replication and transcription, such as camptothecins, irinotecan and topotecan;

"Receptor tyrosine kinase inhibitors" which interfere with the activity of growth factor receptors that possess tyrosine kinase activity, such as genistein, trastuzumab, ZD1839;

"Apoptosis inducing agents" which promote programmed cell death;

"Antimetabolites," such as cytidine analogs such as cytarabine, 5-Azacytidine, and gemcitabine (2',2'-Difluorodeoxycytidine), or Hydroxyurea, which closely resemble an essential metabolite and therefore interfere with physiological reactions involving it;

"Telomerase inhibitors" which interfere with the activity of a telomerase, an enzyme that extends telomere length and extends the lifetime of the cell and its replicative capacity;

"Cyclin-dependent kinase inhibitors" which interfere with cyclin-dependent kinases that control the major steps between different phases of the cell cycle through phosphorylation of cell proteins such as histones, cytoskeletal proteins, transcription factors, tumor suppresser genes and the like;

"DNA damaging agents" such as carboplatin, cisplatin, cyclophosphamide, doxorubicin, daunorubicin, epirubicin, mitomycin C, mitoxantrone;

"DNA repair inhibitors" including 5-fluorouracil (5-FU) or FUDR, gemcitabine and methotrexate;

"Immunomodulating agents" which stimulate or suppress the immune system and may help the body fight cancer, infection, or other diseases; for example specific immunomodulating agents, such as monoclonal antibodies, cytokines, and vaccines, affect specific parts of the immune system; and nonspecific immunomodulating agents, such as BCG and levamisole, affect the immune system in a general way;

"Anti-angiogenic agents" which interfere with the generation of new blood vessels or growth of existing blood vessels that occurs during tumor growth; and "Mitochondrial poisons" which directly or indirectly disrupt mitochondrial respiratory chain function.

The mechanism of action of one or more of the agents may not be known or may be incorrectly identified.

Other anti-neoplastic agents include paclitaxel, an etoposide-compound, a camptothecin-compound, idarubicin, carboplatin, oxaliplatin, adriamycin, mitomycin, ansamitocin, bleomycin, cytosine arabinoside, arabinosyl adenine, mercaptopolylysine, vincristine, busulfan, chlorambucil, melphalan, mercaptopurine, mitotane, procarbazine hydrochloride, dactinomycin, mitomycin, plicamycin, aminoglutethimide, estramustine phosphate sodium, flutamide, leuprolide acetate, megestrol acetate, tamoxifen citrate, testolactone, trilostane, amsacrine, asparaginase, interferon, teniposide, vinblastine sulfate, vincristine sulfate, bleomycin, methotrexate, valrubicin, carzelesin, paclitaxel, taxotane, camptothecin, doxorubicin, daunomycin, cisplatin, 5 fluorouracil, methotrexate; anti-inflammatory agents such as indomethacin, ibuprofen, ketoprofen, flubiprofen, dichlofenac, piroxicam, tenoxicam, naproxen, aspirin, and acetaminophen; sex hormones such as testosterone, estrogen, progestone, estradiol; antihypertensive agents such as captopril, ramipril, terazosin, minoxidil, and parazosin; antiemetics such as ondansetron and granisetron; antibiotics such as metronidazole, and fusidic acid; cyclosporine; prostaglandins; biphenyl dimethyl dicarboxylic acid, carboplatin; antifungal agents such as itraconazole, ketoconazole, and amphotericin; steroids such as triamcinolone acetonide, hydrocortisone, dexamethasone, prednisolone, and betamethasone; cyclosporine, and functionally equivalent analogues, derivatives or combinations thereof.

Process for Making Liposomes and Liposomal Compositions

Liposomes can be prepared as described in "Liposomes: Rational Design" (A. S. Janoff, ed., Marcel Dekker, Inc., New York, NY), or by additional techniques known to those knowledgeable in the art. Suitable liposomes include large unilamellar vesicles (LUVs), multilamellar vesicles (MLVs), small unilamellar vesicles (SUVs) and interdigitating fusion liposomes.

Lipids

Liposomes may contain therapeutic lipids, which examples include ether lipids, phosphatidic acid, phosphonates, ceramide and ceramide analogs, sphingosine and sphingosine analogs and serine-containing lipids. Liposomes may also contain phospholipids, such as phosphatidylcholine lipids, phosphatidylethanolamine lipids, phosphatidylserine lipids, and phosphatidylglycerol lipids. Liposomes may be prepared to contain a phosphatidylcholine lipid, such as distearoylphosphatidylcholine (DSPC). The phospholipid may be selected from the group consisting of a phosphatidylcholine, a sphingolipid, and a hydrogenated sphingolipid. For example, the phospholipid may be Egg phosphatidylcholine (Egg PC), 1-palmitoyl-2-oleoyl-sn-glycero-3-phosphocholine (POPC), 1,2-dipalmitoyl-sn-glycero-3-phosphocholine (DPPC), Egg sphingomyelin, 1,2-Dioleoyl-sn-glycero-3-phosphoethanolamine (DOPE), 1,2-Distearoyl-sn-glycero-3-phospho-L-serine (DSPS), 1,2-Distearoyl-sn-glycero-3-phospho-L-serine sodium salt (DSPS-Na), 2-Oleoyl-1-palmitoyl-sn-glycero-3-phospho-L-serine (POPS), and 2-Oleoyl-1-palmitoyl-sn-glycero-3-phospho-L-serine sodium salt (POPS-Na).

Liposomes may also be prepared with surface stabilizing hydrophilic polymer-lipid conjugates. Hydrophilic polymer-lipid conjugates comprise a polymeric moiety and a lipid moiety. The polymeric moiety can be a PEG moiety. The lipid moiety can be based on a phospholipid. The phospholipid may be selected from the group consisting of a phosphatidylcholine, a sphingolipid, and a hydrogenated sphingolipid. For example, the phospholipid may be Egg phosphatidylcholine (Egg PC), 1-palmitoyl-2-oleoyl-sn-glycero-3-phosphocholine (POPC), 1,2-dipalmitoyl-sn-glycero-3-phosphocholine (DPPC), Egg sphingomyelin, 1,2-Dioleoyl-sn-glycero-3-phosphoethanolamine (DOPE), 1,2-Distearoyl-sn-glycero-3-phospho-L-serine (DSPS), 1,2-Distearoyl-sn-glycero-3-phospho-L-serine sodium salt (DSPS-Na), 2-Oleoyl-1-palmitoyl-sn-glycero-3-phospho-L-serine (POPS), and 2-Oleoyl-1-palmitoyl-sn-glycero-3-phospho-L-serine sodium salt (POPS-Na). Exemplary polymer-lipid conjugates may be 1,2-distearoyl-rac-glycero-3-methoxypoly(ethylene glycol) (such as DSG-PEG2000 or DSG-PEG1000), 1,2-dimyristoyl-rac-glycero-3-methoxypoly(ethylene glycol) (such as DMG-PEG2000 or DMG-PEG1000), 1,2-dipalmitoyl-rac-glycero-3-methoxypoly(ethylene glycol) (such as DPG-PEG2000 or DPG-PEG1000), 1,2-distearoyl-sn-glycero-3-phosphoethanolamine-poly(ethylene glycol) (such as DSPE-PEG2000 or DSPE-PEG1000), N-palmitoyl-sphingosine-1-{succinyl[methoxy(polyethylene glycol)]} (such as C16 PEG2000 ceramide), PEG-derivatized cholesterol (such as mPEG cholesterol), sphingomyelin, or dihydrosphingomyelin. The average molecular weight of the polymeric moiety of the polymer-lipid conjugates may vary from about 1000 g/mol to about 5000 g/mol. The average molecular weight of the polymeric moiety of the polymer-lipid conjugates may vary from about 1000 g/mol to about 2000 g/mol. The average molecular weight of the polymeric moiety of the polymer-lipid conjugates may be about 1000 g/mol. The average molecular weight of the polymeric moiety of the polymer-lipid conjugates may be about 2000 g/mol. The average molecular weight of the polymeric moiety of the polymer-lipid conjugates may be about 5000 g/mol.

The incorporation of negatively charged lipids such as phosphatidylglycerol (PG) and phosphatidylinositol (PI) may also be added to liposome formulations to increase the circulation longevity of the carrier. These lipids may be employed to replace hydrophilic polymer-lipid conjugates as surface stabilizing agents or employed in combination with hydrophilic polymer-lipid conjugates.

Sterols

Liposomes may also contain a sterol, such as cholesterol, a cholesterol derivative, or a phytosterol (such as β-sitosterol).

Process for Loading Liposomes

Various methods may be utilized to encapsulate active agents in liposomes. "Encapsulation," includes covalent or non-covalent association of an agent with the liposomes. For example, this can be by interaction of the agent with the outer layer or layers of the liposome or entrapment of an agent within the liposome, equilibrium being achieved between different portions of the liposome. Thus encapsulation of an agent can be by association of the agent by interaction with the bilayer of the liposomes through covalent or non-covalent interaction with the lipid components or entrapment in the aqueous interior of the liposome, or in equilibrium between the internal aqueous phase and the bilayer. "Loading" refers to the act of encapsulating one or more agents into a delivery vehicle.

When a combination of therapeutic agents is sought, it will be apparent to those skilled in the art that encapsulation of the desired combination can be achieved either through encapsulation in separate delivery vehicles or within the same delivery vehicle. Where encapsulation into separate liposomes is desired, the lipid composition of each liposome may be quite different to allow for coordinated pharmacokinetics. By altering the vehicle composition, release rates of encapsulated drugs can be matched to allow desired ratios of the drugs to be delivered to the tumor site. Means of altering release rates include increasing the acyl-chain length of vesicle forming lipids to improve drug retention, controlling the exchange of surface grafted hydrophilic polymers such as PEG out of the liposome membrane and incorporating membrane-rigidifying agents such as sterols into the membrane. It should be apparent to those skilled in the art that if a first and second drug are desired to be administered at a specific drug ratio and if the second drug is retained poorly within the liposome composition of the first drug, that improved pharmacokinetics may be achieved by encapsulating the second drug in a second liposome composition. Alternatively, two or more agents may be encapsulated within the same liposome.

Techniques for encapsulation are dependent on the nature of the delivery vehicles and on the nature of the therapeutic agent to be encapsulated. For example, therapeutic agents may be loaded into liposomes using both passive and active loading methods. Passive methods of encapsulating active agents in liposomes involve encapsulating the agent during the preparation of the liposomes. This includes a passive entrapment method described by Bangham, et al. (*J. Mol. Biol.* (1965) 12:238). This technique results in the formation of multilamellar vesicles (MLVs) that can be converted to large unilamellar vesicles (LUVs) or small unilamellar vesicles (SUVs) upon extrusion. Another suitable method of passive encapsulation includes an ether injection technique described by Deamer and Bangham (*Biochim. Biophys. Acta* (1976) 443:629) and the Reverse Phase Evaporation technique as described by Szoka and Paphadjopoulos (*P.N.A.S.* (1978) 75:4194). In addition, another suitable method of passive encapsulation involves passive equilibration after the formation of liposomes. This process involves incubating pre-formed liposomes under altered or non-ambient (based on temperature, pressure, etc.) conditions and adding a therapeutic agent to the exterior of the liposomes. The therapeutic agent then equilibrates into the interior of the liposomes, across the liposomal membrane. The liposomes are then returned to ambient conditions and unencapsulated therapeutic agent, if present, is removed via dialysis or another suitable method.

Active methods of encapsulation include the pH gradient loading technique described in U.S. Pat. Nos. 5,616,341, 5,736,155 and 5,785,987 and active metal-loading. One method of pH gradient loading is the citrate-base loading method utilizing citrate as the internal buffer at a pH of 4.0 and a neutral exterior buffer. Other methods employed to establish and maintain a pH gradient across a liposome involve the use of an ionophore that can insert into the liposome membrane and transport ions across membranes in exchange for protons (see U.S. Pat. No. 5,837,282). Another technique utilizing transition metals to drive the uptake of drugs into liposomes via complexation in the absence of an ionophore may also be used. This technique relies on the formation of a drug-metal complex rather than the establishment of a pH gradient to drive uptake of drug.

Preferred methods of encapsulation of poorly water-soluble compounds are known to those skilled in the art and are described for example in U.S. Pat. Nos. 9,737,485, 10,507,182, and 10,722,467. In such methods, the agent to be encapsulated is dissolved in a loading solvent and the resulting solution is added to a suspension of liposomes comprising a loading aid resulting in a mixture comprising the agent to be loaded as an amorphous solid, or is provided as an amorphous solid form and added to a suspension of liposomes comprising a loading aid. Other preferred methods of encapsulation of poorly water-soluble compounds are described in Li et al., Pharmaceutics (2019), 11, 465.

Passive and active methods of entrapment may also be coupled in order to prepare a liposome formulation containing more than one encapsulated agent.

Loading Aid

In some embodiments, the loading aid may be an ionic loading aid. In some embodiments, the loading aid is a sulfate salt, a sucrose octasulfate salt, or a citrate salt. In some embodiments, the first loading aid is selected from the group consisting of ammonium sulfate (AS), ammonium sucrose octasulfate (NH4SOS), potassium sucrose octasulfate (KSOS), triethanolammonium sucrose octasulfate (TEA(OH)SOS), triethylammonium sucrose octasulfate (TEASOS), ammonium citrate, and sodium citrate. In some embodiments, the first loading aid is selected from the group consisting of ammonium sulfate (AS), ammonium sucrose octasulfate (NH4SOS), potassium sucrose octasulfate (KSOS), triethylammonium sucrose octasulfate (TEASOS), triethanolammonium sucrose octasulfate (TEA(OH)SOS), ammonium citrate, and sodium citrate, and the likes, or mixtures thereof. In some embodiments, the loading aid is selected from the group consisting of ammonium sulfate (AS), ammonium sucrose octasulfate (NH4SOS), potassium sucrose octasulfate (KSOS), triethylammonium sucrose octasulfate (TEASOS), sodium citrate, and the likes, or mixtures thereof. In some embodiments, the loading aid is selected from the group consisting of ammonium sulfate (AS), ammonium sucrose octasulfate (NH4SOS), potassium sucrose octasulfate (KSOS), triethylammonium sucrose octasulfate (TEASOS), and sodium citrate. In some embodiments, the loading aid is ammonium sulfate (AS). In some embodiments, the loading aid is ammonium sucrose octasulfate (NH4SOS). In some embodiments, the loading aid is potassium sucrose octasulfate (KSOS). In some embodiments, the loading aid is triethylammonium sucrose octasulfate (TEASOS). In some embodiments, the loading aid is sodium citrate. In some embodiments, a second loading aid is used. In some embodiments, the second loading aid is an ionic loading aid. In some embodiments, the second loading aid is a sulfate salt, a sucrose octasulfate salt, or a citrate salt. In some embodiments, the second loading aid is selected from the group consisting of ammonium sulfate (AS), ammonium sucrose octasulfate (NH4SOS), potassium sucrose octasulfate (KSOS), triethylammonium sucrose octasulfate (TEASOS), triethanolammonium sucrose octasulfate (TEA(OH)SOS), ammonium citrate, and sodium citrate, and the likes, or mixtures thereof. In some embodiments, the second loading aid is selected from the group consisting of ammonium sulfate (AS), potassium sucrose octasulfate (KSOS), triethylammonium sucrose octasulfate (TEASOS), sodium citrate, and the likes, or mixtures thereof. In some embodiments, the second loading aid is selected from the group consisting of ammonium sulfate (AS), potassium sucrose octasulfate (KSOS), triethylammonium sucrose octasulfate (TEASOS), and sodium citrate. In some embodiments, the second loading aid is ammonium sulfate (AS). In some embodiments, the second loading aid is ammonium sucrose octasulfate (NH4SOS). In some embodiments, the second loading aid is potassium sucrose octasulfate (KSOS). In some embodiments, the second loading aid is triethylammonium sucrose octasulfate (TEASOS). In some embodiments, the second loading aid is sodium citrate. In some embodiments, the first loading aid is potassium sucrose octasulfate (KSOS) and the second loading aid is sodium citrate.

Loading Solvent

In some embodiments, the loading solvent is an organic solvent. In some embodiments, the organic solvent is an aprotic organic solvent. In some embodiments, the loading solvent is dimethylsulfoxide (DMSO).

Methods of Use

Also provided is a method for delivering a therapeutically effective amount of a Bcl inhibitor comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome.

Also provided is a method for treating a hyperproliferative disorder, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome.

In some embodiments, the hyperproliferative disorder is a cancer. In some embodiments, the hyperproliferative disorder is a solid cancer or a hematologic cancer. In some embodiments, the hyperproliferative disorder is a solid cancer. In some embodiments, the solid cancer is a colorectal cancer or a small cell lung cancer. In some embodiments, the solid cancer is a colorectal cancer. In some embodiments, the solid cancer is a small cell lung cancer. In some embodiments, the hyperproliferative disorder is a hematologic cancer. In some embodiments, the hematologic cancer is selected from the group consisting of multiple myeloma (MM), acute lymphoblastic leukemia (ALL), acute myelogenous leukemia (AML), blastic plasmacytoid dendritic cell neoplasm (BPDCN), T-cell prolymphocytic leukemia, chronic lymphocytic leukemia (CLL), chronic myeloid leukemia (CML), myeloproliferative neoplasm (MPN), and lymphoma. In some embodiments, the hematologic cancer is multiple myeloma (MM). In some embodiments, the hematologic cancer is acute lymphoblastic leukemia (ALL). In some embodiments, the hematologic cancer is acute myelogenous leukemia (AML). In some embodiments, the hematologic cancer is a blastic plasmacytoid dendritic cell neoplasm (BPDCN). In some embodiments, the hematologic cancer is T-cell prolymphocytic leukemia. In some embodiments, the hematologic cancer is chronic lymphocytic leukemia (CLL). In some embodiments, the hematologic cancer is chronic myeloid leukemia (CML). In some embodiments, the hematologic cancer is a myeloproliferative neoplasm (MPN). In some embodiments, the hematologic cancer is a lymphoma. In some embodiments, the lymphoma is a non-Hodgkin lymphoma (NHL). In some embodiments, the non-Hodgkin lymphoma (NHL) is selected from the group consisting of cutaneous B-cell lymphoma (CBCL), small lymphocytic lymphoma (SLL), mantle cell lymphoma (MCL), diffuse large B-cell lymphoma (DLBCL), and follicular lymphoma (FL). In some embodiments, the non-Hodgkin lymphoma (NHL) is cutaneous B-cell lymphoma (CBCL). In some embodiments, the non-Hodgkin lymphoma (NHL) is small lymphocytic lymphoma (SLL). In some embodiments, the non-Hodgkin lymphoma (NHL) is mantle cell lymphoma (MCL). In some embodiments, the non-Hodgkin lymphoma (NHL) is diffuse large B-cell lymphoma (DLBCL). In some embodiments, the non-Hodgkin lymphoma (NHL) is follicular lymphoma (FL).

Also provided is a method for reducing the incidence or severity of thrombocytopenia associated with administration of a therapeutically effective amount of a Bcl inhibitor, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome;
wherein the incidence or severity of thrombocytopenia incurred by administering the Bcl inhibitor in the liposomal composition is less than the incidence or severity of thrombocytopenia incurred by administering the Bcl inhibitor in in non-liposomal form; and
wherein the total amount of the Bcl inhibitor in the liposomal composition is equal to the therapeutically effective amount of the Bcl inhibitor when administered in non-liposomal form.

Also provided is a method for reducing the total dose of a Bcl inhibitor administered to a subject to achieve a therapeutic effect, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and
wherein the total amount of the Bcl inhibitor in the liposomal composition necessary to achieve the therapeutic effect is less than the total amount of the Bcl inhibitor necessary to achieve the same therapeutic effect when administered in non-liposomal form.

Also provided is a method for reducing the total dose of a Bcl inhibitor administered to a subject to achieve a therapeutic effect in treating a hyperproliferative disorder, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and
wherein the total amount of the Bcl inhibitor in the liposomal composition necessary to achieve the therapeutic effect is less than the total amount of the Bcl inhibitor necessary to achieve the same therapeutic effect when administered in non-liposomal form.

Also provided is a method for reducing inter-subject variability of exposure to a Bcl inhibitor administered to subjects in need thereof, the method comprising administering to said subjects a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and
wherein the inter-subject variability of exposure to the Bcl inhibitor administered in the liposomal composition is less than the inter-subject variability of exposure to the Bcl inhibitor when administered in non-liposomal form; and
wherein the total amount of the Bcl inhibitor in the liposomal composition is equal to the therapeutically effective amount of the Bcl inhibitor when administered in non-liposomal form.

Also provided is a method for increasing the half-life of a Bcl inhibitor in a subject, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and
wherein the half-life of the Bcl inhibitor when administered in the liposomal composition is more than the half-life of the Bcl inhibitor when administered in non-liposomal form.

Also provided is a method for reducing dosing frequency of a Bcl inhibitor in a subject, the method comprising administering to the subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome; and
wherein the dosing frequency of the Bcl inhibitor administered in the liposomal composition is less than the dosing frequency of the Bcl inhibitor when administered in non-liposomal form; and wherein the total amount of the Bcl inhibitor in the liposomal composition is equal to the therapeutically effective amount of the Bcl inhibitor when administered in non-liposomal form.

Also provided is a method for reducing the incidence or severity of one or more adverse events associated with administration of a therapeutically effective amount of a Bcl inhibitor, the method comprising administering to a subject a liposomal composition comprising one or more liposomes, wherein each of the one or more liposomes comprises:
(a) a lipid bilayer comprising a first lipid and a first sterol;
(b) an internal medium comprising a first loading aid and a first solvent; and
(c) a Bcl inhibitor encapsulated in the internal medium of said liposome;
wherein the incidence or severity of said one or more adverse events incurred by administering the Bcl inhibitor in the liposomal composition is less than the incidence or severity of said one or more adverse events incurred by administering the Bcl inhibitor in in non-liposomal form; and wherein the total amount of the Bcl inhibitor in the liposomal composition is equal to the therapeutically effective amount of the Bcl inhibitor when administered in non-liposomal form.

Compositions of the present invention may be administered to warm-blooded animals, including humans as well as to domestic and/or avian species. In addition to pharmaceutical compositions, suitable formulations for veterinary use may be prepared and administered in a manner suitable to the subject. Preferred veterinary subjects include mammalian species, for example, non-human primates, dogs, cats, cattle, horses, sheep, and domesticated fowl. Subjects may also include laboratory animals, for example, in particular, rats, rabbits, mice, and guinea pigs. For treatment of human ailments, a qualified physician will determine how the compositions of the present invention should be utilized with respect to dose, schedule and route of administration using established protocols. Such applications may also utilize dose escalation should agents encapsulated in delivery vehicle compositions of the present invention exhibit reduced toxicity to healthy tissues of the subject.

Preferably, the pharmaceutical compositions of the present invention are administered parenterally, i.e., intraarterially, intravenously, intraperitoneally, subcutaneously, or intramuscularly. More preferably, the pharmaceutical compositions are administered intravenously or intraperitoneally by a bolus injection. For example, see Rahman, et al., U.S. Pat. No. 3,993,754; Sears, U.S. Pat. No. 4,145,410; Papahadjopoulos, et al., U.S. Pat. No. 4,235,871; Schneider, U.S. Pat. No. 4,224,179; Lenk, et al., U.S. Pat. No. 4,522,803; and Fountain, et al., U.S. Pat. No. 4,588,578.

In other methods, the pharmaceutical preparations of the present invention can be contacted with the target tissue by direct application of the preparation to the tissue. The application may be made by topical, "open" or "closed" procedures. By "topical", it is meant the direct application of the pharmaceutical preparation to a tissue exposed to the environment, such as the skin, oropharynx, external auditory canal, and the like. "Open" procedures are those procedures that include incising the skin of a patient and directly visualizing the underlying tissue to which the pharmaceutical preparations are applied. This is generally accomplished by a surgical procedure, such as a thoracotomy to access the lungs, abdominal laparotomy to access abdominal viscera, or other direct surgical approach to the target tissue. "Closed" procedures are invasive procedures in which the internal target tissues are not directly visualized, but accessed via inserting instruments through small wounds in the skin. For example, the preparations may be administered to the peritoneum by needle lavage. Likewise, the pharmaceutical preparations may be administered to the meninges or spinal cord by infusion during a lumbar puncture followed by appropriate positioning of the patient as commonly practiced for spinal anesthesia or metrazamide imaging of the spinal cord. Alternatively, the preparations may be administered through endoscopic devices.

Pharmaceutical compositions comprising delivery vehicles of the invention are prepared according to standard techniques and may comprise water, buffered water, 0.9% saline, 0.3% glycine, 5% dextrose and the like, including glycoproteins for enhanced stability, such as albumin, lipoprotein, globulin, and the like. These compositions may be sterilized by conventional, well-known sterilization techniques. The resulting aqueous solutions may be packaged for use or filtered under aseptic conditions and lyophilized, the lyophilized preparation being combined with a sterile aqueous solution prior to administration. The compositions may contain pharmaceutically acceptable auxiliary substances as required to approximate physiological conditions, such as pH adjusting and buffering agents, tonicity adjusting agents and the like, for example, sodium acetate, sodium lactate, sodium chloride, potassium chloride, calcium chloride, and the like. Additionally, the delivery vehicle suspension may include lipid-protective agents which protect lipids against free-radical and lipid-peroxidative damages on storage. Lipophilic free-radical quenchers, such as alpha-tocopherol and water-soluble iron-specific chelators, such as ferrioxamine, are suitable.

The concentration of delivery vehicles in the pharmaceutical formulations can vary widely, such as from less than about 0.05%, usually at or at least about 2-5% to as much as 10 to 30% by weight and will be selected primarily by fluid volumes, viscosities, and the like, in accordance with the particular mode of administration selected. For example, the concentration may be increased to lower the fluid load associated with treatment. Alternatively, delivery vehicles composed of irritating lipids may be diluted to low concentrations to lessen inflammation at the site of administration. For diagnosis, the amount of delivery vehicles administered will depend upon the particular label used, the disease state being diagnosed and the judgment of the clinician.

Preferably, the pharmaceutical compositions of the present invention are administered intravenously. Dosage for the delivery vehicle formulations will depend on the ratio of drug to lipid and the administrating physician's opinion based on age, weight, and condition of the patient.

In addition to pharmaceutical compositions, suitable formulations for veterinary use may be prepared and administered in a manner suitable to the subject. Preferred veterinary subjects include mammalian species, for example, non-human primates, dogs, cats, cattle, horses, sheep, and domesticated fowl. Subjects may also include laboratory animals, for example, in particular, rats, rabbits, mice, and guinea pigs.

In the instance where a single composition containing more than one active agent is included, the above procedures are followed per se. Where the agents are administered in separate delivery vehicle compositions, the administration should be timed in such a manner that the desired ratio is maintained. Typically, this can accomplished by simultaneously administering the compositions in the calculated proportions.

Kits

The therapeutic agents in the invention compositions may be formulated separately in individual compositions wherein each therapeutic agent is stably associated with appropriate delivery vehicles. These compositions can be administered separately to subjects as long as the pharmacokinetics of the delivery vehicles are coordinated so that the ratio of therapeutic agents administered is maintained at the target for treatment. Thus, it is useful to construct kits which include, in separate containers, a first composition comprising delivery vehicles stably associated with at least a first therapeutic agent and, in a second container, a second composition comprising delivery vehicles stably associated with at least one second therapeutic agent. The containers can then be packaged into the kit.

The kit will also include instructions as to the mode of administration of the compositions to a subject, at least including a description of the ratio of amounts of each composition to be administered. Alternatively, or in addition, the kit is constructed so that the amounts of compositions in each container is pre-measured so that the contents of one container in combination with the contents of the other represent the correct ratio. Alternatively, or in addition, the containers may be marked with a measuring scale permitting dispensation of appropriate amounts according to the scales visible. The containers may themselves be useable in administration; for example, the kit might contain the appropriate amounts of each composition in separate syringes. Formulations which comprise the pre-formulated correct ratio of therapeutic agents may also be packaged in this way so that the formulation is administered directly from a syringe prepackaged in the kit.

EXAMPLES

The following examples illustrate some embodiments of the invention. The examples and preparations that follow are provided to enable those skilled in the art to more clearly understand and to practice these and other embodiments of the present invention. They should not be considered as limiting the scope of the invention, but merely as being illustrative and representative thereof.

Example 1. General Procedure for Liposome Formulation

Liposomes containing drug compounds were generated by remotely loading drug compounds into DSPC/Cholesterol/PEG-DSG liposomes containing ammonium sulfate (AS), ammonium sucrose octasulfate (NH4SOS), triethylammonium sucrose octasulfate (TEASOS), or triethanolammonium sucrose octasulfate (TEA(OH)SOS), or ammonium citrate as a loading aid.

A. Preparation of Loading Aids 250 mM ammonium sulfate loading aid solution was prepared by dissolving solid ammonium sulfate into deionized (DI) water to reach the target concentration of 250 mM. This gave a solution with a pH of 5.2. The solution was filtered through a 0.2 µm membrane.

300 mM ammonium citrate loading aid solution was prepared by dissolving solid ammonium dibasic citrate into DI water to reach the target concentration of 300 mM. This gave a solution with a pH of 4.9. The solution was filtered through 0.2 µm membrane.

0.5-1.0 N triethylamine-SOS loading aid solution was prepared from potassium SOS. For small batches, 5 g of potassium SOS was dissolved in 12 mL of DI water at 65° C. and filtered with a glass fiber membrane. The warm solution was then loaded to top of a Dowex column containing ~30 mL of packed 50W-X8 beads pretreated with 3 M HCl and thoroughly washed with DI water. After depletion, DI water was loaded to elute the SOS solution. Through a flow conductivity meter connected the bottom of the column, a fraction of eluate solution was collected with a conductivity greater than 150 mS/cm. The resulting H-SOS solution was immediately titrated with triethylamine until the pH reached 6.5±0.5. The trimethylamine-SOS solution was filtered with a 0.2 µm membrane. The SOS concentration was determined by sulfur elemental analysis with ICP-OES (5800 VDV, Agilent). The filtered solution was stored at 4° C.

0.5-1.0 N ammonium SOS loading aid solution was prepared in the same way as above, except that the eluted H-SOS solution was immediately titrated with concentrated ammonia to reach the target pH of 6.5±0.5.

0.5-1.0 N triethanolamine SOS loading aid solution was prepared in the same way as above except that the eluted H-SOS solution was immediately titrated with triethanolamine to reach the target pH of 6.5±0.5.

The preparation of all SOS solutions can be scaled-up 25-100 fold proportionally.

B. Lipid Foam Preparation and Liposome Extrusion

DSPC, Cholesterol, and a polymer-conjugated lipid were weighed and dissolved in chloroform in a sealed glass vial or bottle.

Upon forming the viscous chloroform solution of concentrated lipids, vacuum was applied to generate lipid foams in seconds. The chloroform was thoroughly removed by placing the lipid foam in a Buchi vacuum pump system (V-512, Buchi) with heating or overnight at ambient temperature. The dried foam was stored at −20° C. if not used immediately.

The lipid foam was hydrated by adding an aqueous solution of loading aid pre-heated to 65° C. in a water bath. The heated solution was added to the lipid foam. Multilamellar vesicles (MLVs) were created by vortexing for cycles of 20-30 seconds, followed by heating for 2-3 minutes.

Depending on the loading aid used, the 250 mM ammonium sulfate can be substituted for 300 mM ammonium citrate, or 0.5-1 N triethylamine-SOS, or 0.5-1 N Ammonium-SOS or 0.5-1 N triethanolamine-SOS.

The MLVs were extruded once through a 200 nm PCTE (polycarbonate track etched) membrane at 20-100 psi using a 10 mL jacketed liposome extruder (LIPEX®) maintained at 65° C. The resulting MLVs were then extruded 7 times through a 100 nm PCTE membrane at 50-200 psi using a 10 mL jacketed liposome extruder maintained at 65° C. If liposome formulations require handling and storage at low temperatures, liposomes can be extruded with loading aid and sucrose as cryoprotectant.

For small scale volumes (i.e. <20 ml), extruded liposomes containing 250 mM ammonium sulphate or 300 mM ammonium citrate were buffer exchanged into 9% w/v dextrose by loading in Sephadex G25 columns (PD-10 Column, Cytiva) at a ratio of 1 mL/8.3 mL bed volume and collecting the liposome eluate fraction with a conductivity <50 µS/cm, thereby removing any unencapsulated loading aid.

For small scale volumes, extruded liposomes containing 0.5-1 N triethylamine-SOS, or 0.5-1 N ammonium-SOS or 0.5-1 N triethanolamine-SOS were buffer exchanged into 9-18% w/v dextrose (depending on the normality of the loading aid to balance osmotic pressure) by loading in Sepharose CL4B columns at a ratio of 1 mL/10 mL bed volume and collecting the liposome eluate fraction with a conductivity <20 µS/cm, thereby removing any unencapsulated loading aid.

For larger scale volumes, extruded liposomes containing 250 mM ammonium sulphate, or 300 mM ammonium citrate, or 0.5-1 N triethylamine-SOS, or 0.5-1 N Ammonium-SOS or 0.5-1 N triethanolamine-SOS were buffer exchanged with 18 volume exchanges of 9-18% w/v dextrose using tangential flow filtration (Sartorius Slice 200) with a 100 kDa MWCO Hydrosart PES membrane.

C. Encapsulation of Drug Compounds into Liposomes

Drug compounds were dissolved in DMSO at a concentration of 20-100 mg/mL and added dropwise to the prepared liposomes under stirring and heated to 65° C. such that the final drug concentration in the solution was in the range of 0.2 to 6.0 mg/mL and the final D/L ratio was in the range 0.1 to 0.8 mol/mol. The final organic solvent concentration was between 2 to 30%.

The sample was incubated under constant stirring at 65° C. or room temperature to facilitate loading of the drug into the liposomes. After loading, the sample was cooled on an ice bath.

D. Purification of Drug-loaded Liposomes

Purification of the formulations were carried using tangential flow filtration (Slice 200, Sartorius) equipped with 100-300 k MWCO (Hydrosart, Sartorius) PES membranes. The formulation was first concentrated to 50 mL, than purified with 12-24 volume exchanges of acidified (0.01 M HCl or MeSO₃H) dextrose of similar concentration as during the loading procedure in order to remove unencapsulated drug. Thereafter, the formulation was purified with another 12 volume exchanges of 5% dextrose. Alternatively, if low temperature storage of the liposome formulation is required, sucrose may be used instead of dextrose. Finally, the formulation was concentrated to 10-20 mg/ml lipids, collected and filtered through a 0.22 µm PES syringe filter.

Example 2. Formulation of Compound 9 into Liposomes

Liposomes containing Compound 9 were generated by remotely loading into DSPC/Cholesterol/PEG-DSG (3:2:0.3 mole ratio) liposomes containing ammonium sulfate (AS), ammonium sucrose octasulfate (NH4SOS), triethylammonium sucrose octasulfate (TEASOS), triethanolammonium sucrose octasulfate (TEA(OH)SOS), or ammonium citrate as a loading aid.

A. Preparation of Loading Aids

Loading aid solutions were prepared as described in Example 1.

B. Lipid Foam Preparation and Liposome Extrusion

DSPC/Cholesterol/PEG-DSG (3:2:0.3 mole ratio) was weighed and dissolved in chloroform at a concentration of 1 g lipid/mL of chloroform using heat at ~60° C. in a sealed glass vial or bottle.

Upon forming the viscous chloroform solution of concentrated lipids, vacuum was applied to generate lipids foam in seconds. The chloroform was thoroughly removed by placing the lipid foam in a Buchi vacuum pump system (V-512, Buchi) for either 0.5 hour with heating or overnight at ambient temperature. The dried foam was stored at −20° C. if not used immediately.

The lipid foam was hydrated by adding an aqueous solution of 250 mM ammonium sulphate pre-heated to 65° C. in a water bath. The heated solution was added to the lipid foam at a concentration of 50 mg lipid/mL of 250 mM ammonium sulphate solution. Multilamellar vesicles (MLVs) were created by vortexing for cycles of 20-30 seconds, followed by heating for 2-3 minutes.

Depending on the loading aid used, the 250 mM ammonium sulphate can be substituted for 300 mM ammonium citrate, or 0.5-1 N triethylamine-SOS, or 0.5-1 N Ammonium-SOS or 0.5-1 N triethanolamine-SOS.

The MLVs were extruded once through a 200 nm PCTE (polycarbonate track etched) membrane at 20-100 psi using a 10 mL jacketed liposome extruder (LIPEX®) maintained at 65° C. The resulting MLVs were then extruded 7 times through a 100 nm PCTE membrane at 50-200 psi using a 10 mL jacketed liposome extruder maintained at 65° C. If liposome formulations require handling and storage at low temperatures, liposomes can be extruded with loading aid and sucrose as cryoprotectant.

The extruded liposomes had a mean hydrodynamic diameter of 110 nm+/−20 nm as determined by dynamic light scattering (Malvern Nano ZS) using 0.9% saline as the diluent.

For small scale volumes (i.e. <20 ml), extruded liposomes containing 250 mM ammonium sulphate or 300 mM ammonium citrate were buffer exchanged into 9% w/v dextrose by loading in Sephadex G25 columns (PD-10 Column, Cytiva) at a ratio of 1 mL/8.3 mL bed volume and collecting the liposome eluate fraction with a conductivity <50 µS/cm, thereby removing any unencapsulated loading aid.

For small scale volumes, extruded liposomes containing 0.5-1 N triethylamine-SOS, or 0.5-1 N ammonium-SOS or 0.5-1 N triethanolamine-SOS were buffer exchanged into 9-18% w/v dextrose (depending on the normality of the loading aid to balance osmotic pressure) by loading in Sepharose CL4B columns at a ratio of 1 mL/10 mL bed volume and collecting the liposome eluate fraction with a conductivity <20 µS/cm, thereby removing any unencapsulated loading aid.

For larger scale volumes, extruded liposomes containing 250 mM ammonium sulphate, or 300 mM ammonium citrate, or 0.5-1 N triethylamine-SOS, or 0.5-1 N Ammonium-SOS or 0.5-1 N triethanolamine-SOS were buffer exchanged with 18 volume exchanges of 9-18% w/v dextrose using tangential flow filtration (Sartorius Slice 200) with a 100 kDa MWCO Hydrosart PES membrane.

C. Encapsulation of Compound 9 into Liposomes

For 250 mM ammonium sulphate as a loading aid, Compound 9 was dissolved in DMSO at a concentration of 20-100 mg/mL and added dropwise to the prepared liposomes under stirring and heated to 65° C. such that the final drug concentration in the solution was in the range of 0.2 to 0.8 mg/mL and the final D/L ratio was in the range 0.1 to 0.8 mol/mol. The final DMSO concentration was between 2 to 30%.

The sample was incubated under constant stirring at 65° C. for 45 minutes to facilitate loading of the drug into the liposomes. After loading, the sample was cooled on an ice bath.

D. Purification of Compound 9-Loaded Liposomes

Purification of the formulations were carried using tangential flow filtration (Slice 200, Sartorius) equipped with 100-300 k MWCO (Hydrosart, Sartorius) PES membranes. The formulation was first concentrated to 50 mL, than purified with 12-24 volume exchanges of acidified (0.01 M HCl or MeSO₃H) dextrose of similar concentration as during the loading procedure in order to remove unencapsulated drug. Thereafter, the formulation was purified with another 12 volume exchanges of 5% dextrose. Alternatively, if low temperature storage of the liposome formulation is required, sucrose may be used instead of dextrose. Finally, the formulation was concentrated to 10-20 mg/ml lipids, collected and filtered through a 0.22 µm PES syringe filter.

Example 3. Drug and Lipid Assays

Formulations of liposomes containing various drugs were prepared as described in Examples 1 and 2. Lipid contents were analyzed using phospholipids C and cholesterol assay kits (Fujifilm) and a UV spectrometer (Cytation 5, BioTek Instruments Inc.).

To determine the drug content, the drug-loaded liposomes were first solubilized in a solubilizing mixture containing 70% ethanol and 100 mM HCl. A calibration curve was prepared with Compound 9 powder and the same solubilizing mixture. The drug was detected using a UV spectrometer (Cytation 5, BioTek Instruments Inc.) measuring absorbance at 310 nm.

The drug yield is the drug recovery after purification of the formulation (i.e. without taking the lipids into consideration). It was calculated as follows:

Drug yield (%)=Drug concentration final formulation/drug concentration in the control*100

The control was the same formulation but without purification (i.e. recovery is 100%).

The encapsulation efficiency (EE) is calculated as follows:

EE (%)=Drug-to-Lipid ratio in final formulation/Drug-to-Lipid ratio in the control*100

For example, if the Drug-to-Lipid ratio is to be 0.10 (control) and the final formulation presents a Drug-to-Lipid ratio of 0.05 after purification, EE will be 50% (0.05/0.1*100).

The composition of these formulations is provided in Table 1. Characterization of these lipids (e.g., encapsulation efficiency, liposome size) is presented below in Table 2.

TABLE 1

Formulations of liposomes. DSPC = Distearoylphosphatidylglycerol. PCL = polymer-conjugated lipid. Chol = Cholesterol. PEGylated = 1,2-distearoyl-rac-glycero-3-methoxypoly(ethylene glycol-2000) (also known as DSG-PEG2000 and PEG(2000)-distearoylglycerol). AS = ammonium sulfate. KSOS = potassium sucrose octasulfate. MES = 2-(N-morpholino)ethanesulfonic acid. TEASOS = triethylammonium sucrose octasulfate. $MeSO_3H$ = methanesulfonic acid.

| Liposome | Phospholipid (mol %) | Sterol (mol %) | PCL (mol%) | Loading Aid | External Buffer (% w/v) | Loading Temp. (° C.) | DMSO (mol %) |
|---|---|---|---|---|---|---|---|
| 1a | DSPC (57%) | Chol (38%) | PEGylated (5.6%) | AS (250 mM) | Dextrose (9%) | 65 | 10 |
| 1b | DSPC (57%) | Chol (38%) | PEGylated (5.6%) | AS (250 mM) | Dextrose (9%) | 65 | 4 |
| 2a | DSPC (57%) | Chol (38%) | PEGylated (5.6%) | AS (250 mM) | Dextrose (9%) | 65 | 20 |
| 2b | DSPC (57%) | Chol (38%) | PEGylated (5.6%) | KSOS (0.43N) / Na-Citrate (300 mM) | 10 mM MES/ Dextrose (9%) | 65 | 0 |
| 2c | DSPC (57%) | Chol (38%) | PEGylated (5.6%) | KSOS (0.43N) / Na-Citrate (300 mM) | 10 mM $MeSO_3H$/ Dextrose (9%) | 65 | 0 |
| 3a | DSPC (57%) | Chol (38%) | PEGylated (5.6%) | AS (250 mM) | Dextrose (9%) | 65 | 2 |
| 3b | DSPC (57%) | Chol (38%) | PEGylated (5.6%) | TEASOS (0.5N) | Dextrose (7.5%) | 65 | 2 |
| 4a | DSPC (57%) | Chol (38%) | PEGylated (5.6%) | TEASOS (1.1N) | Dextrose (18%) | 65 | 4 |
| 5a | DSPC (57%) | Chol (38%) | PEGylated (5.6%) | TEASOS (1.1N) | Dextrose (18%) | 65 | 2 |
| 5b | DSPC (57%) | Chol (38%) | PEGylated (5.6%) | AS (500 mM) | Dextrose (18%) | 65 | 2 |

TABLE 2

Characterization of drug-loaded liposomes. EE = encapsulation efficiency. PDI = polydispersity index. Z-ave = average diameter.

| Liposome | Drug | [D] (mg/mL) | Drug Yield (%) | EE (%) | Liposome size Z-ave (nm) | PDI |
|---|---|---|---|---|---|---|
| 1a | Compound 2 | 0.31 | 81 | 126 | 136 | 0.05 |
| 1b | Compound 2 | 0.26 | 65 | 77 | 132 | 0.06 |
| 2a | Compound 9 | 1.42 | 95 | 80 | 139 | 0.12 |
| 2b | Compound 9 | 0.23 | N.D. | 65 | 210 | 0.35 |
| 2c | Compound 9 | 1.29 | N.D. | 73 | 182 | 0.27 |
| 3a | Compound 7 | 0.25 | 68 | 93 | 151 | 0.05 |
| 3b | Compound 7 | 0.26 | 69 | 97 | 131 | 0.06 |

TABLE 2-continued

Characterization of drug-loaded liposomes. EE = encapsulation efficiency. PDI = polydispersity index. Z-ave = average diameter.

| Liposome | Drug | [D] (mg/mL) | Drug Yield (%) | EE (%) | Liposome size Z-ave (nm) | PDI |
|---|---|---|---|---|---|---|
| 4a | Venetoclax | 0.60 | 76 | 81 | 176 | 0.22 |
| 5a | Navitoclax | 0.28 | 68 | 85 | 135 | 0.09 |
| 5b | Navitoclax | 0.16 | 38 | 28 | 145 | 0.10 |

N.D. = not determined.

Example 4. Formulations and Pharmacokinetic Characterization of Drug-Loaded Liposomes Experimental Design Female B6D2F1/J mice were purchased from Jackson Laboratory and acclimated 7 days prior to study start. Mice were caged in autoclaved Allentown ventilated caging at a capacity of 3 animals/cage during the course of the experiment. Cages were changed bi-weekly. Environmental enrichment that was supplied for cages were Nestlets from Ancare, transparent tinted polycarbonate Mouse Igloos from Bio-Serv on Envigo 7097¼" corn cob bedding. All enrichment was added to the cage prior to the cages being autoclaved. Mice were fed Envigo Teklad Global Rodent Diet 2018. The rodent food was kept in the hoppers of the wire lids and was changed bi-weekly. Reverse osmosis water was supplied through Avidity Science automatic watering valves at a flow rate of 25-50 ml/min. Environmental control of the lights and monitoring of temperature, humidity and airflow was done by WatchDog. Light cycles in the animal holding rooms was set for 12 hours on and 12 hours off. Temperature, humidity and airflow were maintained and controlled by BCCRC facilities.
Storage of Test/Control Articles All Test/Control Articles (TAs/CAs) were provided as ready to inject and stored at 2-8° C.
Dose Administration Mice were injected with the required volume to administer the prescribed dose (10 mg/kg) to the animals based on individual mouse weights using a 28 G needle. The injection volume was 200 µL/20 g mouse. The mice were briefly (less than 30 sec.) restrained during i.v. injections. Dilation of the vein was achieved by holding the animals under a heat lamp for a period of between 1-2 minutes (current revision of SOP-AF-018).
Data Collection
Pharmacokinetic Sampling Mice were individually weighed. Mice were injected with the Test Article/Control Article and blood were collected as per the study grouping table. For blood collection, mice were terminated by isoflurane followed by $CO_2$ inhalation (SOP-AF-042). Blood was collected by cardiac puncture (current revision of SOP-AF-002). For cardiac puncture, upon last breath, mice were removed from inhalation chamber and approximately 500 µL of blood was collected by cardiac puncture with a 25 G needle and placed into the appropriate microtainer tube (K2EDTA). Plasma was separated by centrifuging samples at 1300 g for 15 minutes, then pipetted off and placed into labelled vials. The plasma was frozen at −20° C. and the remaining dosing material was stored at ca. 4° C. until samples were shipped.
Determination of Drug Plasma Concentrations Plasma samples were diluted in acidified methanol and vortexed vigorously. The plasma/methanol samples were then centrifuged at 10000 rcf for 10 min at 8° C. The supernatant was injected onto a Phenomenex Synergi Fusion-RP 2.5 µm 50×3 mm column running a gradient with 10 mM ammonium acetate buffer and acetonitrile. Drug was detected using a diode array detector at wavelength of 300 nm. The plasma drug concentrations were calculated against a linear calibration curve range from 1-40 µg/mL.
Liposome Formulations All liposomes used in the pharmacokinetic studies described herein comprised DPSC/Cholesterol/PEGylated (56/38/5.6 mol %) and were prepared according to Examples 1-2.

TABLE 3

Formulations of liposomes used in pharmacokinetic (PK) studies. PEGylated = PEG(2000)-distearoylglycerol. AS = ammonium sulfate. TEASOS = triethylammonium sucrose octasulfate. $NH_4SOS$ = ammonium sucrose octasulfate.

| Liposome | Drug | PCL (mol %) | Loading Aid | External Buffer (% w/v) | Loading Temp. (° C.) | DMSO (mol %) |
|---|---|---|---|---|---|---|
| 7a | Compound 9 | PEGylated (5.6%) | AS (250 mM) | Dextrose (9%) | 65 | 2 |
| 7b | Compound 9 | PEGylated (5.6%) | AS (500 mM) | Dextrose (17%) | 65 | 2 |
| 7c | Compound 9 | PEGylated (5.6%) | $NH_4SOS$ (1.1 N) | Dextrose (18%) | 65 | 2 |
| 7d | Compound 9 | PEGylated (5.6%) | TEASOS (1.1 N) | Dextrose (18%) | 65 | 2 |
| 8a | Compound 2 | PEGylated (5.6%) | AS (250 mM) | Dextrose (9%) | 65 | 10 |

TABLE 3-continued

Formulations of liposomes used in pharmacokinetic (PK) studies. PEGylated = PEG(2000)-distearoylglycerol. AS = ammonium sulfate. TEASOS = triethylammonium sucrose octasulfate. NH$_4$SOS = ammonium sucrose octasulfate.

| Liposome | Drug | PCL (mol %) | Loading Aid | External Buffer (% w/v) | Loading Temp. (° C.) | DMSO (mol %) |
|---|---|---|---|---|---|---|
| 8b | Compound 2 | PEGylated (5.6%) | AS (250 mM) | Dextrose (9%) | 65 | 2 |
| 8c | Compound 2 | PEGylated (5.6%) | AS (500 mM) | Dextrose (17%) | 65 | 2 |
| 9a | Compound 7 | PEGylated (5.6%) | AS (500 mM) | Dextrose (18%) | 65 | 2 |

TABLE 4

Characterization of drug-loaded liposomes. D/L ratio = drug/phospholipid ratio. EE = encapsulation efficiency. PDI = polydispersity index. Z-ave = average diameter.

| Liposome | EE (%) | Liposome size Z-ave (nm) | PDI | $T_{1/2}$ (h) |
|---|---|---|---|---|
| 7a | 37.7 | 127 | 0.04 | 18 |
| 7b | 69.7 | 125 | 0.02 | 17 |
| 7c | 94.5 | 133 | 0.08 | 9.5 |
| 7d | 91.2 | 128 | 0.05 | 10 |
| 8a | 92.2 | 137 | 0.06 | 14.4 |
| 8b | 39.9 | 124 | 0.06 | 15.8 |
| 8c | 55.7 | 118 | 0.04 | 18 |
| 9a | 59.0 | 136 | 0.01 | 17.5 |

N.D. = not determined.

Example 5. Determination of Plasma Stability of Compound 2 Liposome Formulations Plasma stability was determined by measuring the concentration of Compound 2 at various time points in plasma collected as described in Example 4. All liposome formulations comprised DSPC/Cholesterol/PEGylated (56/38/5.6 mol %) as described in Examples 1-2. Formulations 1~4 were prepared using 250 mM AS as the loading aid. Formulation 5 was prepared using 500 mM AS as the loading aid. Compound 2 was loaded into the liposomes of formulations 1, 4, and 5 using 2% DMSO. Compound 2 was loaded into the liposomes of formulations 2 and 3 using 10% DMSO.

FIG. 1A shows the evolution of normalized plasma concentration of Compound 2 over time using various liposomal formulations compared to using the free drug.

Figure 1B:
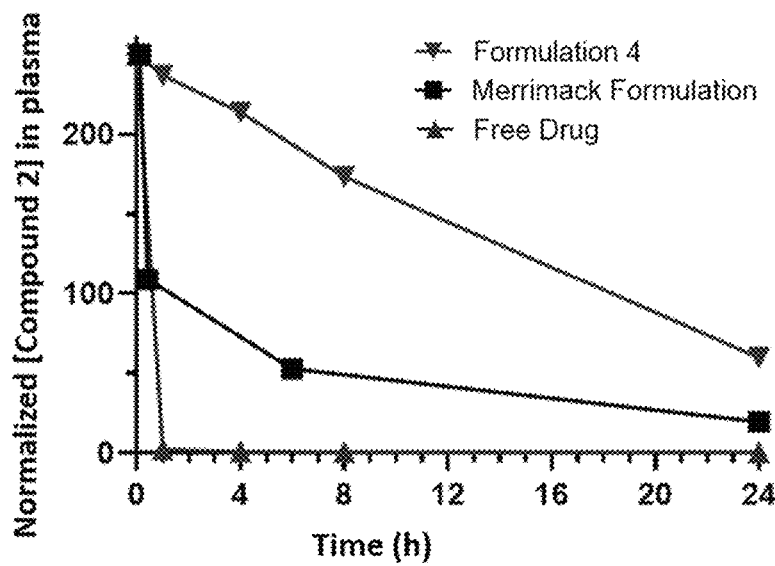
FIG. 1B shows the evolution of normalized plasma concentration of Compound 2 over time using an exemplary liposomal formulation of the present disclosure compared to using a liposomal formulation prepared according to previously published methods, and compared to using the free drug.

FIG. 1B shows the evolution of normalized plasma concentration of Compound 2 over time using an exemplary liposomal formulation of the present disclosure compared to using a liposomal formulation prepared according to previously published methods, and compared to using the free drug. The formulations labeled "Merrimack" comprised liposomes comprising DSPC/Cholesterol/PEGylated (56/38/5.6 mol %) that were loaded without DMSO using TEASOS (0.43 N) as the loading aid, according to the procedure recited in WO 2017/123616.

Example 6. Determination of Plasma Stability of Compound 9 Liposome Formulations Plasma stability was determined by measuring the concentration of Compound 9 at various time points in plasma collected as described in Example 4. All liposome formulations comprised DSPC/Cholesterol/PEGylated (56/38/5.6 mol %) as described in Examples 1-2. Formulation 1 used 250 mM AS as the loading aid. Formulation 2 used 500 mM AS as the loading aid. Formulation 3 used 0.5 N TEASOS as the loading aid. Formulation 4 used 0.5 N NH4SOS as the loading aid.

Figure 2A:
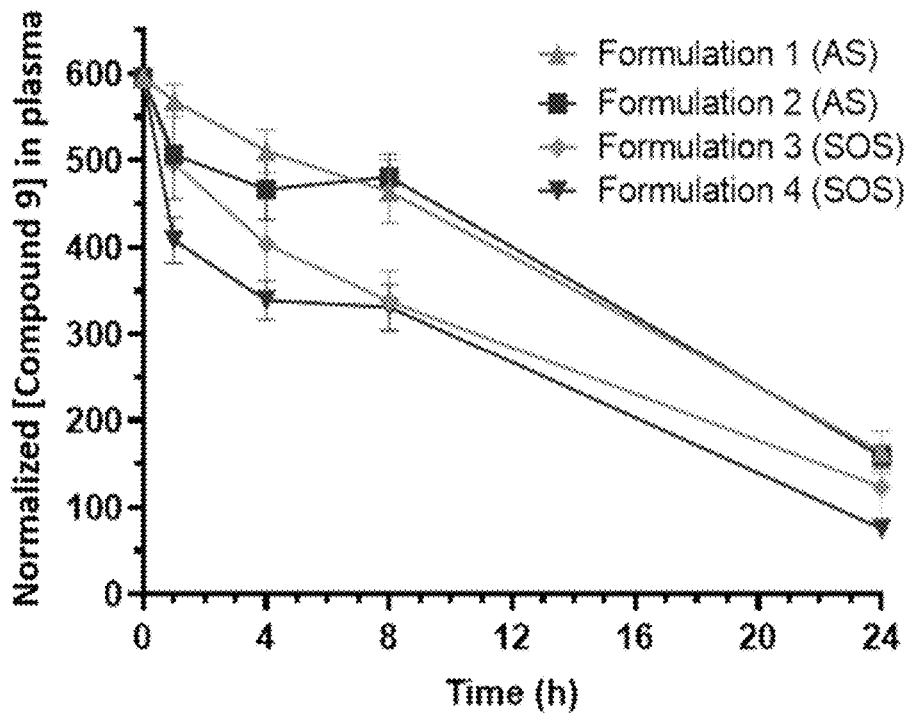
FIG. 2A shows the evolution of normalized plasma concentration of Compound 9 over time using various liposomal formulations.

FIG. 2A shows the evolution of normalized plasma concentration of Compound 9 over time using various liposomal formulations.

Figure 2B:
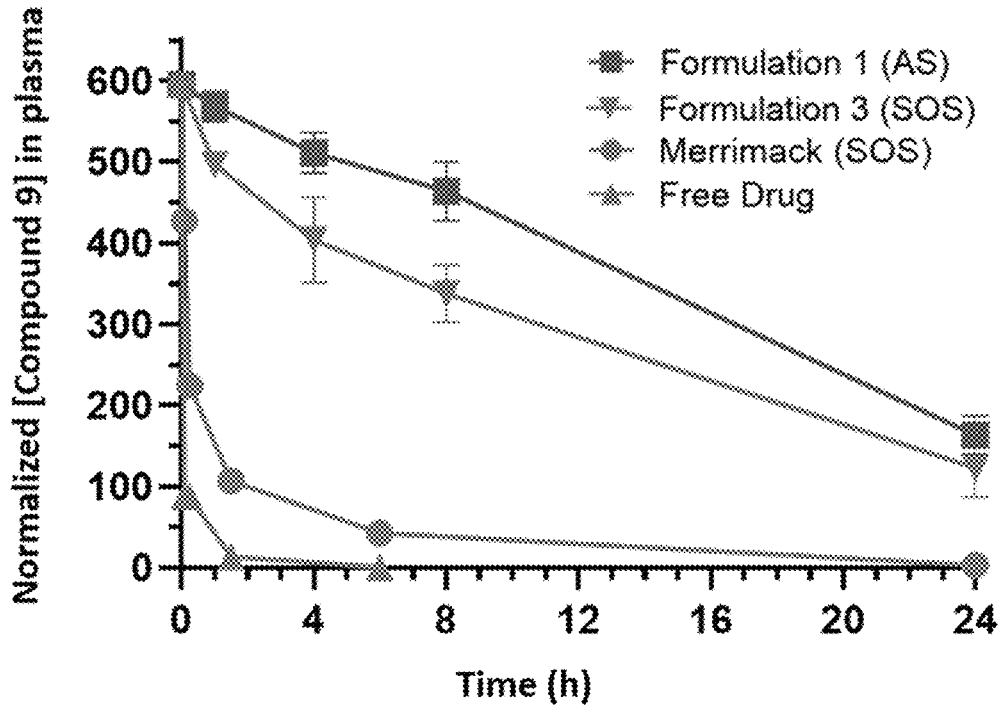
FIG. 2B shows the evolution of normalized plasma concentration of Compound 9 over time using exemplary liposomal formulations of the present disclosure compared to using a liposomal formulation prepared according to previously published methods, and compared to using the free drug.

FIG. 2B shows the evolution of normalized plasma concentration of Compound 9 over time using exemplary liposomal formulations of the present disclosure compared to using a liposomal formulation prepared according to previously published methods, and compared to using the free drug. The formulations labeled "Merrimack" comprised liposomes comprising DSPC/Cholesterol/PEGylated (56/38/5.6 mol %) that were loaded without DMSO using TEASOS (0.43 N) as the loading aid, according to the procedure recited in WO 2017/123616.

Example 7. Effect of Liposome Encapsulation on the Thrombocytopenic Activity of Compound 9 Experimental Design Female B6D2F1/J mice were purchased from Jackson Laboratory and acclimated 7 days prior to study start. Mice were caged in autoclaved Allentown ventilated caging at a capacity of 3 animals/cage during the course of the experiment. Cages were changed bi-weekly. Environmental enrichment that was supplied for cages were Nestlets from Ancare, transparent tinted polycarbonate Mouse Igloos from Bio-Serv on Envigo 7097¼" corn cob bedding. All enrichment was added to the cage prior to the cages being autoclaved. Mice were fed Envigo Teklad Global Rodent Diet 2018. The rodent food was kept in the hoppers of the wire lids and was changed bi-weekly. Reverse osmosis water was supplied through Avidity Science automatic watering valves at a flow rate of 25-50 ml/min. Environmental control of the lights and monitoring of temperature, humidity and airflow was done by WatchDog. Light cycles in the animal holding rooms was set for 12 hours on and 12 hours off. Temperature, humidity and airflow were maintained and controlled by BCCRC facilities.

Storage of Test/Control Articles

All Test/Control Articles (TAs/CAs) were provided as ready to inject and stored at 2-8° C.

Dose Administration

Mice were injected with the required volume to administer the prescribed dose (10 mg/kg) to the animals based on individual mouse weights using a 28 G needle. The injection volume was 200 μL/20 g mouse. The mice were briefly (less than 30 sec.) restrained during i.v. injections. Dilation of the vein was achieved by holding the animals under a heat lamp for a period of between 1-2 minutes (current revision of SOP-AF-018).

Data Collection

Blood Collection

The mice were weighed and randomized into their study groups. The mice were restrained within a falcon tube during saphenous blood collection. Dilation of the vein was achieved by holding the animals under a heat lamp for a period of between 1-2 minutes and the leg was shaved and wiped with isopropanol. Vaseline was applied over the saphenous vein and it was occluded. A 25 G needle at a 90 degree angle was used to penetrate the vein and 50-75 μL blood was collected into Microvette® CB 300 K2 EDTA tube and mixed 8-10 times with an EDTA pipet tip to ensure there were no clots and placed on ice. The vein was held to stop the bleeding before the animal was returned to its cage (SOP-AF-001).

For terminal blood collection, mice were terminated by isoflurane followed by CO2 inhalation (SOP-AF-042). Blood was collected by cardiac puncture (current revision of SOP-AF-002). For cardiac puncture, upon last breath, mice were removed from inhalation chamber and approximately 500 μL, of blood was collected by cardiac puncture with a 25 G needle and placed into the appropriate microtainer tube (K2EDTA).

For hematology, whole blood was placed into a K2 EDTA tube and inverted gently a minimum of 8-10 times. The sample was inverted until it was positive that the sample was not clotting, and placed on ice. Samples were sent for complete blood count (CBC) analysis within 30 minutes of collection. CBC analysis was completed on the Element HT5 within 2 hours of sample draw. Samples were run in duplicate. 20 μL of whole blood was diluted with 480 μL of V-52 D Diluent, allowed to rest for 3 minutes, and run on the Element HT5. See the work instruction "Element HT5 Auto Hematology Analyzer" for full instructions on running samples.

Determination of Drug Plasma Concentrations

Plasma samples were diluted in acidified methanol and vortexed vigorously. The plasma/methanol samples were then centrifuged at 10000 rcf for 10 min at 8° C. The supernatant was injected onto a Phenomenex Synergi Fusion-RP 2.5 μm 50×3 mm column running a gradient with 10 mM ammonium acetate buffer and acetonitrile. Drug was detected using a diode array detector at wavelength of 300 nm. The plasma drug concentrations were calculated against a linear calibration curve range from 1-40 μg/mL.

Liposome Formulations

All liposomes used in the pharmacokinetic studies described herein comprised DSPC/Cholesterol/PEGylated (56/38/5.6 mol %) and Compound 9 and were prepared according to Examples 1-2.

Figure 3A:
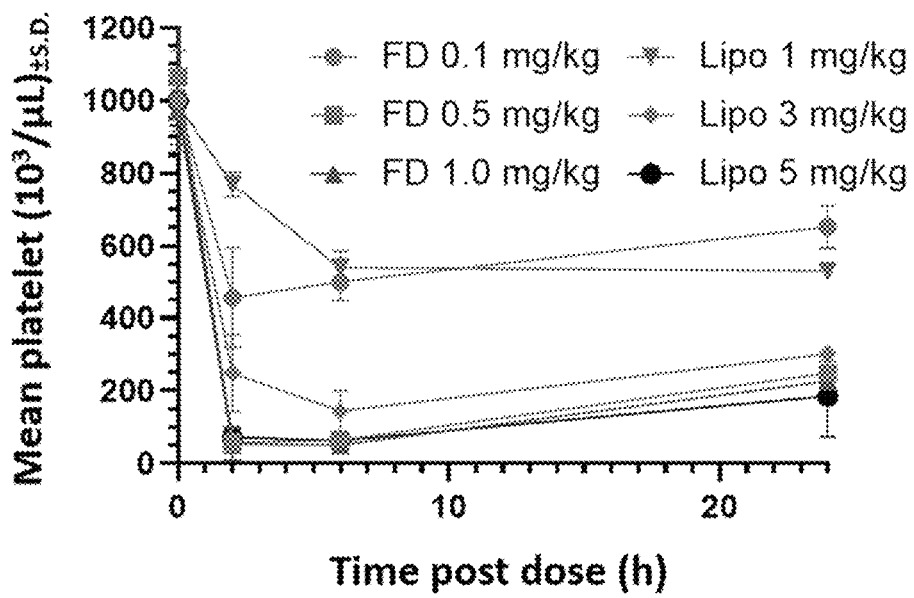
FIG. 3A compares the evolution of the mean platelet count over time following administration of various doses of free drug or various doses of the liposomal formulation comprising Compound 9 encapsulated in the internal medium of the liposomes.

FIG. 3A compares the evolution of the mean platelet count over time following administration of various doses of free drug or various doses of the liposomal formulation comprising Compound 9 encapsulated in the internal medium of the liposomes.

Figure 3B:
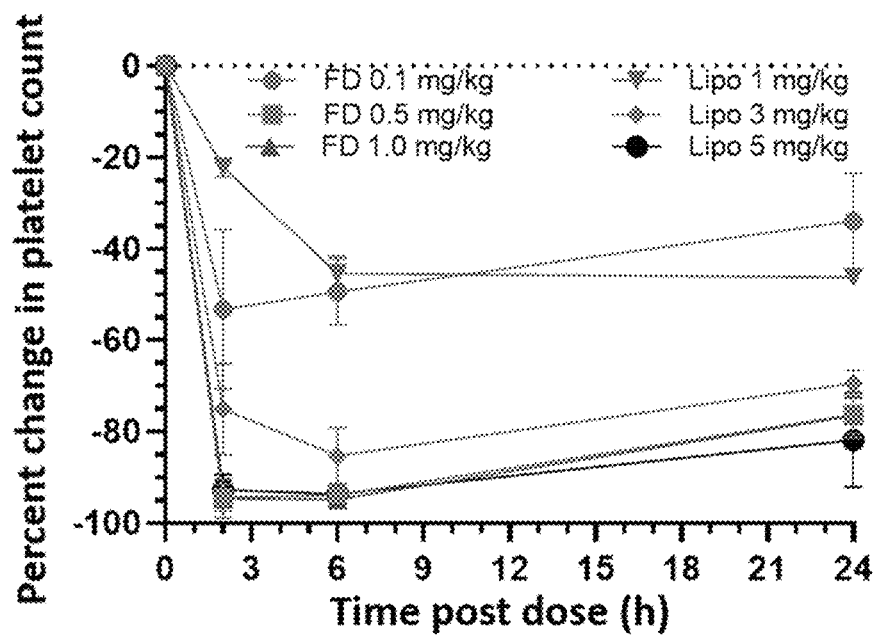
FIG. 3B compares the normalized change in platelet count over time following administration of various doses of free drug or various doses of the liposomal formulation comprising Compound 9 encapsulated in the internal medium of the liposomes.

FIG. 3B compares the normalized change in platelet count over time following administration of various doses of free drug or various doses of the liposomal formulation comprising Compound 9 encapsulated in the internal medium of the liposomes.

Figure 4A:
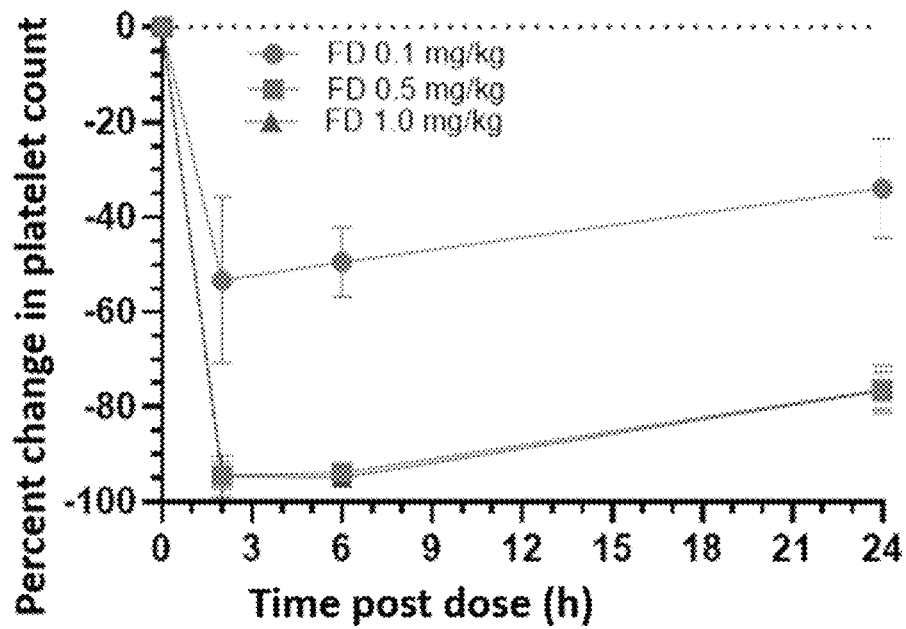
FIG. 4A compares the normalized change in platelet count over time following administration of various doses of free Compound 9.

FIG. 4A compares the normalized change in platelet count over time following administration of various doses of free Compound 9.

Figure 4B:
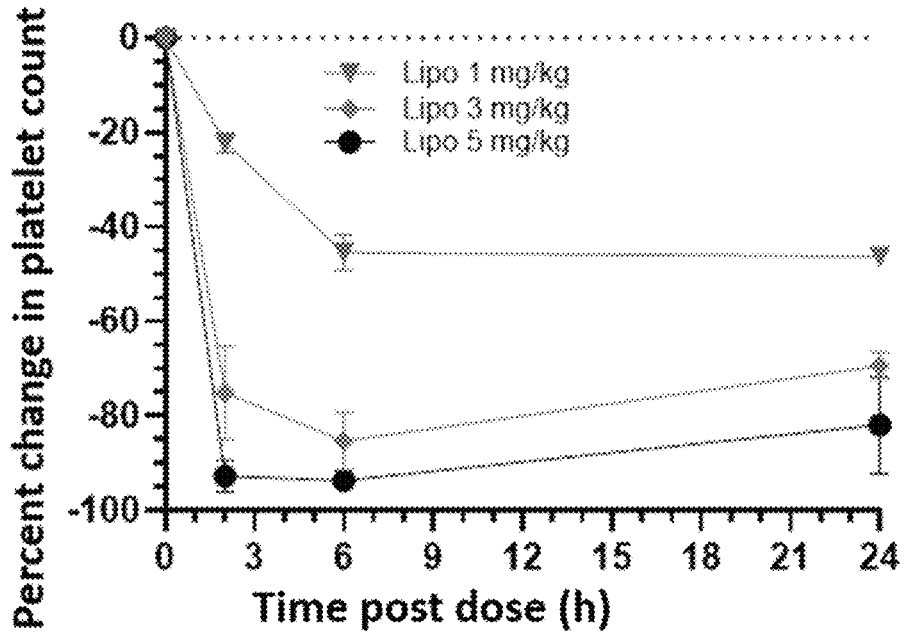
FIG. 4B compares the normalized change in platelet count over time following administration of various doses of a liposomal formulation comprising Compound 9 encapsulated in the internal medium of the liposomes.

FIG. 4B compares the normalized change in platelet count over time following administration of various doses of a liposomal formulation comprising Compound 9 encapsulated in the internal medium of the liposomes.

Example 8. Effect of Liposome Composition on Drug Retention Experimental Design

Liposomes comprising DHSM:Cholesterol:PEG 53:45:2 (0.1 drug:lipid ratio) were generated using the methods described above with DMSO loading aid and showed greater than 90% encapsulation efficiency. Liposomes DSPC:Cholesterol:PEG 57:38:5.6 (0.1 drug:lipid ratio) were also made using the methods described above with DMSO loading aid and showed greater than 90% encapsulation efficiency. Pharmacokinetic and drug retention studies were performed as previously described. DHSM:dihydrosphingomyelin; PEG: 1,2-distearoyl-rac-glycero-3-methoxypoly(ethylene glycol-2000) (also known as DSG-PEG2000 and PEG(2000)-distearoylglycerol)

Figure 5A:
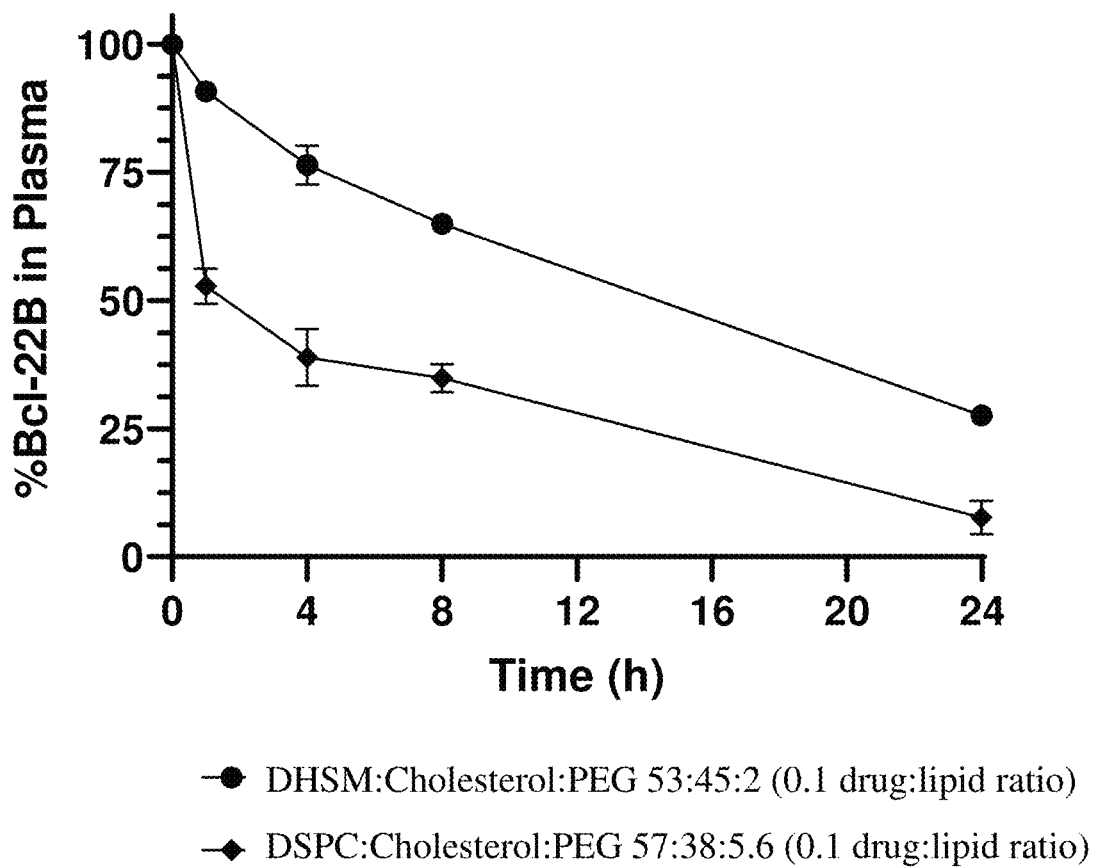
FIG. 5A shows the evolution of normalized plasma concentration of Compound 9 (Bcl-22B) over time using various liposomal formulations.

FIG. 5A shows the evolution of normalized plasma concentration of Compound 9 (Bcl-22B) over time using various liposomal formulations.

Figure 5B:
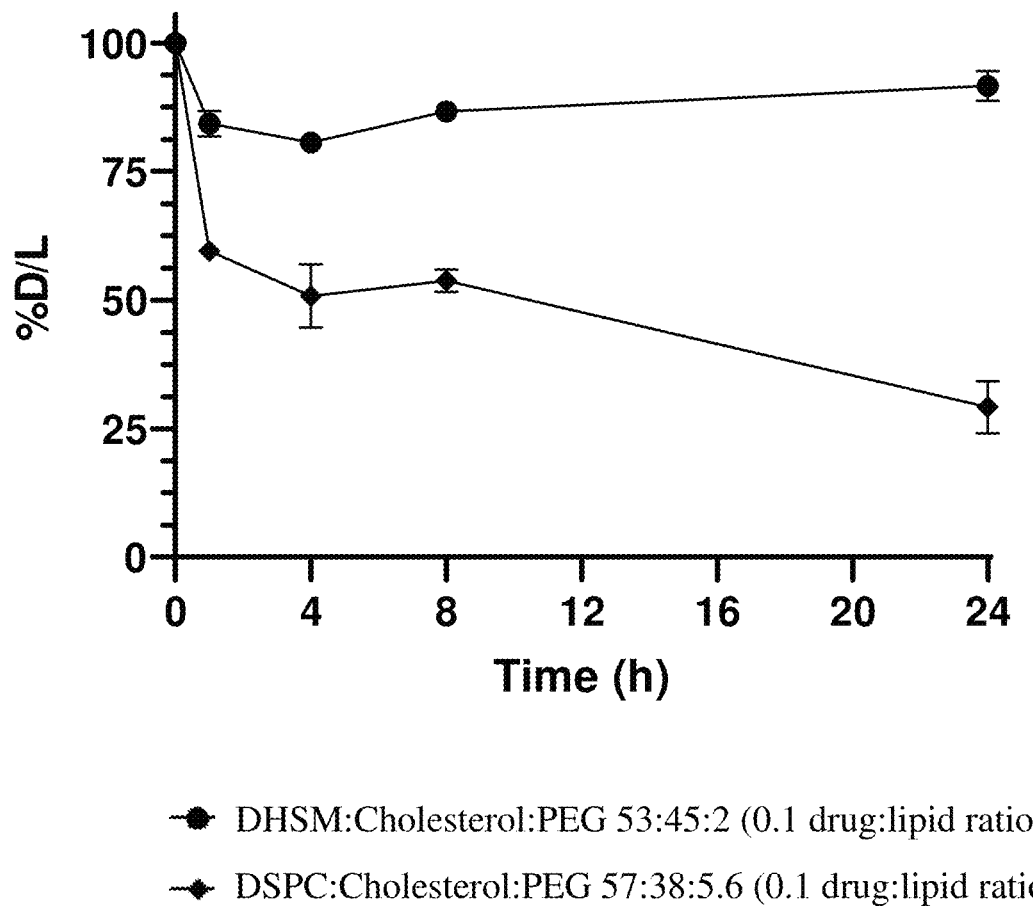
FIG. 5B shows the evolution of the drug-to-lipid ratio of Compound 9 (Bcl-22B) over time using various liposomal formulations.

FIG. 5B shows the evolution of the drug-to-lipid ratio of Compound 9 (Bcl-22B) over time using various liposomal formulations.

Example 9. Effect of Liposomal PEG on Thrombocytopenia

Various liposomes were made using methods similar to previously described. Different liposome compositions comprise: DSPC/Chol/beta-sitosterol/5.6% PEG-DSG; DSPC/Chol/2% PEG-DMG, DSPC/Chol/5.6% PEG-DSG, EPC/Chol/5.6% PEG-DSG and DSPC/Chol/5.6% PEG-DSG/TEASOS. Compound 9 was loaded into these liposomes as previously described.

Figure 6A:
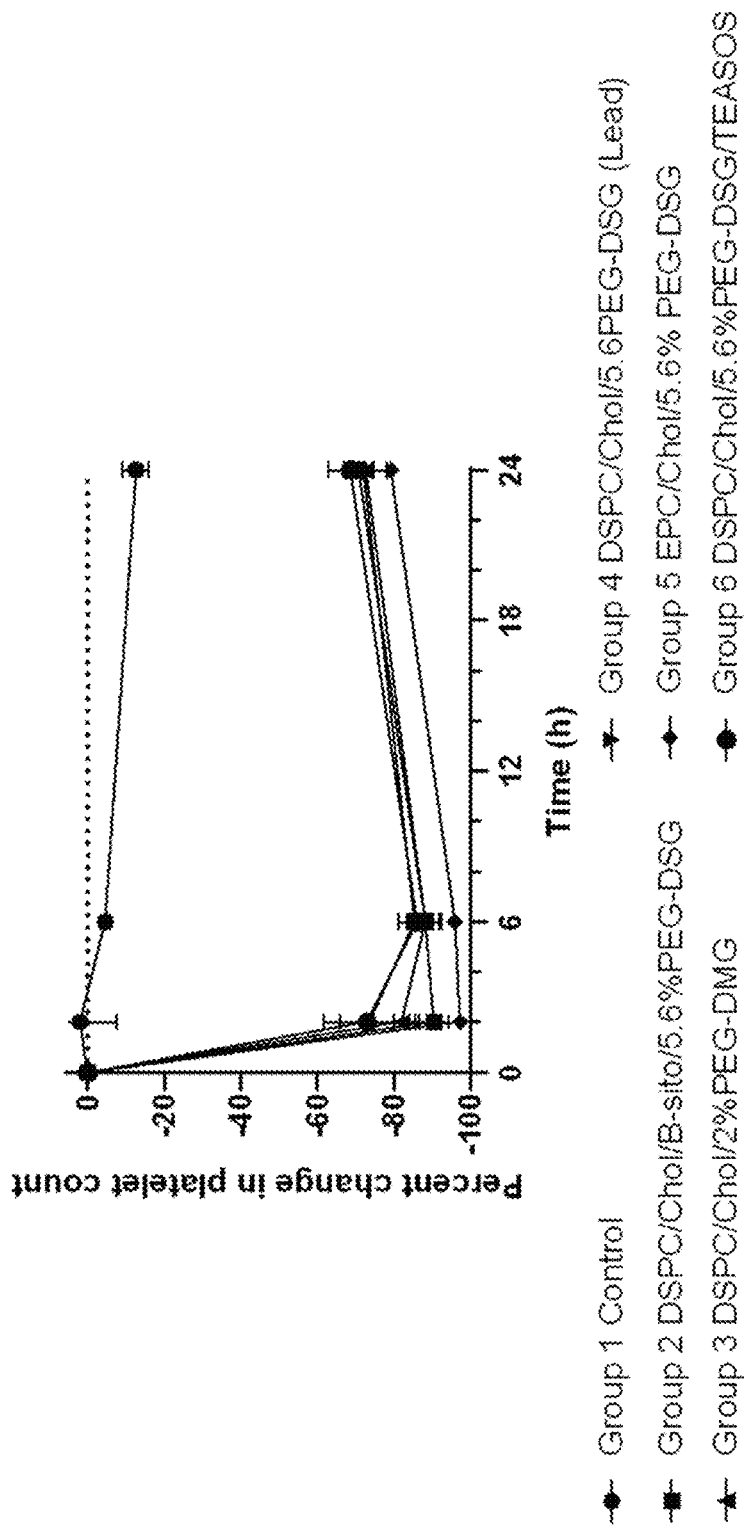
FIG. 6A compares the normalized change in platelet count over time following administration of liposomal formulations comprising Compound 9 encapsulated in the internal medium of liposomes of different lipid compositions.

FIG. 6A compares the normalized change in platelet count over time following administration of liposomal formulations comprising Compound 9 encapsulated in the internal medium of liposomes of different lipid compositions.

Figure 6B:
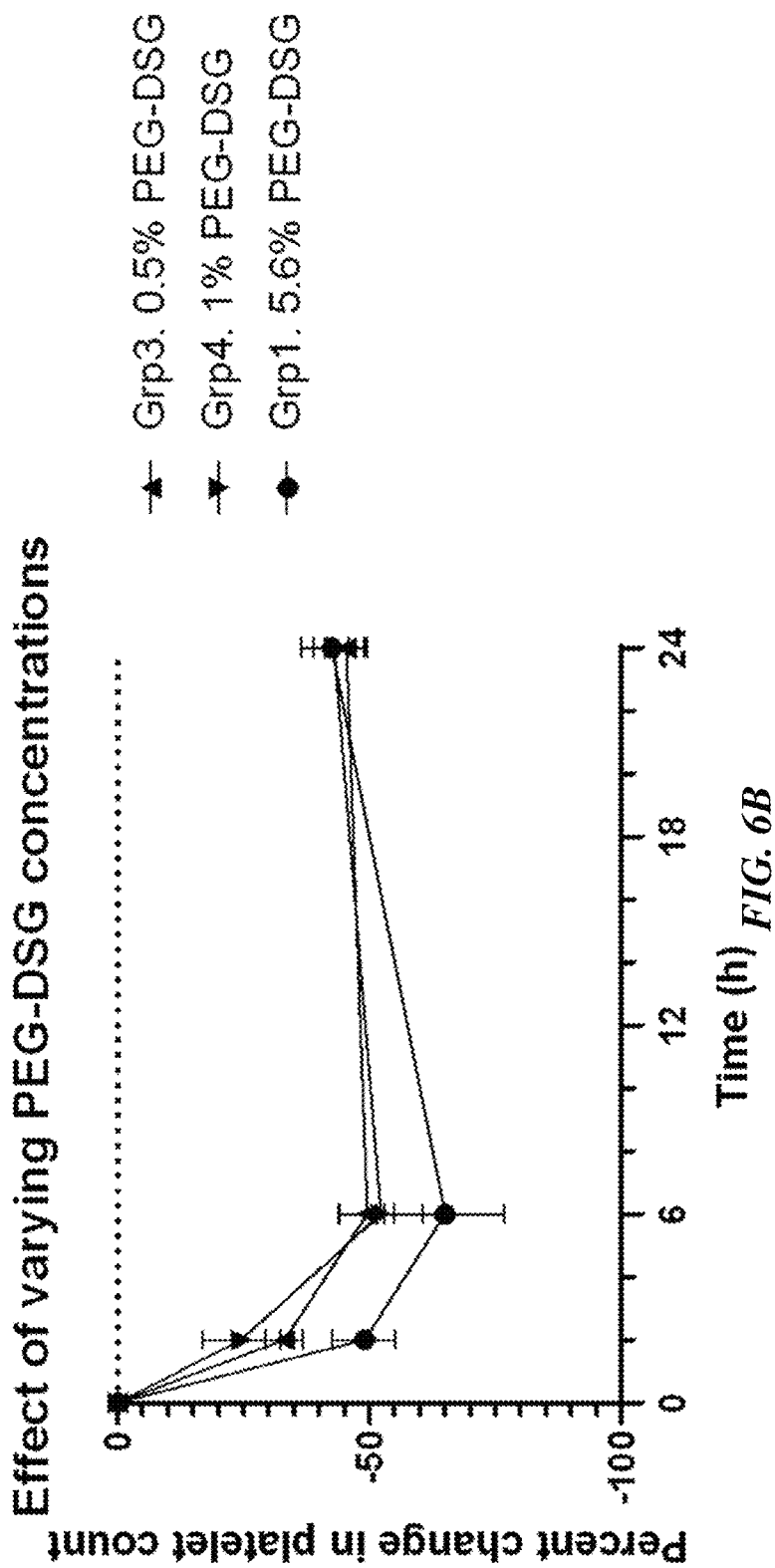
FIG. 6B compares the normalized change in platelet count over time following administration of liposomal formulations comprising Compound 9 encapsulated in the internal medium of liposomes containing various amounts of PEG-DSG.

As shown in FIG. 6B, lowering the amount of PEG-DSG in the liposomes results in decreased platelet count reduction.

Figure 6C:
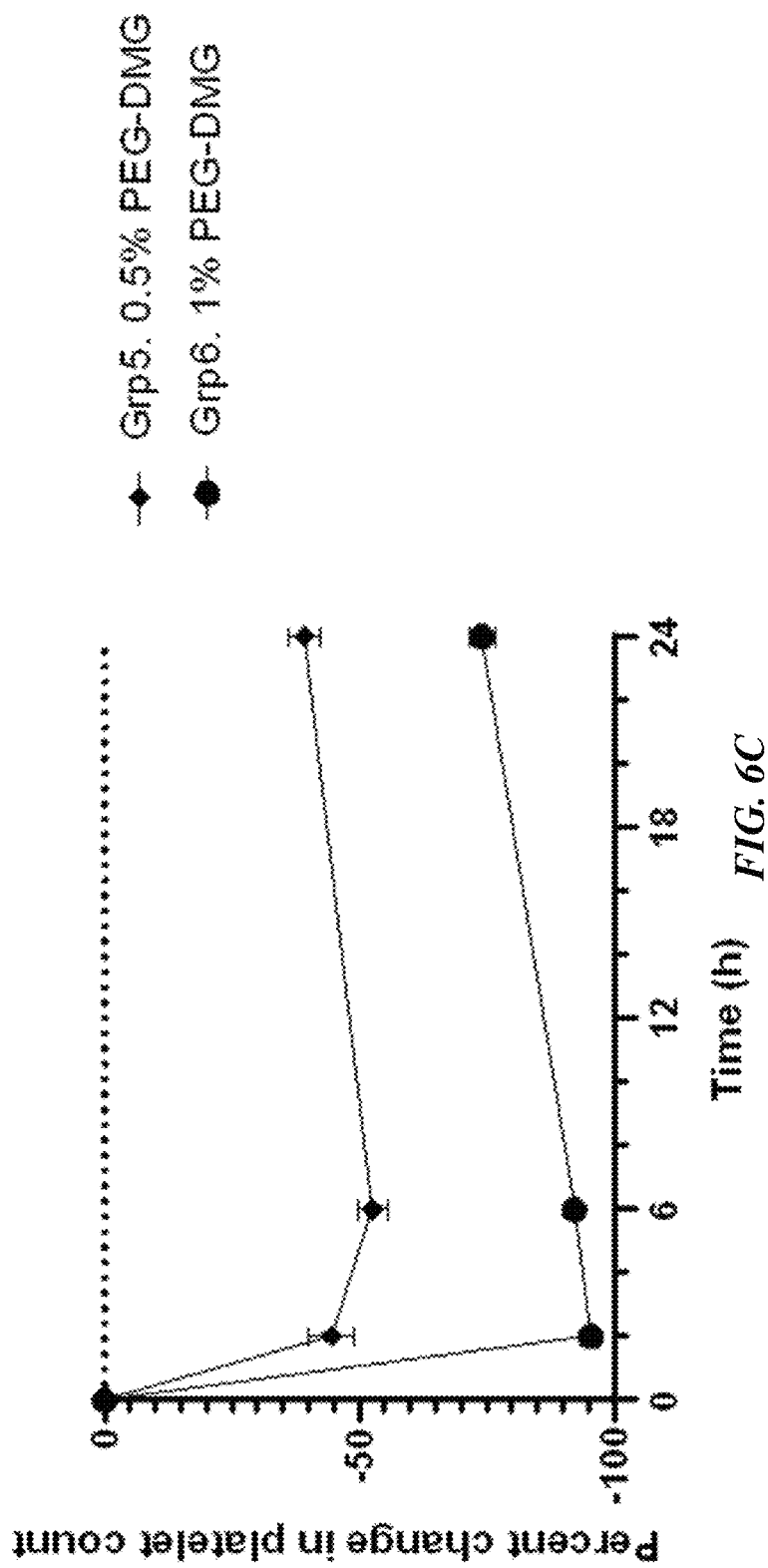
FIG. 6C compares the normalized change in platelet count over time following administration of liposomal formulations comprising Compound 9 encapsulated in the internal medium of liposomes containing various amounts of PEG-DMG.

As shown in FIG. 6C, lowering the amount of PEG-DMG in the liposomes significantly decreased platelet count reduction.

Figure 6D:
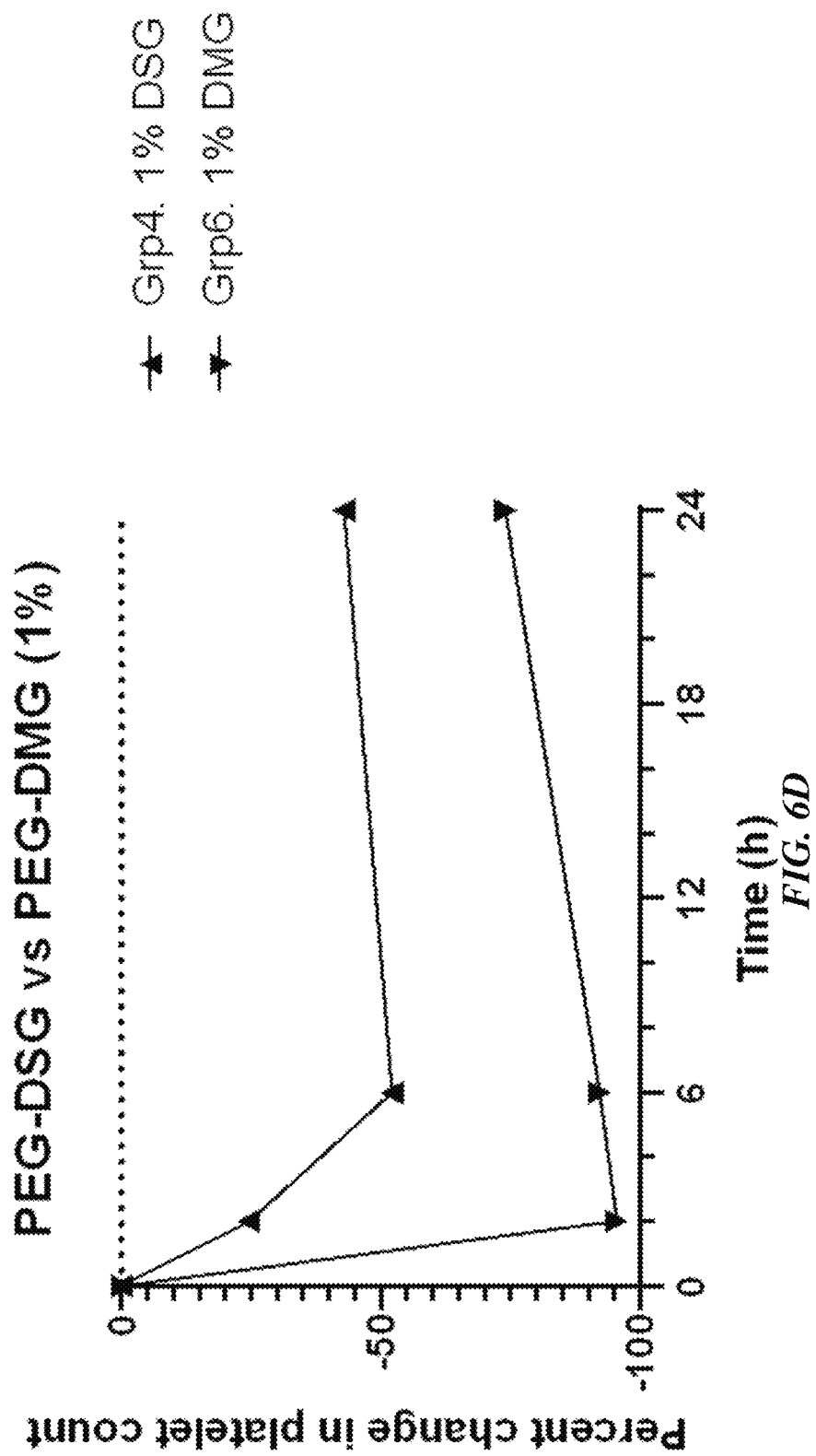
FIG. 6D compares the normalized change in platelet count over time following administration of liposomal formulations comprising Compound 9 encapsulated in the internal medium of liposomes containing 1% PEG-DMG or 1% PEG-DSG.

The graph in FIG. 6D shows that liposomes containing 1% PEG-DMG resulted a greater amount of platelet reduction than liposomes containing 1% PEG-DSG.

Figure 6E:
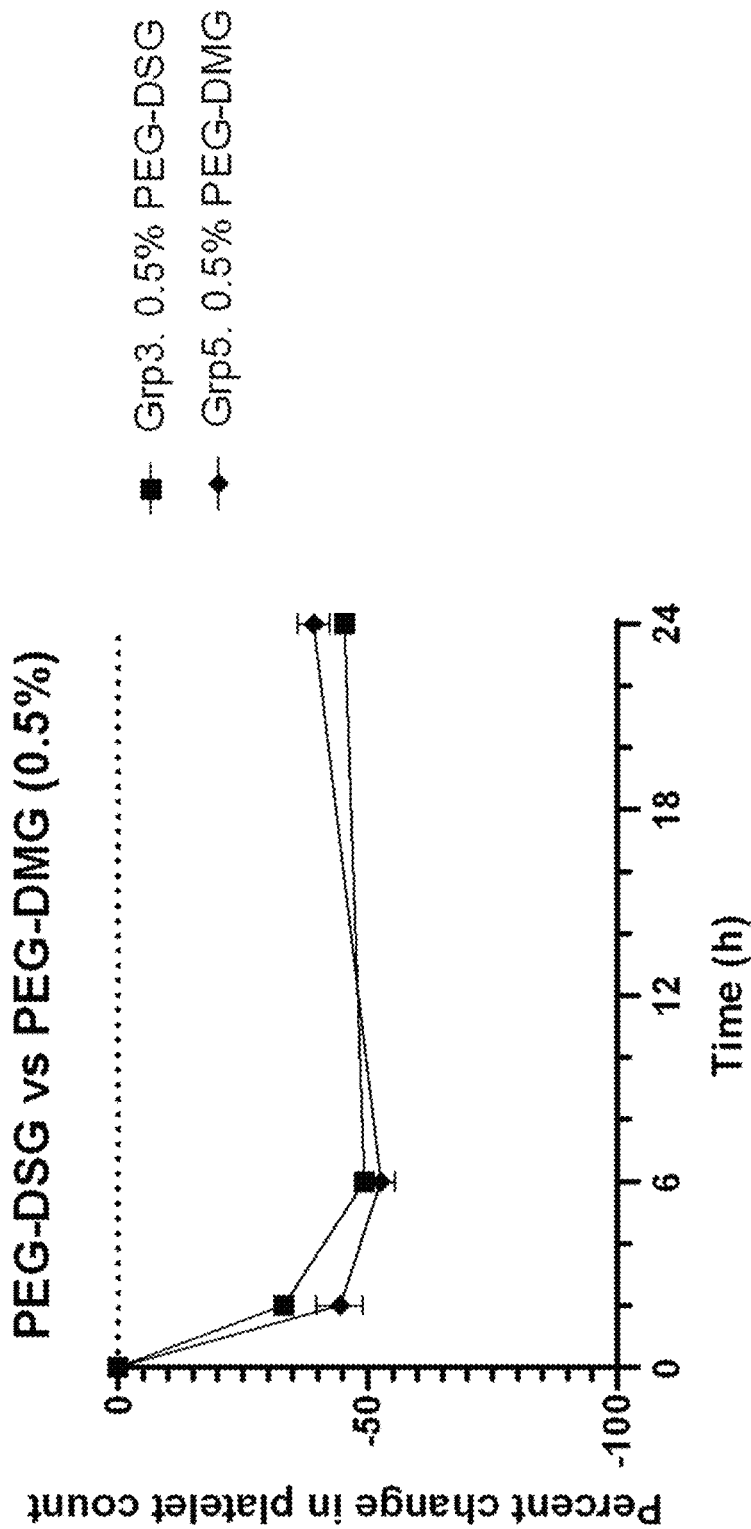
FIG. 6E compares the normalized change in platelet count over time following administration of liposomal formulations comprising Compound 9 encapsulated in the internal medium of liposomes containing 0.5% PEG-DSG or 0.5% PEG-DMG.

The graph in FIG. 6E shows that liposomes containing 0.5% PEG-DSG and liposomes containing 0.5% PEG-DMG resulted in similar platelet reduction.

Figure 7A:
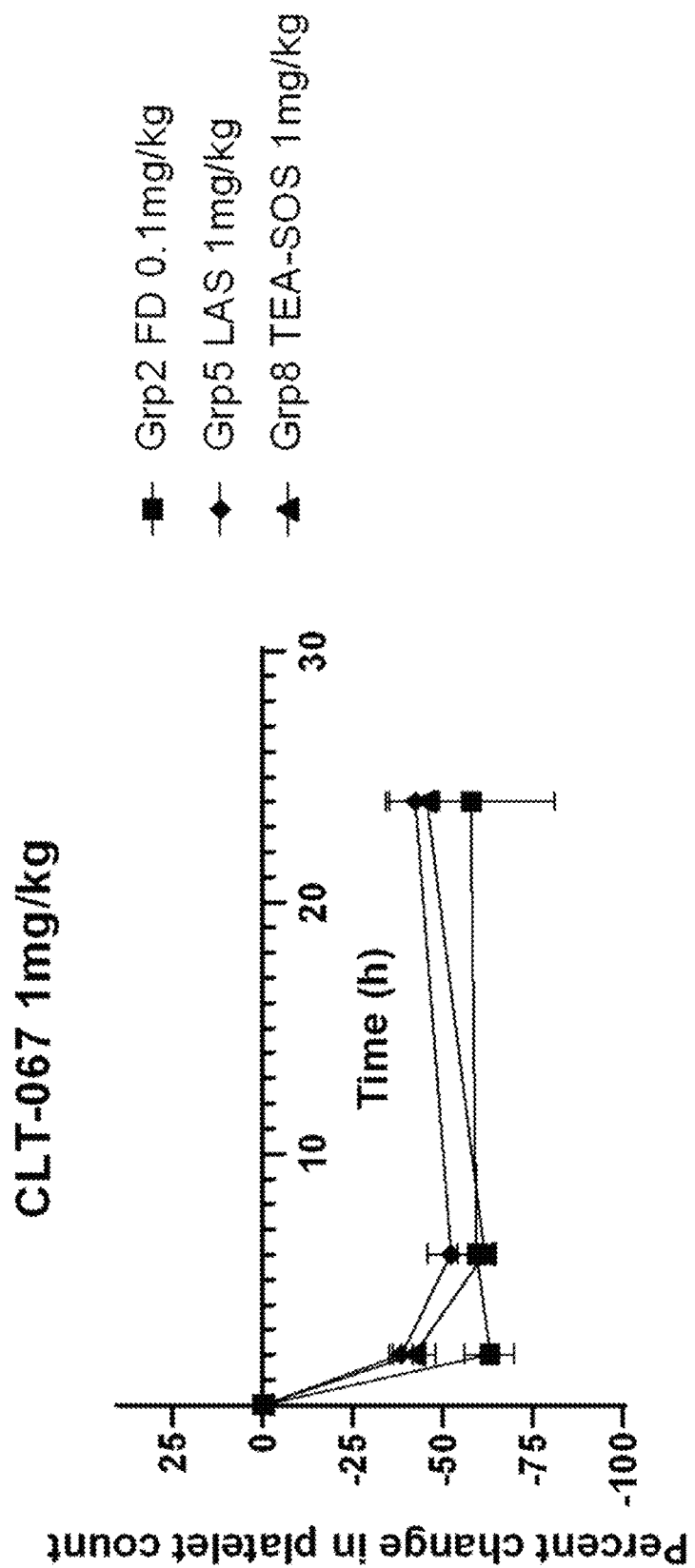
FIG. 7A compares the normalized change in platelet count over time following administration of liposomal formulations comprising Compound 9 encapsulated in the internal medium of liposomes containing low-dose ammonium sulfate (LAS) or triethylammonium sucrose octasulfate (TEA-SOS) dosed at 1 mg/kg, or of 0.1 mg/kg free drug.

Example 10. Comparison of Free vs. Liposomal BCL Inhibitors on Platelet Protection Liposomes were generated using various loading aids including low-dose ammonium sulfate (LAS) and triethylammonium sucrose octasulfate (TEA-SOS) and loaded with Compound 2 (11B), Compound 7 (11 G), or Compound 9 (22B). Platelet protection studies were run to compare the effects of these liposomal formulations against the corresponding free drug (FD). In FIGS. 7A-7G, the following As shown in FIG. 7A, liposomal formulations comprising Compound 9 encapsulated in the internal medium of liposomes containing low-dose ammonium sulfate (LAS) or triethylammonium sucrose octasulfate (TEA-SOS) dosed at 1 mg/kg provided greater than ten times the amount of platelet protection when compared to 0.1 mg/kg free drug (FD).

Figure 7B:
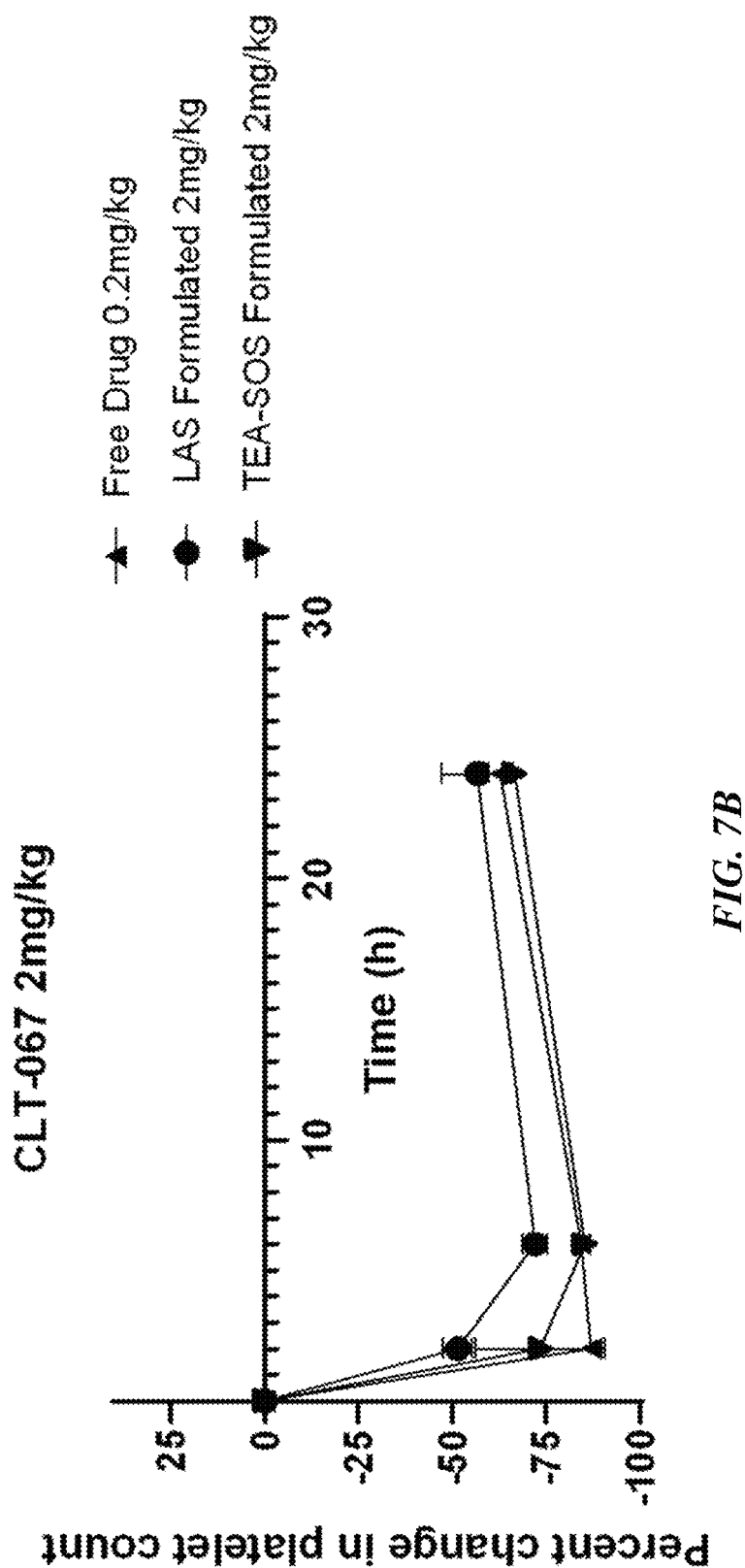
FIG. 7B compares the normalized change in platelet count over time following administration of liposomal formulations comprising Compound 9 encapsulated in the internal medium of liposomes containing low-dose ammonium sulfate (LAS) or triethylammonium sucrose octasulfate (TEA-SOS) dosed at 2 mg/kg, or of 0.2 mg/kg free drug.

As shown in FIG. 7B, liposomal formulations comprising Compound 9 encapsulated in the internal medium of liposomes containing low-dose ammonium sulfate (LAS) or triethylammonium sucrose octasulfate (TEA-SOS) dosed at 2 mg/kg provided greater than ten times the amount of platelet protection when compared to 0.2 mg/kg free drug (FD).

Figure 7C:
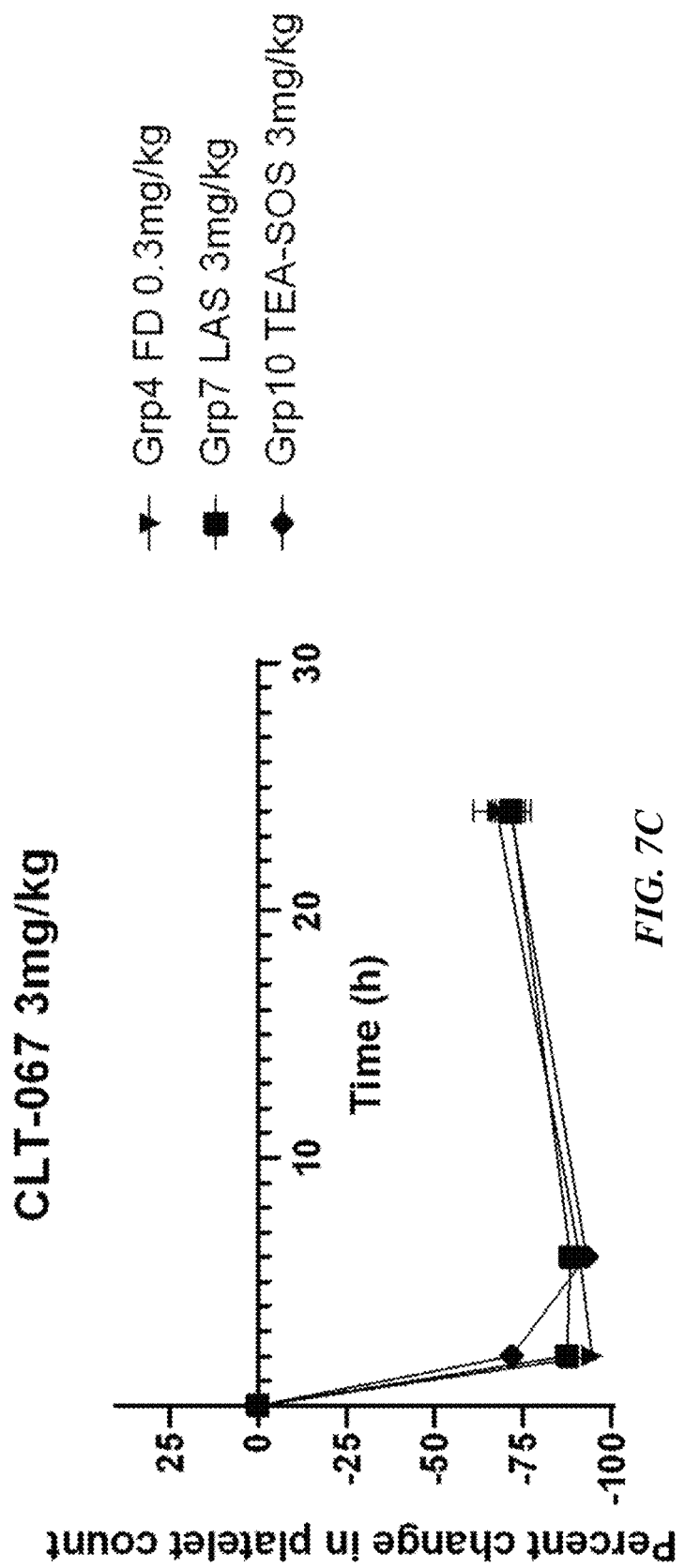
FIG. 7C compares the normalized change in platelet count over time following administration of liposomal formulations comprising Compound 9 encapsulated in the internal medium of liposomes containing low-dose ammonium sulfate (LAS) or triethylammonium sucrose octasulfate (TEA-SOS) dosed at 3 mg/kg, or of 0.3 mg/kg free drug.

As shown in FIG. 7C, liposomal formulations comprising Compound 9 encapsulated in the internal medium of liposomes containing low-dose ammonium sulfate (LAS) or triethylammonium sucrose octasulfate (TEA-SOS) dosed at 3 mg/kg provided greater than ten times the amount of platelet protection when compared to 0.3 mg/kg free drug.

Figure 7D:
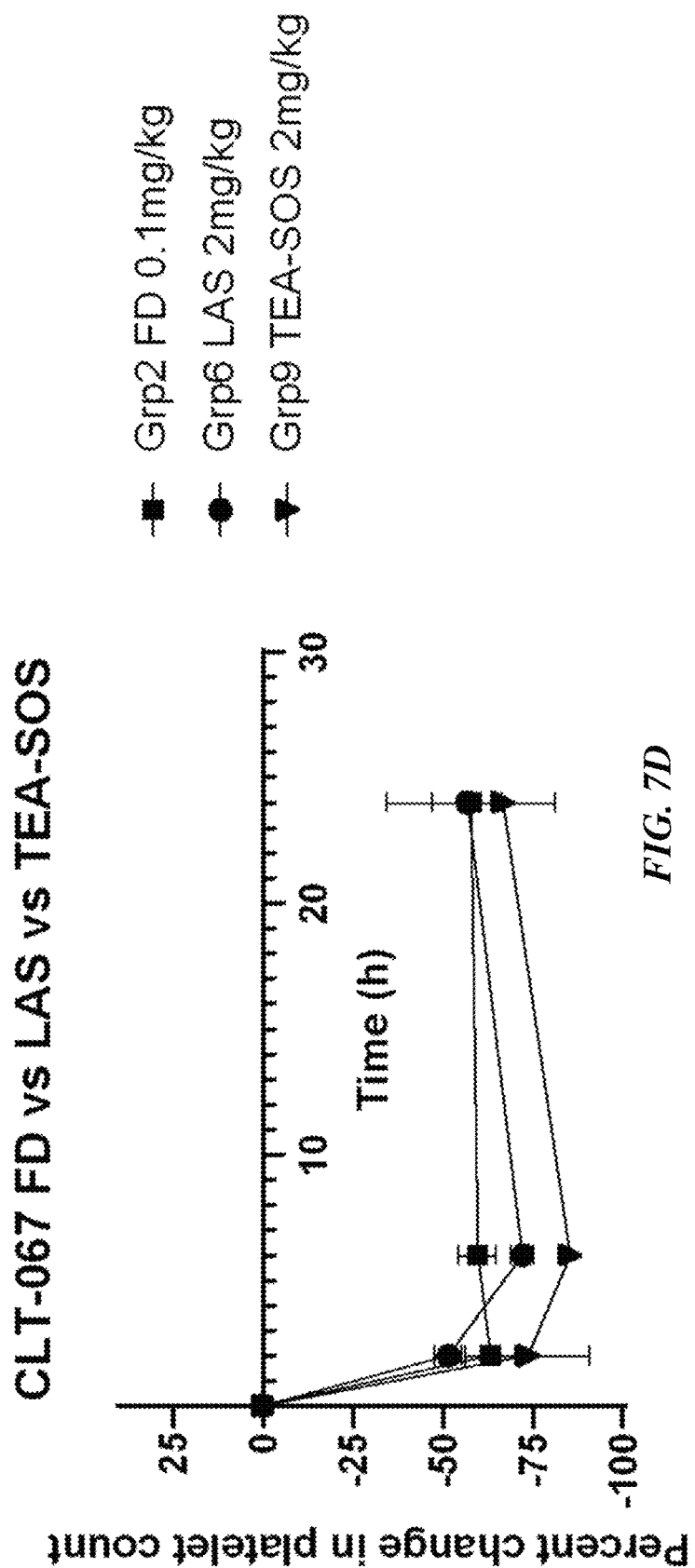
FIG. 7D compares the normalized change in platelet count over time following administration of liposomal formulations comprising Compound 9 encapsulated in the internal medium of liposomes containing low-dose ammonium sulfate (LAS) or triethylammonium sucrose octasulfate (TEA-SOS) dosed at 2 mg/kg, or of 0.1 mg/kg free drug.

As shown in FIG. 7D, liposomal formulations comprising Compound 9 encapsulated in the internal medium of liposomes containing low-dose ammonium sulfate (LAS) or triethylammonium sucrose octasulfate (TEA-SOS) exhibited approximately twenty times more platelet protection when compared to free drug.

Figure 7E:
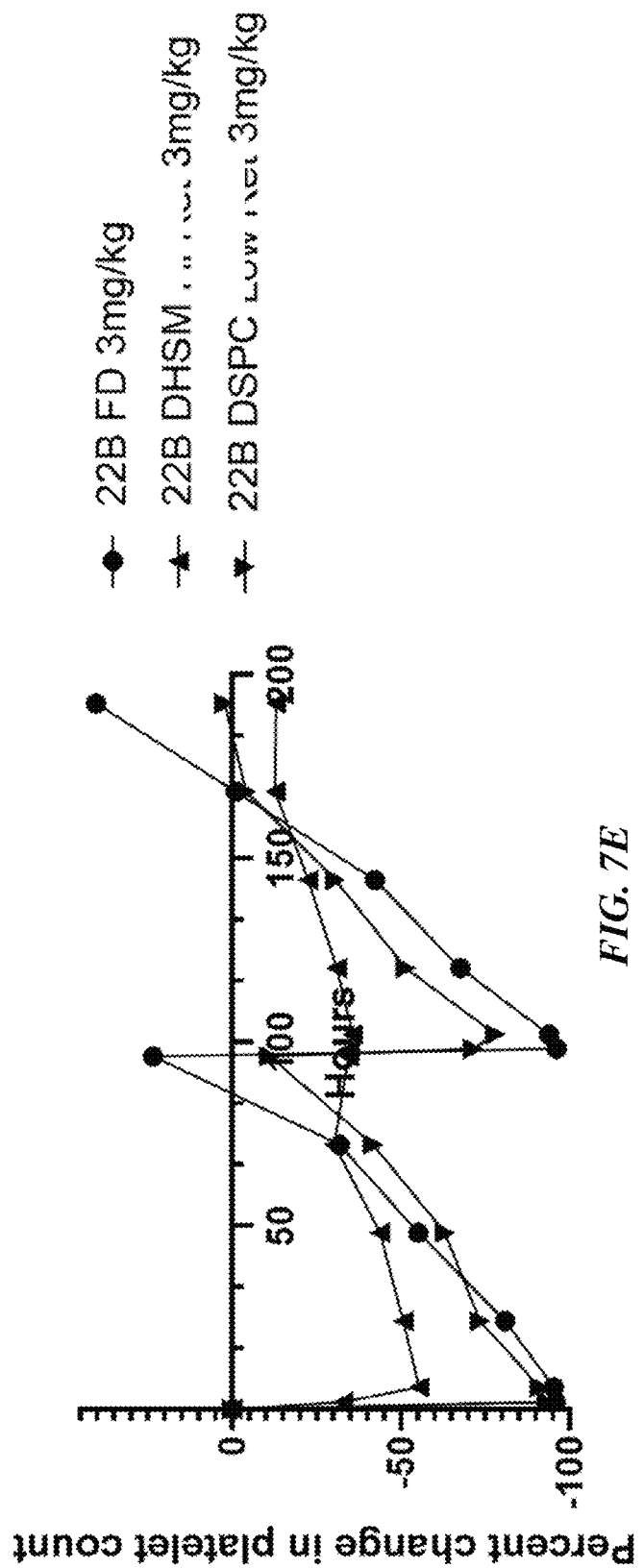
FIG. 7E compares the normalized change in platelet count over time following administration of liposomes comprising DHSM:Cholesterol:PEG 53:45:2 and Compound 9 ("22B") (0.1 drug:lipid ratio) dosed at 3 mg/kg, liposomes comprising DSPC:Cholesterol:PEG 57:38:5.6 and Compound 9 ("22B") (0.1 drug:lipid ratio) dosed at 3 mg/kg, or free drug dosed at 3 mg/kg.
Figure 7F:
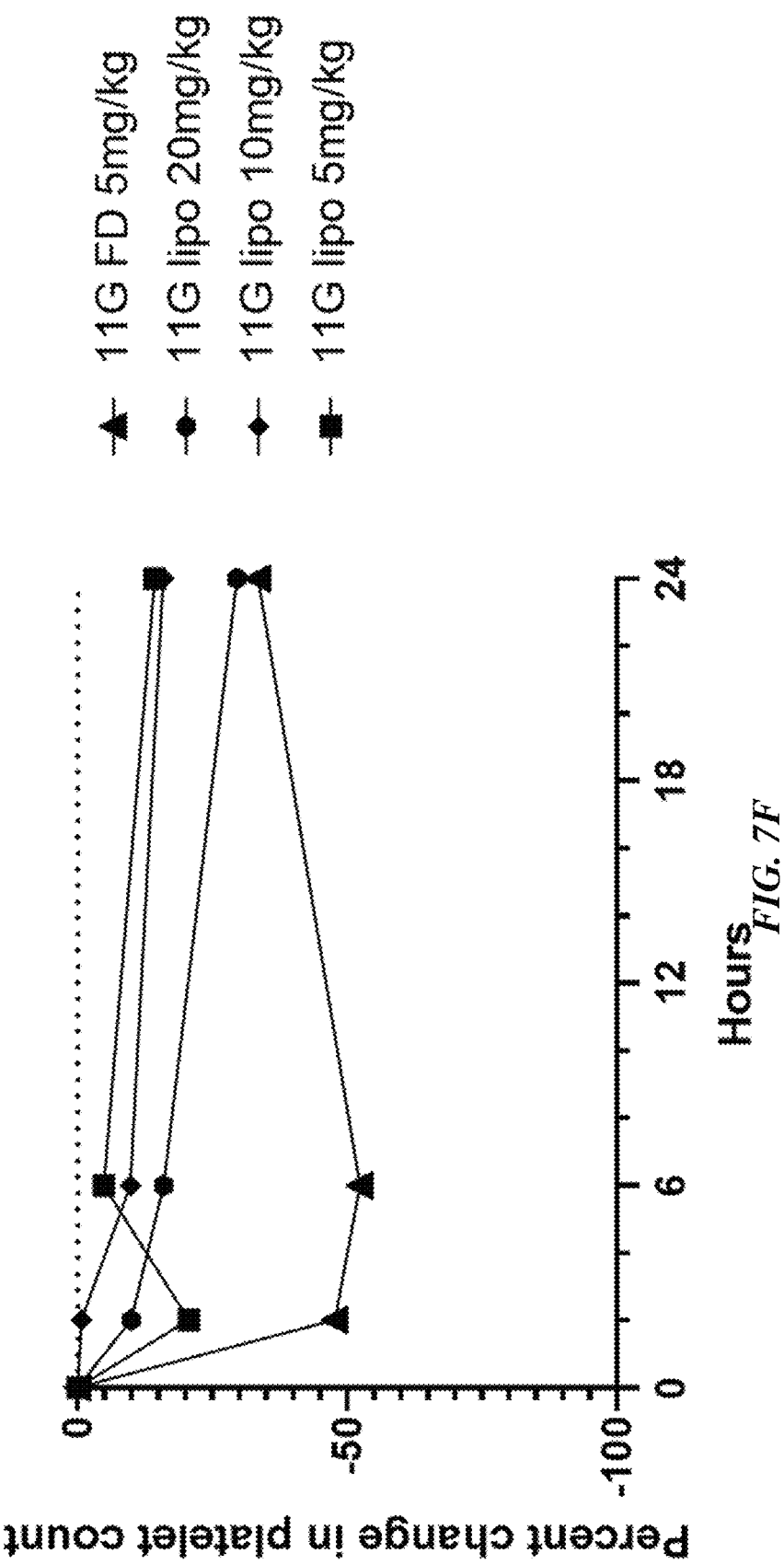
FIG. 7F compares the normalized change in platelet count over time following administration of liposomal formulations comprising Compound 7 encapsulated in the internal medium of liposomes dosed at various doses or of the free drug.

The graph in FIG. 7E shows that liposomes comprising DHSM:Cholesterol:PEG 53:45:2 and Compound 9 ("22B") (0.1 drug:lipid ratio) dosed at 3 mg/kg demonstrate good platelet protection compared to liposomes comprising DSPC:Cholesterol:PEG 57:38:5.6 and Compound 9 ("22B") (0.1 drug:lipid ratio) dosed at 3 mg/kg FIG. 7F shows Compound 7 is well tolerated at the tested doses.

Figure 7G:
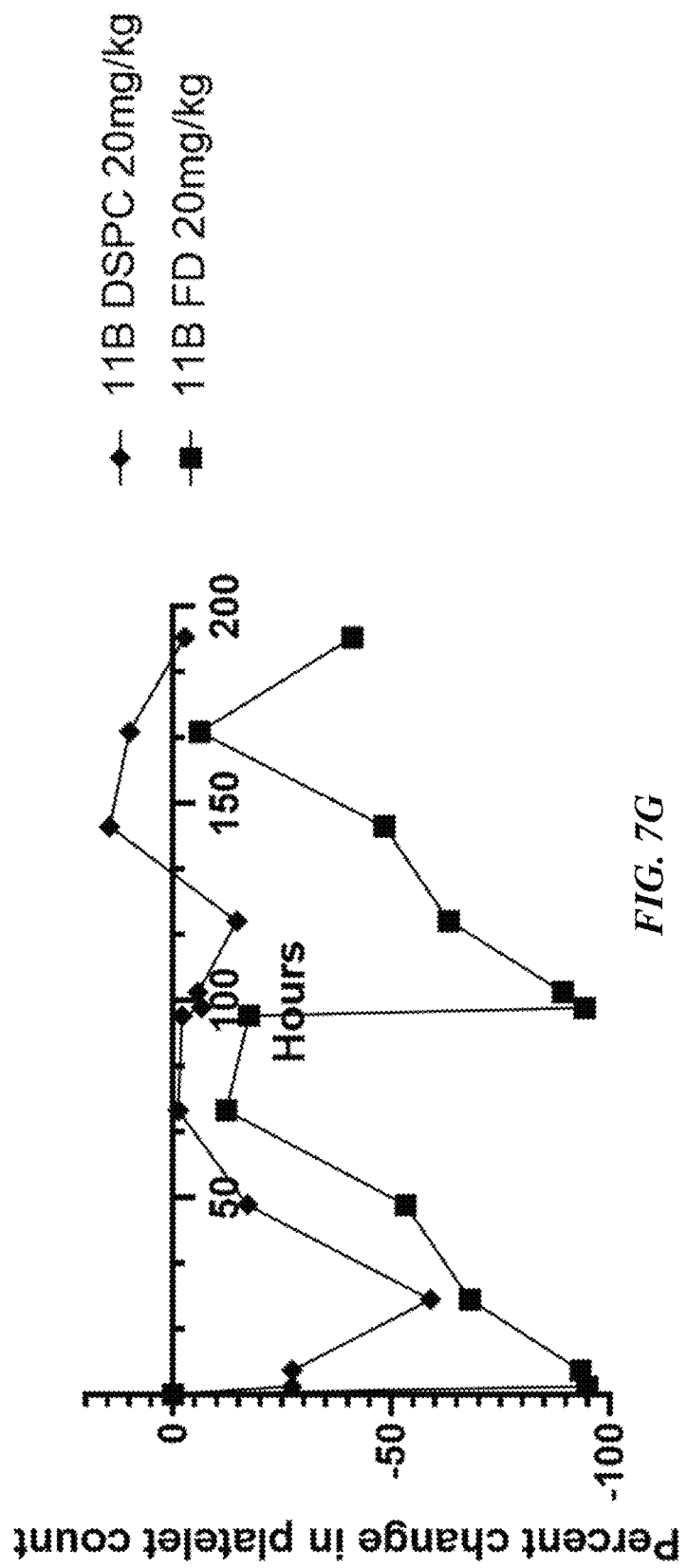
FIG. 7G compares the normalized change in platelet count over time following administration of liposomal formulations comprising Compound 2 encapsulated in the internal medium of liposomes containing DSPC, or of the free drug.

FIG. 7G shows that liposomal formulations comprising Compound 2 encapsulated in the internal medium of liposomes containing DSPCdemonstrate good platelet protection.

Example 11. Effect of Acid Wash Purification on the Plasma Stability of Compound 7 Liposome Formulations Plasma stability was determined by measuring the concentration of Compound 7 at various time points in plasma collected as described in Example 4. Both liposome formulations comprised DSPC/Cholesterol/PEGylated (59/39/2 mol %) as described in Examples 1A and 1B. The loading aid was 500 mM AS, and the D/L ratio was 0.4 for both liposome formulations.

The Acid Wash formulation was purified according to the procedure generally described in Example 1A and 1B, with the specific parameters described herein. Purification of the formulation was carried using tangential flow filtration (Slice 200, Sartorius) equipped with 100-300 k MWCO (Hydrosart, Sartorius) PES membranes. The formulation was first concentrated to 50 mL, then purified with 12 volume exchanges of 10 mM methanesulfonic acid in a 5 wt % aqueous dextrose solution. Thereafter, the formulation was purified with another 12 volume exchanges of 5% dextrose. Finally, the formulation was concentrated to 10-20 mg/ml lipids, collected and filtered through a 0.22 μm PES syringe filter.

The No Acid Wash formulation was purified using tangential flow filtration (Slice 200, Sartorius) equipped with 100-300 k MWCO (Hydrosart, Sartorius) PES membranes. The formulation was first concentrated to 50 mL, then purified with 12 volume exchanges of 5% dextrose, concentrated to 10-20 mg/ml lipids, collected and filtered through a 0.22 μm PES syringe filter.

Figure 8:
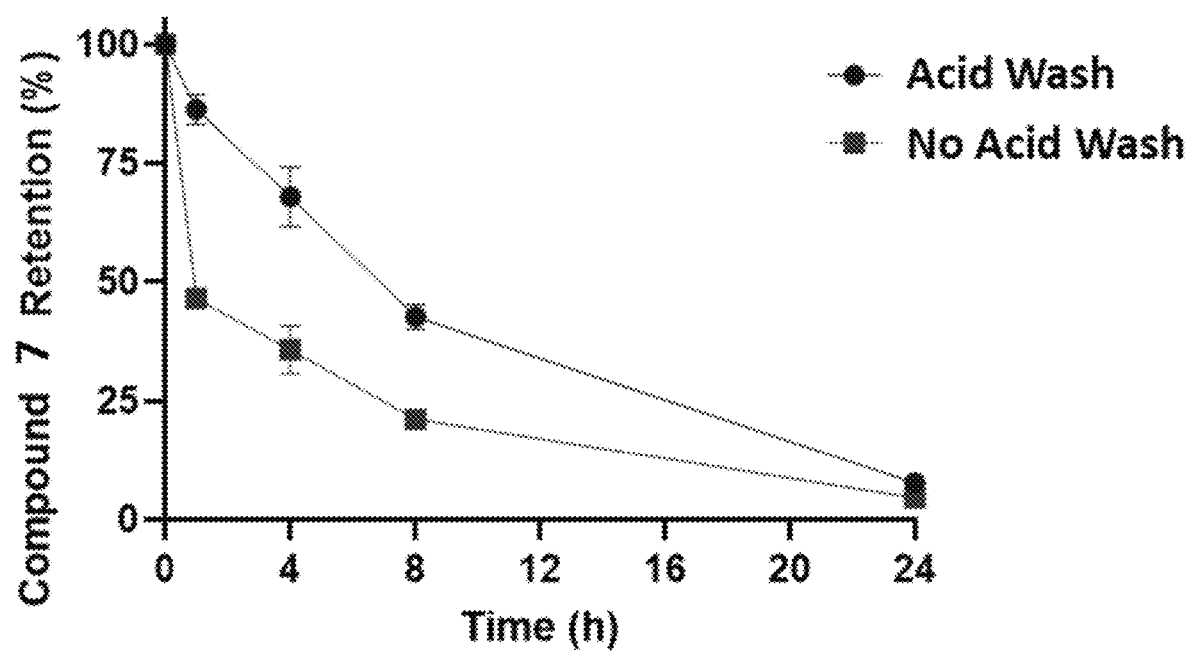
FIG. 8 shows the evolution of normalized plasma concentration of Compound 7 over time using an exemplary liposomal formulation of the present disclosure prepared with or without an acid wash step.

FIG. 8 shows the evolution of normalized plasma concentration of Compound 7 over time using an exemplary liposomal formulation of the present disclosure prepared with or without an acid wash step. FIG. 8 shows that liposomes in which there was an acid wash purification step exhibit superior pharmacokinetic properties (e.g., slower release of Compound 7) to those of liposomes in which there was no acid wash purification step. As shown in FIG. 8, liposomes in which there was no acid wash purification step resulted in a burst release of drug as seen by greater than 50% drug loss at the first time period. In contrast, those liposomes that had been pre-washed with acid exhibited the desired extended drug release over time.

The invention claimed is:
1. A liposomal pharmaceutical composition comprising:
   (a) liposomes comprising a lipid bilayer comprising distearoyl phosphatidyl choline (DSPC), 1,2-distearoyl-rac-glycero-3-methoxypoly(ethylene glycol-2000) (DSG-PEG2000), and cholesterol defining an internal compartment of the liposome,
   wherein the internal compartment comprises an ammonium sulfate (AS) first loading aid, a first solvent, and an additional solvent, and a Bcl inhibitor having the structure:

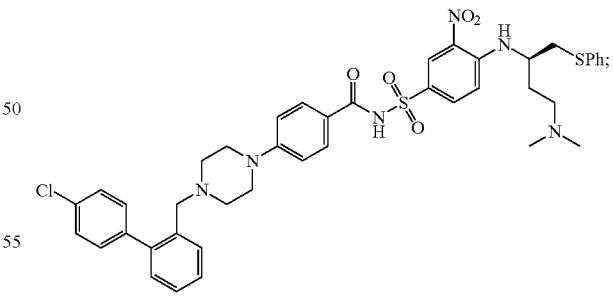

and
   wherein the liposomes are prepared by a method comprising:
   following encapsulation of the Bcl inhibitor in the internal compartment of the liposomes, purifying the liposomes with an acidified dextrose solution; and
   (b) a delivery vehicle which excludes albumin.

2. The liposomal pharmaceutical composition of claim 1, wherein the first solvent is an aqueous solvent.

3. The liposomal pharmaceutical composition of claim 1, wherein the additional solvent is dimethylsulfoxide (DMSO).

4. The liposomal pharmaceutical composition of claim 1, wherein the internal compartment further comprises a second loading aid, wherein the second loading aid is a member selected from ammonium sucrose octasulfate (NH4SOS), potassium sucrose octasulfate (KSOS), triethylammonium sucrose octasulfate (TEASOS), and sodium citrate.

5. The liposomal pharmaceutical composition of claim 1, further comprising an additional therapeutic agent external to the liposomes in the pharmaceutically acceptable carrier.

6. The liposomal pharmaceutical composition of claim 5, wherein the additional therapeutic agent is selected from an alkylating agent, an anti-angiogenic agent, an antimetabolite, an apoptosis inducing agent, a cell cycle inhibitor, a cell cycle control inhibitor, a checkpoint inhibitor, a cyclin-dependent kinase inhibitor, a cytotoxic agent, a DNA damaging agent, a DNA repair inhibitor, a mitochondrial poison, a receptor tyrosine kinase inhibitor, a telomerase inhibitor, a signal transduction inhibitor, a transcription inhibitor, a Bcl inhibitor, a PARP inhibitor, a PI3K inhibitor, an HSP90 inhibitor, a JAK inhibitor, an ATR inhibitor, an HDAC inhibitor, a tyrosine kinase inhibitor, a BTK inhibitor, an alkylating agent, an SMO inhibitor, an antitubulin agent, an MEK inhibitor, a topoisomerase inhibitor, a RAF inhibitor, a BRAF inhibitor, or a proteasome inhibitor.

7. The liposomal pharmaceutical composition of claim 1, wherein the liposome has a mean diameter between about 50 nm and about 150 nm.

8. The liposomal pharmaceutical composition of claim 1, further comprising a carrier medium in which the liposomes are suspended.

9. The liposomal pharmaceutical composition of claim 8, wherein the carrier medium is an aqueous dextrose solution.

10. The liposomal pharmaceutical composition of claim 7, wherein the liposomal pharmaceutical composition has a polydispersity index (PDI) between about 0.001 and 0.5.

11. The liposomal pharmaceutical composition of claim 1, wherein the purifying comprises tangential flow filtration.

12. The liposomal pharmaceutical composition of claim 1, wherein the acidified dextrose solution is acidified with hydrochloric acid or methanesulfonic acid at a concentration of 0.01 M.

13. The liposomal pharmaceutical composition of claim 1, wherein the acidified dextrose solution comprises 5% dextrose.

14. A method for delivering a Bcl inhibitor to a subject comprising administering to a subject the liposomal pharmaceutical composition of claim 1.

15. A method for treating a hyperproliferative disorder in a subject in need thereof, the method comprising administering to a subject in need thereof a therapeutically effective amount of the liposomal pharmaceutical composition of claim 1, wherein treating the hyperproliferative disorder results in the inhibition of the hyperproliferative disorder, slows or arrests the development of clinical symptoms of the hyperproliferative disorder, relieves clinical symptoms of the hyperproliferative disorder, or causes regression of clinical symptoms of the hyperproliferative disorder.

16. The method of claim 15, wherein the hyperproliferative disorder is a hematologic cancer.

17. The method of claim 16, wherein the hematologic cancer is a member selected acute myelogenous leukemia (AML), acute lymphocytic leukemia (ALL), chronic lymphocytic leukemia (CLL), chronic myeloid leukemia (CML), myeloproliferative neoplasms (MPNs), and lymphomas.

18. A method comprising administering to a subject an amount of the liposomal pharmaceutical composition of claim 1; wherein the incidence or severity of thrombocytopenia incurred by administering the Bcl inhibitor in the liposomal composition is less than the incidence or severity of thrombocytopenia incurred by administering the same amount of Bcl inhibitor in non-liposomal form.

\* \* \* \* \*